US012176638B2

(12) United States Patent
Burris et al.

(10) Patent No.: US 12,176,638 B2
(45) Date of Patent: Dec. 24, 2024

(54) CONNECTOR ASSEMBLIES

(71) Applicant: Corning Optical Communications RF LLC, Glendale, AZ (US)

(72) Inventors: Donald Andrew Burris, Peoria, AZ (US); Thomas Edmond Flaherty, IV, Surprise, AZ (US); Casey Roy Stein, Surprise, AZ (US)

(73) Assignee: CORNING OPTICAL COMMUNICATIONS RF, LLC, Glendale, AZ (US)

( * ) Notice: Subject to any disclaimer, the term of this patent is extended or adjusted under 35 U.S.C. 154(b) by 324 days.

(21) Appl. No.: 17/825,813

(22) Filed: May 26, 2022

(65) Prior Publication Data

US 2022/0285863 A1 Sep. 8, 2022

Related U.S. Application Data

(63) Continuation of application No. PCT/US2020/058460, filed on Nov. 2, 2020.

(Continued)

(51) Int. Cl.

*H01R 12/55* (2011.01)
*H01R 12/53* (2011.01)
*H01R 12/58* (2011.01)

(52) U.S. Cl.

CPC ........... *H01R 12/585* (2013.01); *H01R 12/53* (2013.01)

(58) Field of Classification Search

CPC ...... H01R 12/585; H01R 12/53; H01R 12/51; H01R 12/50

(Continued)

(56) References Cited

U.S. PATENT DOCUMENTS 4,778,404 A 10/1988 Pass
4,790,700 A 12/1988 Schwartzman (Continued)

FOREIGN PATENT DOCUMENTS

CN 1930737 A 3/2007
CN 201233990 Y 5/2009

(Continued)

OTHER PUBLICATIONS

Electrical contacts. (Design-(Copyrights) Questel) orbit.com. [Online PDF compilation of references selected by examiner] 11 pgs. Print Dates Range Jul. 3, 2015-May 24, 2017 [Retrieved Feb. 23, 2021] https://www.orbit.com/export/UCZAH96B/pdf4/2337c902-fff4-42f2-aef3-b9ca7ff304ee-213245.pdf (Year: 2021).

(Continued)

*Primary Examiner* — Harshad C Patel
(74) *Attorney, Agent, or Firm* — Tamika A. Crawl-Bey

(57) ABSTRACT

Various configurations of connector assemblies are disclosed herein. Each variation of connector assembly includes at least one conductive outer housing, one or more dielectrics, and conductors, some of which may be configured as compressible electrical contacts manufactured from a tube. One embodiment of the compressible electrical contact includes a first contact end, a second contact end opposing the first contact end, and a plurality of cut sections defined by at least one cut angle measured between a pair of outwardly extending opposing inner surfaces, an innermost cut distance, and an outermost cut distance. Each of the plurality of divaricated-cut sections is based on at least one divaricating pattern.

20 Claims, 43 Drawing Sheets

Related U.S. Application Data

(60) Provisional application No. 62/942,092, filed on Nov. 30, 2019, provisional application No. 62/942,084, filed on Nov. 30, 2019, provisional application No. 62/942,089, filed on Nov. 30, 2019.

(58) Field of Classification Search
USPC .......................................................... 439/751
See application file for complete search history.

(56) References Cited

U.S. PATENT DOCUMENTS

| | | | | |
|---|---|---|---|---|
| 4,941,846 | A * | 7/1990 | Guimond | H01R 24/542 439/256 |
| 5,062,619 | A | 11/1991 | Sato | |
| 5,189,364 | A | 2/1993 | Kazama | |
| 5,435,745 | A * | 7/1995 | Booth | H01R 24/564 439/583 |
| D404,363 | S | 1/1999 | Pyle | |
| 5,982,187 | A | 11/1999 | Tarzwell | |
| 6,337,142 | B2 | 1/2002 | Harder et al. | |
| D474,740 | S | 5/2003 | Abbott | |
| 6,720,511 | B2 | 4/2004 | Windebank | |
| 7,014,473 | B2 | 3/2006 | Millard et al. | |
| 7,063,565 | B2 * | 6/2006 | Ward | H01R 9/0524 439/578 |
| 7,070,447 | B1 * | 7/2006 | Montena | H01R 24/564 439/578 |
| 7,131,868 | B2 * | 11/2006 | Montena | H01R 9/0524 439/578 |
| 7,175,112 | B2 | 2/2007 | Uhlmann | |
| 7,377,808 | B2 * | 5/2008 | Gentry | H01R 13/521 439/578 |
| 7,455,550 | B1 * | 11/2008 | Sykes | H01R 13/506 439/578 |
| 7,491,069 | B1 | 2/2009 | Di Stefano et al. | |
| 7,563,133 | B2 * | 7/2009 | Stein | H01R 13/6271 439/675 |
| 7,938,680 | B1 | 5/2011 | Hsieh | |
| 8,323,058 | B2 * | 12/2012 | Flaherty | H01R 13/6456 439/680 |
| 8,568,163 | B2 * | 10/2013 | Burris | H01R 13/6277 439/825 |
| 8,597,050 | B2 * | 12/2013 | Flaherty | H01R 13/6277 439/578 |
| 8,636,529 | B2 | 1/2014 | Stein | |
| 8,690,583 | B2 * | 4/2014 | Uesaka | H01R 12/714 439/63 |
| 9,121,507 | B2 | 9/2015 | Ghalambor et al. | |
| 9,147,955 | B2 * | 9/2015 | Hanson | H01R 13/6591 |
| 9,435,827 | B2 | 9/2016 | Pak | |
| 9,490,592 | B2 * | 11/2016 | Chastain | H01R 24/545 |
| 9,589,710 | B2 * | 3/2017 | Stein | H01B 17/58 |
| 10,109,965 | B2 * | 10/2018 | Taylor | H01R 13/631 |
| 2002/0013085 | A1 * | 1/2002 | Boyle | G01R 1/06722 439/482 |
| 2005/0079772 | A1 | 4/2005 | DeLessert | |
| 2007/0194508 | A1 | 8/2007 | Bucciero | |
| 2007/0197099 | A1 | 8/2007 | Distefano | |
| 2007/0207654 | A1 | 9/2007 | Hu | |
| 2007/0243762 | A1 * | 10/2007 | Burke | H01R 13/405 439/589 |
| 2007/0269999 | A1 | 11/2007 | Di Stefano | |
| 2008/0194124 | A1 | 8/2008 | Di Stefano | |
| 2009/0111289 | A1 | 4/2009 | Vinther | |
| 2011/0039448 | A1 | 2/2011 | Stein | |
| 2012/0187971 | A1 | 7/2012 | Huang | |
| 2014/0004721 | A1 | 1/2014 | Stein | |
| 2014/0329421 | A1 | 11/2014 | Schiele et al. | |
| 2015/0276807 | A1 | 10/2015 | Chen et al. | |
| 2017/0054264 | A1 | 2/2017 | Ryu et al. | |
| 2017/0138985 | A1 | 5/2017 | Teranishi et al. | |
| 2017/0222348 | A1 | 8/2017 | Li et al. | |
| 2017/0322235 | A1 | 11/2017 | Liu et al. | |
| 2018/0076552 | A1 | 3/2018 | Wang et al. | |
| 2019/0063537 | A1 | 2/2019 | Dawson et al. | |
| 2019/0074610 | A1 | 3/2019 | Thakare et al. | |
| 2019/0305455 | A1 | 10/2019 | Uppleger | |
| 2020/0203873 | A1 | 6/2020 | Wang et al. | |
| 2021/0035701 | A1 | 2/2021 | Yamamoto | |

FOREIGN PATENT DOCUMENTS

| | | | |
|---|---|---|---|
| CN | 203103590 | U | 7/2013 |
| DE | 3727241 | A1 | 3/1988 |
| DE | 102010008194 | A1 | 8/2011 |
| FR | 2805868 | A1 | 9/2001 |
| GB | 2366605 | A | 3/2002 |
| JP | 08-159195 | A | 6/1996 |
| JP | 2006-153723 | A | 6/2006 |
| JP | 2011-169595 | A | 9/2011 |
| JP | 2016-166783 | A | 9/2016 |
| WO | 2020/112474 | A1 | 6/2020 |

OTHER PUBLICATIONS

International Search Report and Written Opinion of the International Searching Authority; PCT/US2020/058460; mailed on Apr. 14, 2021, 23 pages; European Patent Office.

* cited by examiner

CONNECTOR ASSEMBLIES

CROSS-REFERENCE TO RELATED APPLICATIONS

This application is a continuation of International Application No. PCT/US2020/058460, filed Nov. 2, 2020, which claims priority to U.S. Application Ser. No. 62/942,092, filed Nov. 30, 2019; U.S. Application Ser. No. 62/942,084, filed Nov. 30, 2019; and U.S. Application Ser. No. 62/942,089, filed Nov. 30, 2019. Each of the aforementioned applications is incorporated herein by reference in its entirety.

BACKGROUND

The present disclosure generally relates to connector assemblies, and particularly connector assemblies, including straight and right-angle housings, center contacts, and printed circuit boards.

Some microwave frequency connectors have housings and metallic center contacts that are designed to be soldered directly to a printed circuit board (PCB). The metallic center contacts are generally surrounded by a plastic insulator and the metallic housing. Socket contacts in these connector assemblies are key components in the transmission of electrical signal. The components in connectors may be coupled by various methods, including a push-on design. These types of connectors may use a cable interconnect to transmit the signal to the PCB. However, these types of interconnections usually perform poorly above 10 GHz due to a right-angle transition to the PCB.

There are also connectors that include a housing and a metallic center contact that engages with a cable. The metallic center contact in the cable connector is generally surrounded by a plastic insulator and the metallic housing. The cable in the right-angle housing may be engaged, for example, by soldering a metallic access contact to a center conductor of the cable and then inserting the metallic access contact and cable subassembly into the right-angle housing. The metallic access center contact may thereafter be mated with a socket center contact within the right-angle housing. Another method to engage the cable is to simply insert the prepared cable into the housing where the center conductor of the cable directly engages the socket center contact in the right housing. In both cases the cable may be soldered to the housing. This type of design performs well up to 50 GHz depending on the specification of the cable.

Despite these various methods, there is still a need for solderless center contacts that mate to a PCB, using both solderless center contacts and solderless ground housings at high frequencies with low signal losses. In addition, there is a need to address the aforementioned interconnection situations in unique applications to improve performance at high frequencies, reduce discontinuities, and simplify the transition between PCBs.

SUMMARY

Embodiments disclosed herein are directed to connector assemblies, including low and high frequency connectors and DC connectors designed for low level signals. Some embodiments, however, are configured to operate at high frequencies, including frequencies up to 65 GHz, with low insertion and return losses.

The connector assemblies include a conductive housing, one or more dielectrics, and conductors, some of which may be configured as compressible electrical contacts. Each compressible electrical contact is configured to vary its length, compensate for tolerance ranges/deviations of mating center conductors or cables, and maintain constant electrical/mechanical connection upon assembly. The properties of the compressible electrical contacts disclosed herein are due, in part, to manufacturing the contacts using precision cutting methods, which result in a plurality of cut sections. Such methods include, but are not limited to, laser cutting, electroforming, and/or electro-etching. Regardless of the precision cutting method used, the contacts disclosed herein are preferably designed, using divaricating patterns, such that each contact has a plurality of cut sections in its final form.

The term "divaricating pattern", as used herein, is defined as a cutting pattern that allows the compressible electrical contact to have contact sections configured to form open tapered areas after cutting when in a substantially relaxed state, nest or collapse inwardly to form outwardly extended tapered slots when compressive force is applied to ends of the compressible electrical contact, resulting in a substantially compressed state. The contacts are also configured maintain a flexible and substantially tubular form when transitioning from a substantially relaxed state to a substantially compressed state, despite the presence of the plurality of cut sections.

In some embodiments of the connector assemblies, the dielectrics contained therein are configured to guide one or more conductive center conductors, which functions as a signal conductor, through an angle ranging from about a 0° to about a 90°, which transition to a printed circuit board (PCB). The connector assemblies disclosed herein also preferably have a very low a profile and may be used in compact connector-PCB assemblies.

According to one aspect, a connector assembly includes a compressible electrical contact manufactured from a tube, a dielectric, and an outer housing. The compressible electrical contact has a first contact end, a second contact end opposing the first contact end, and at least one medial portion disposed between the first contact end and the second contact end. The at least one medial portion includes a plurality of divaricated cut sections based on at least one divaricating pattern cut into the tube. In some embodiments, the at least one divaricating pattern includes an upper tapered section and a lower tapered section such that a plurality of tapered slots are formed when the compressible electrical contact is substantially compressed. The connector assembly also includes a dielectric, having a central dielectric section surrounding the medial portion of compressible electrical contact and an outer housing surrounding the dielectric.

According to another aspect, a connector assembly includes a connector assembly having a compressible electrical contact manufactured from a tube, a plurality of dielectrics, and an outer housing. The compressible electrical contact has a first contact end, a second contact end opposing the first contact end, and at least one medial portion disposed between the first contact end and the second contact end. The at least one medial portion includes a plurality of divaricated cut sections based on at least one divaricating pattern cut into the tube. In some embodiments, the at least one divaricating pattern includes an upper tapered section and a lower tapered section such that a plurality of tapered slots are formed when the compressible electrical contact is substantially compressed. The connector assembly also includes a plurality of dielectrics, including two outer dielectrics and a center dielectric disposed between the two outer dielectrics. The outer dielectrics surround medial portions of compressible electrical contact and the center dielectric surround a central tubular portion of the compressible electrical contact. The connector assembly additionally includes the outer housing, which surrounds the plurality of dielectrics.

According to yet another aspect, a connector assembly includes a compressible electrical contact manufactured from a tube, a plurality of dielectrics having a different configuration, and an outer housing. The compressible electrical contact has a first contact end, a second contact end opposing the first contact end, and at least one medial portion disposed between the first contact end and the second contact end. The at least one medial portion includes a plurality of divaricated cut sections such that at least one divaricated cut section is based on at least one divaricating pattern cut into the tube. In some embodiments, the at least one divaricating pattern includes an upper tapered section and a lower tapered section such that a plurality of tapered slots are formed when the compressible electrical contact is substantially compressed. The connector assembly also includes a plurality of dielectrics, including two outer dielectrics and a center dielectric disposed between the two outer dielectrics. The outer dielectrics surround medial portions of compressible electrical contact. The connector assembly additionally includes an outer housing surrounding the plurality of dielectrics. In other embodiments, the outer housing includes a contoured bore having a portion of the first contact end of the compressible electrical contact contained therein and a plurality of mounting legs extending from an end of the outer housing.

Another aspect disclosed herein relates to a right-angle connector assembly, including a compressible electrical contact, a primary housing having a housing body with a side bore defined in a side of the primary housing, a bottom bore defined in a bottom of the primary housing, and an alignment dielectric bore. Disposed within the alignment dielectric bore is an alignment dielectric. The assembly also includes a side housing disposed in the side bore, a bottom housing disposed in the bottom bore, and a compressible electrical contact. Moreover, in preferred configurations, the compressible electrical contact is manufactured from a tube.

According to additional aspects, the compressible electrical contact has a first contact end, a second contact end opposing the first contact end, and at least one medial portion disposed between the first contact end and the second contact end. The at least one medial portion includes a plurality of divaricated cut sections such that at least one divaricated cut section is based on at least one divaricating pattern cut into the tube. In some embodiments, the at least one divaricating pattern includes an upper tapered section and a lower tapered section such that a plurality of tapered slots are formed when the compressible electrical contact is substantially compressed.

Additional aspects of the embodiments disclosed herein will be apparent upon review of the drawings and description, which follow.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and the operation of the various embodiments.

The figures are not necessarily to scale. Like numbers used in the figures may be used to refer to like components. However, it will be understood that the use of a number to refer to a component in a given figure is not intended to limit the component in another figure labeled with the same number.

DETAILED DESCRIPTION

Various exemplary embodiments of the disclosure will now be described with particular reference to the Drawings. Exemplary embodiments of the present disclosure may take on various modifications and alterations without departing from the spirit and scope of the disclosure. Accordingly, it is to be understood that the embodiments of the present disclosure are not limited to the described exemplary embodiments, but are to be controlled by the limitations set forth in the claims and any equivalents thereof.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

Cartesian coordinates are used in some of the Figures for reference and are not intended to be limiting as to direction or orientation.

For purposes of description herein, the terms "upper," "lower," "right," "left," "rear," "front," "vertical," "horizontal," "top," "bottom," "side," and derivatives thereof, shall relate to the disclosure as oriented with respect to the Cartesian coordinates in the corresponding Figure, unless stated otherwise. However, it is to be understood that the disclosure may assume various alternative orientations, except where expressly specified to the contrary.

Figure 1A:
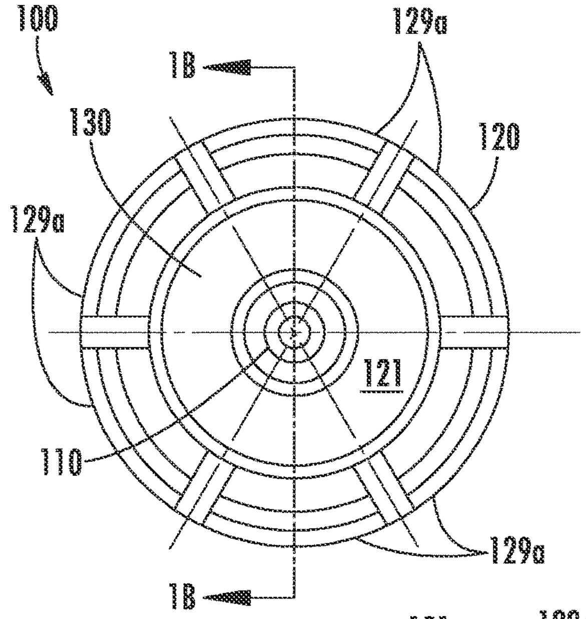
FIG. 1A is a front view of a connector assembly in accordance with embodiments disclosed herein.
Figure 1B:
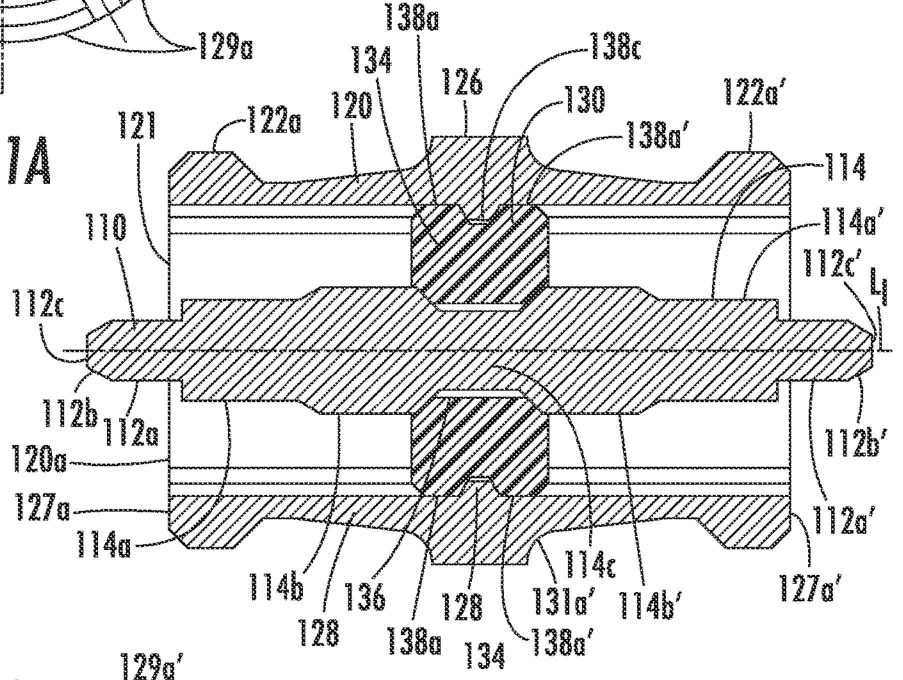
FIG. 1B is a cross-sectional view of the connector assembly, shown in FIG. 1A, taken along line 1B-1B.
Figure 1C:
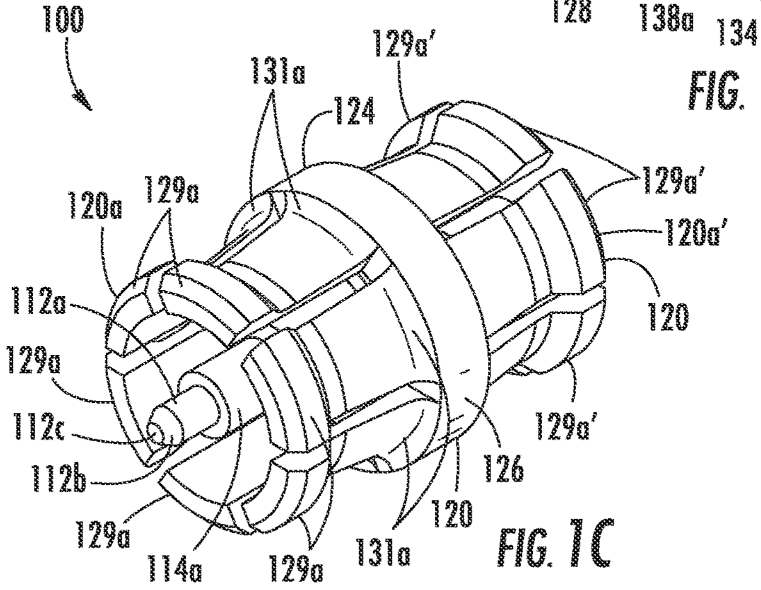
FIG. 1C is an isometric view of the connector assembly shown in FIGS. 1A and 1B.

FIGS. 1A-1C illustrate a connector assembly 100, including a conductive center contact 110, an outer housing 120, and a dielectric 130 disposed between the center contact 110 and the outer housing 120. The center contact 110 has two contact ends 112*a*, 112*a*', and a contact body 114 disposed between the contact ends 112*a*, 112*a*'. Each contact end 112*a*, 112*a*' extends past ends 120*a*, 120*a*' of the outer housing 120 and includes a contoured surface 112*b*, 112*b*', which extends such that contact point surfaces 112*c*, 112*c*' are formed. The contact body 114 includes outer body sections 114*a*, 114*a*' coupled respectively to contact ends 112*a*, 112*a*', inner body sections 114*b*, 114*b*' and a central body section 114*c*, which are coupled to the dielectric 130 upon assembly.

The dielectric 130 has a dielectric body 134, having an inner annular dielectric surface 136, outer annular dielectric surfaces 138*a*, 138*a*', and a central groove 138*c*, between the outer annular dielectric surfaces 138*a*, 138*a*'. Preferably, the dielectric 130 has an interference fit with the central body portion 114*c* and at least a portion of each inner body section 114*a*, 114*a*'.

Coupled to the outer annular dielectric surfaces 138*a*, 138*a*' and the central groove 138*c* is an outer housing 120. The outer housing 120 includes a centrally located cavity or opening 121, which is illustrated as having a circular shape (FIG. 1A). The centrally located cavity 121 is not limited to a circular shape, and instead may undertake different shapes, such as that of a polygon (e.g., hexagonal).

The outer housing 120 also includes a plurality of biasing portions 122*a*, 122*a*', extending from a medial housing section 124 positioned therebetween. Where two biasing portions are included in the outer housing 120, it is preferred, but optional, that the medial housing section 124, biasing portion 122*a*, and biasing portion 122*a*' share a common longitudinal axis L1, as shown in FIG. 1B. It should be noted that longitudinal axes noted herein are mathematical or geometric constructs used to illustrate the principles concepts of the embodiments shown herein, and are not physical components.

Referring particularly to FIG. 1C, disposed between pairs of biasing portions are slots 123*a*, 123*a*' which are symmetrically and circumferentially positioned at intervals at each outer housing end 127*a*, 127*a*'. The slots 123*a*, 123*a* also extend from each end 127*a*, 127*a*' to the medial housing section 124. In the illustrated embodiment, six slots 123*a*, 123*a*' divide biasing portions 122*a*, 122*a* into six cantilevered beams 129*a*, 129*a*'. It is to be understood, however, that fewer or more slots may be present. At least six slots and six beams per side are preferred, and six slots and six beams are more preferred.

The outer housing 120, preferably, but optionally includes transition portions 131*a*, 131*a*' between each cantilevered beams 129*a*, 129*a*' and the medial housing section 120. Each transition portion 131*a*, 131*a* has a radial outer surface which preferably, but optionally, has an inwardly arcing, curved profile. This transition portion preferably has a non-orthogonal profile, and more preferably curved, e.g., radial or rounded. Although not wishing to be bound by any particular theory, it is believed that such profiles distribute stress in the outer housing 120 when the cantilevered beams 129*a*, 129*a*' are flexed radially inward.

The medial housing section 124 also includes an upper housing portion 126 that extends upwardly and a lower housing portion 128 that extends downwardly to mate with the central groove 138*c* of the dielectric 130 upon complete assembly, as shown particularly in FIG. 1B. The lower housing portion 128 may be configured to extend continuously around the inner surface of the medial housing section. Alternatively, the lower housing portion 128 may comprise segments, such as diametrically opposed segments that are discontinuous from one another. The lower housing portion 128 may also be formed integrally with or separately from the remainder of the medial housing section 124.

Figure 2A:
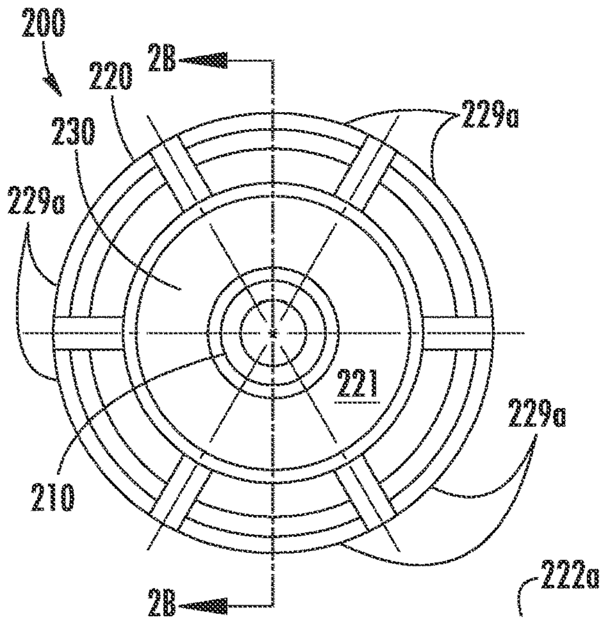
FIG. 2A is a front view of another connector assembly in accordance with embodiments disclosed herein.
Figure 2B:
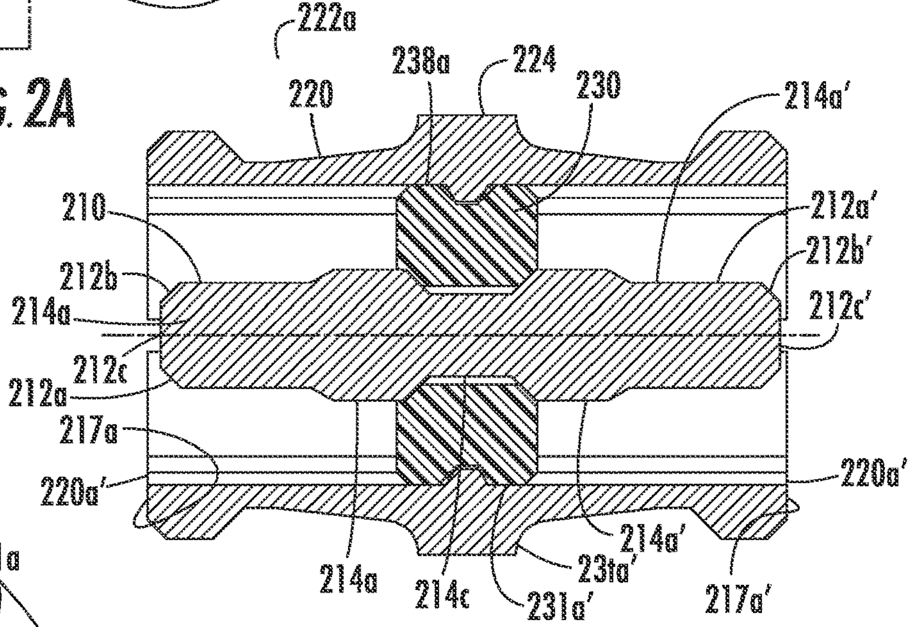
FIG. 2B is a cross-sectional view of the connector assembly shown in FIG. 2, taken along line 2B-2B.
Figure 2C:
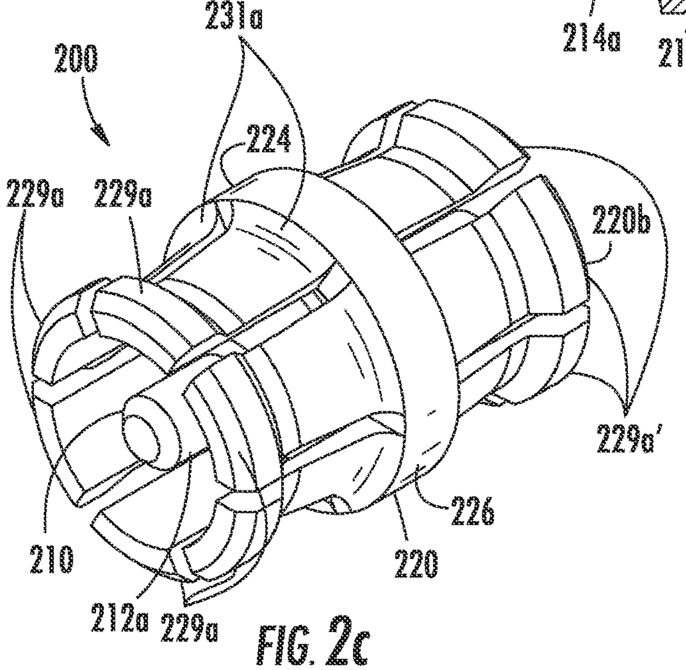
FIG. 2C is an isometric view of the connector assembly shown in FIGS. 2A and 2B.

FIGS. 2A-2C illustrate another connector assembly 200, including a center contact 210, an outer housing 220, and a dielectric 230 disposed between the center contact 210 and the outer housing 220.

The center contact 210 has two contact ends 212*a*, 212*a*', and a contact body 214 disposed between the contact ends 212*a*, 212*a*'. The contact ends 212*a*, 212*a*' do not extend past ends 220*a*, 220*a*' of the outer housing 120. Each contact end 212*a*, 212*a*' includes a contoured surface 212*b*, 212*b*', which extends such that contact point surfaces 212*c*, 212*c*' are formed. The contact body 214 includes inner body sections 214*a*, 214*a*', coupled respectively to contact ends 212*a*, 212*a*', and a central body section 214*c*. The inner body sections 214*a*, 214*a*' and the central body section 214*c* are coupled to the dielectric 230 upon assembly.

The dielectric 230, in this assembly configuration, also includes a dielectric body 234, having an inner annular dielectric surface 236, outer annular dielectric surfaces 238*a*, 238*a*', and a central groove 238*c*, between the outer annular dielectric surfaces 238*a*, 238*a*'. Preferably, the dielectric 230 has an interference fit with the central body portion 214*c* and at least a portion of each inner body section 214*a*, 214*a*'.

Coupled to the outer annular dielectric surfaces 238*a*, 238*a*' and the central groove 238*c* is an outer housing 220. The outer housing 220 includes a plurality of biasing portions 222*a*, 222*a*' on each housing end 220*a*, 220*b* with a medial housing section 224 positioned therebetween. The medial housing section 224 has an upper housing portion 226 that extends upwardly and a lower housing portion 228 that extends downwardly to mate with the central groove 138*c* of the dielectric 230 upon complete assembly, as shown particularly in FIG. 2B.

The outer housing 220 includes a centrally located cavity or opening 221, which is illustrated as having a circular shape (FIG. 2A) to provide the outer housing with an annular appearance. The centrally located cavity 221 is not limited to a circular shape, and instead may undertake different shapes, such as that of a polygon (e.g., hexagonal).

The outer housing 220 also includes a plurality of biasing portions 222*a*, 222*a*', extending from a medial housing section 224 positioned therebetween. Where two biasing portions are included in the outer housing 220, it is preferred, but optional, that the medial housing section 224, biasing portion 222*a*, and biasing portion 222*a*' share a common longitudinal axis L2, as shown in FIG. 2B.

Referring particularly to FIG. 2C, disposed between pairs of biasing portions are slots 223*a*, 223*a*' which are symmetrically and circumferentially positioned at intervals at each outer housing end 227*a*, 227*a*'. The slots 223*a*, 223*a* also extend from each end 227*a*, 227*a*' to the medial housing section 224. In the illustrated embodiment, six slots 223*a*, 223*a*' divide biasing portions 222*a*, 222*a* into six cantilevered beams 229*a*, 229*a*'. It is to be understood, however, that fewer or more slots may be present. At least six slots and six beams per side are preferred, and six slots and six beams are more preferred.

The outer housing 220 preferably but optionally includes transition portions 231*a*, 231*a*' between each cantilevered beams 229*a*, 229*a*' and the medial housing section 220. Each transition portion 231*a*, 231*a* has a radial outer surface which preferably, but optionally, has an inwardly arcing, curved profile. This transition portion preferably has a non-orthogonal profile, and more preferably curved, e.g., radial or rounded. Although not wishing to be bound by any particular theory, it is believed that such profiles distribute stress in the outer housing 220 when the cantilevered beams 229*a*, 229*a*' are flexed radially inward.

The medial housing section 224 also includes an upper housing portion 226 that extends upwardly and a lower housing portion 228 that extends downwardly to mate with the central groove 238*c* of the dielectric 230 upon complete assembly, as shown particularly in FIG. 2B. The lower housing portion 228 may be configured to extend continuously around the inner surface of the medial housing section. Alternatively, the lower housing portion 228 may comprise segments, such as diametrically opposed segments that are discontinuous from one another. The lower housing portion 228 may also be formed integrally with or separately from the remainder of the medial housing section 224.

Figure 3A:
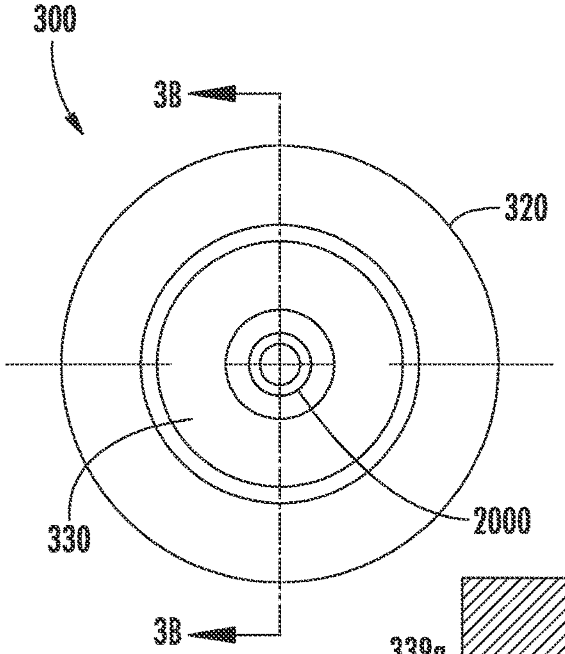
FIG. 3A is a front view of another connector assembly in accordance with embodiments disclosed herein.
Figure 3B:
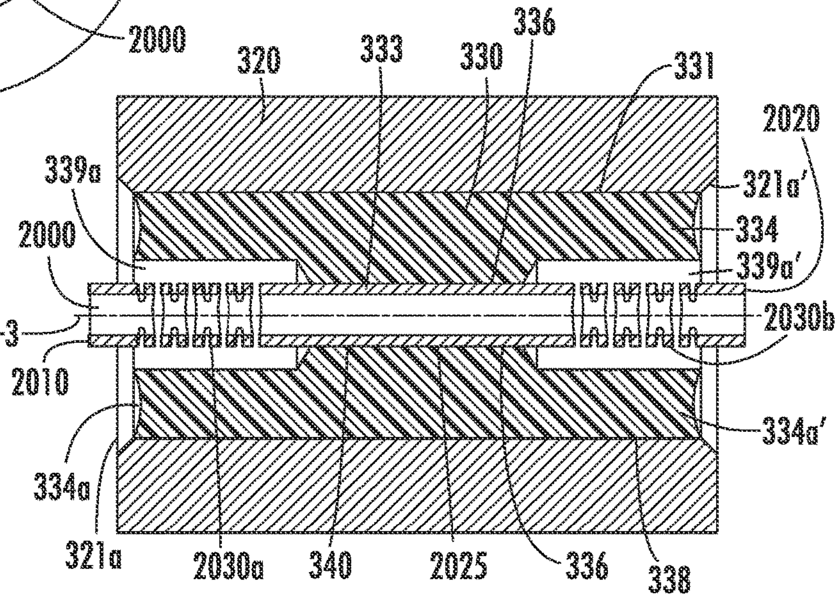
FIG. 3B is a cross-sectional view of the connector assembly shown in FIG. 3, taken along line 3B-3B.
Figure 3C:
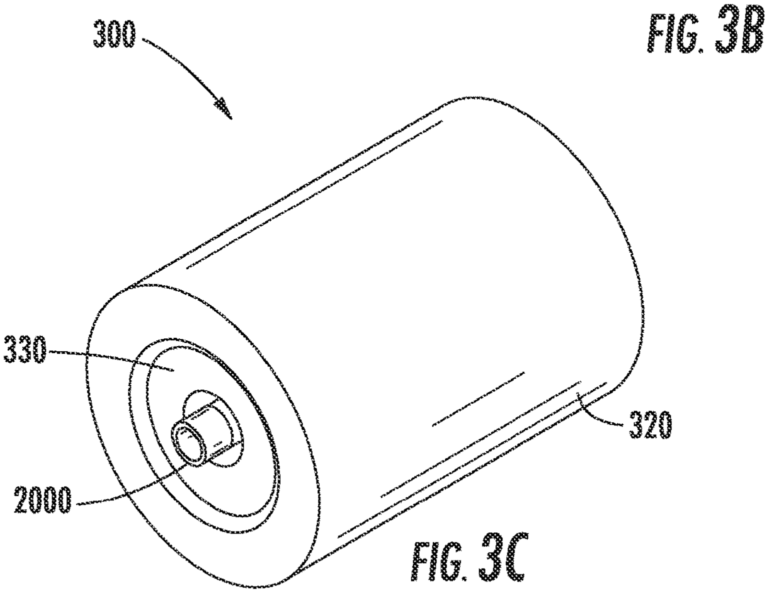
FIG. 3C is an isometric view of the connector assembly shown in FIGS. 3A and 3B.

FIGS. 3A-3C illustrate a connector assembly 300, including a compressible electrical contact 2000, shown in a substantially relaxed state, an outer housing 320, and a dielectric 330 disposed between the compressible electrical contact 2000 and the outer housing 320. Each of the elements in the assembly share a common longitudinal axis L3, as shown in FIG. 3B. The compressible electric contact 2000 is manufactured from a tube 3000A (FIG. 26) and includes a first contact end 2010, a second contact end 2020, two medial portions 2030*a*, 2030*b*, and a central tubular portion 2025. The compressible electrical contact 2000 and variations thereof (2100, 2200, 2300, 2400, 2500, 2600) will be described with additional detail, particularly with reference to FIGS. 18-30. As shown particularly in FIG. 20, each variation of the compressible electrical contact includes one or more medial portions 2030, 2130, 2230, 2330, 2430, 2530, 2630 having at least one cut section 2032, 2132, 2232, 2332, 2432, 2532, 2632 based on a divaricating pattern PA (FIG. 26).

The dielectric 330 has a dielectric body 334, with a first body end 334*a* and a second body end 334*a*' opposing the first body end 334*a*. Preferably, both body ends 334*a*, 334*a*' are contoured, as particularly shown in FIG. 3B. The body 334 also includes an inner annular dielectric surface 336, outer annular dielectric surface 338, a first dielectric bore 339*a*, on the first body end 334*a*, and a second dielectric bore 339*a*' on the second body end 334*a*'. Disposed between both dielectric bores 339*a*, 339*a*' is a central dielectric section 340, which extends and tapers downwardly to surrounds and mate with the central tubular portion 2025 of the contact 2000 upon assembly.

Upon assembly, the dielectric 330 is surrounded by an outer housing 320. The outer housing 320 includes a first housing end 320*a* and a second housing end 320*a*' opposing the first housing end 320*a*. Preferably each end 320*a*, 320*a*' includes chamfers 321*a*, 321*a*'. The dielectric 330 also has an outer surface 331 that mates with the outer housing 320 and an inner surface 333 configured to mate with the contact 2000, upon assembly. When assembled, the first contact end 2010 and the second contact end 2020 both extend beyond the dielectric 330 and the outer housing 320.

Figure 4A:
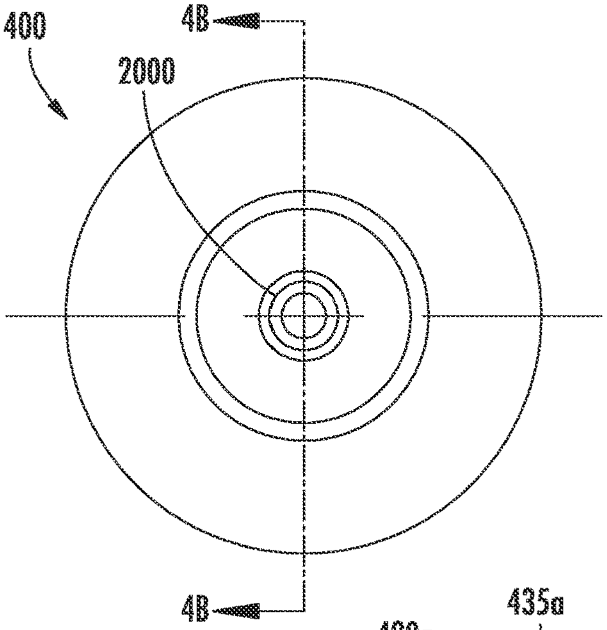
FIG. 4A is a front view of another connector assembly in accordance with embodiments disclosed herein.
Figure 4B:
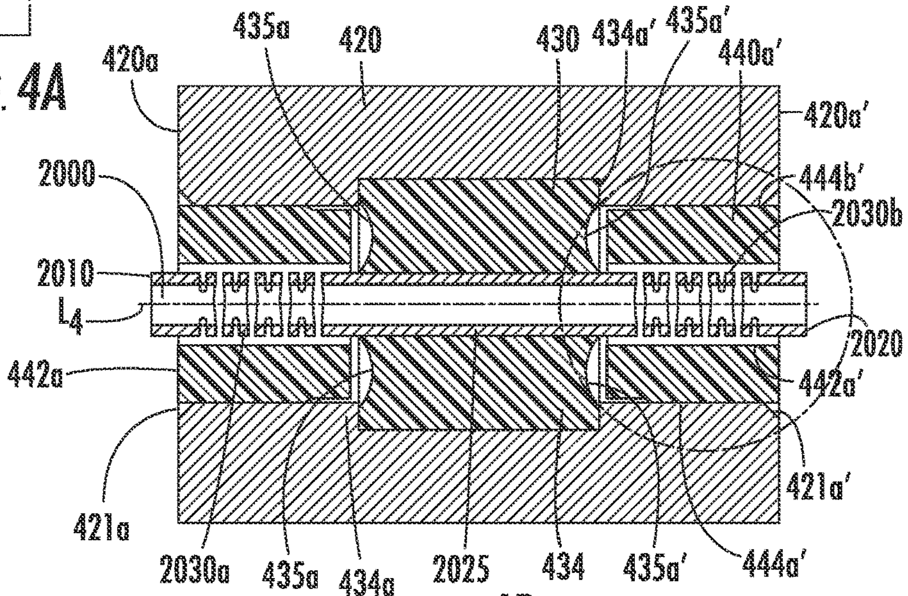
FIG. 4B is a cross-sectional view of the connector assembly shown in FIG. 4A, taken along line 4B-4B.
Figure 4C:
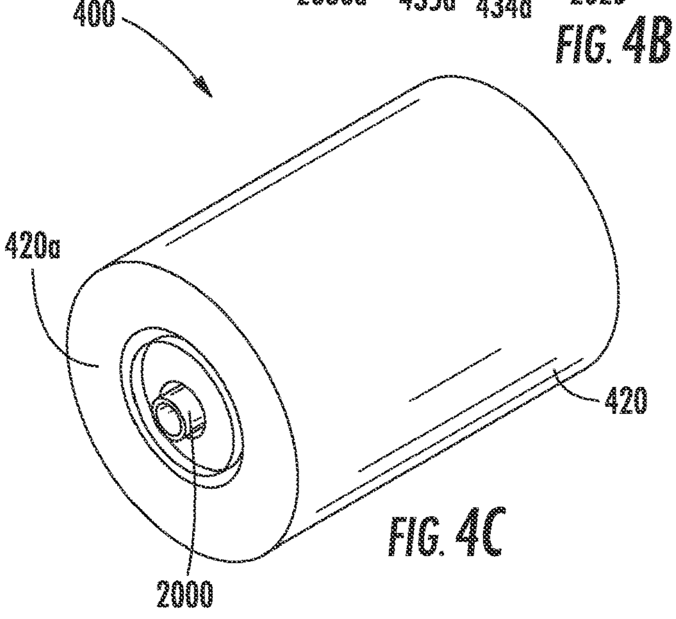
FIG. 4C is an isometric view of the connector assembly shown in FIGS. 4A and 4B.

FIGS. 4A-4C illustrate a connector assembly 400, including the compressible electrical contact 2000, an outer housing 420, a center dielectric 430 and outer dielectrics, 440*a*, 440*a*'. Each of the elements in the assembly share a common longitudinal axis L4, as shown in FIG. 4B. All three dielectrics are disposed between the compressible electrical contact 2000 and the outer housing 420.

The center dielectric 430 has a center dielectric body 434, with a first body end 434*a* and a second body end 434*a*' opposing the first body end 434*a*. Preferably, both ends 434*a*, 434*a*' have contoured faces 435*a*, 435*a*', as particularly shown in FIGS. 4B and 4D. The center dielectric body 434 also includes an inner annular dielectric surface 436 and an outer annular dielectric surface 438.

Each outer dielectric 440*a*, 440*a*' has an inner surface 442*a*, 442*a*' and preferably two respective outer surfaces 444*a*, 444*a*', 444*b*, 444*b*'. As shown particularly in FIG. 4D outer surface 444*a*' has a diameter smaller than the outer diameter of outer surface 444*b*'. Also, outer surface 444*a* has a similar configuration with respect to outer surface 444*b*.

Upon assembly, each dielectric 430, 440*a*, 440*a*' is surrounded by an outer housing 420. The outer housing 420 includes a first housing end 420*a* and a second housing end 420*a*' opposing the first housing end 420*a*. Preferably each end 420*a*, 420*a*' includes chamfers 421*a*, 421*a*'. The dielectric 430 also has an outer surface 431 and an inner surface 433 configured to mate with the contact 2000 upon assembly.

Figure 5A:
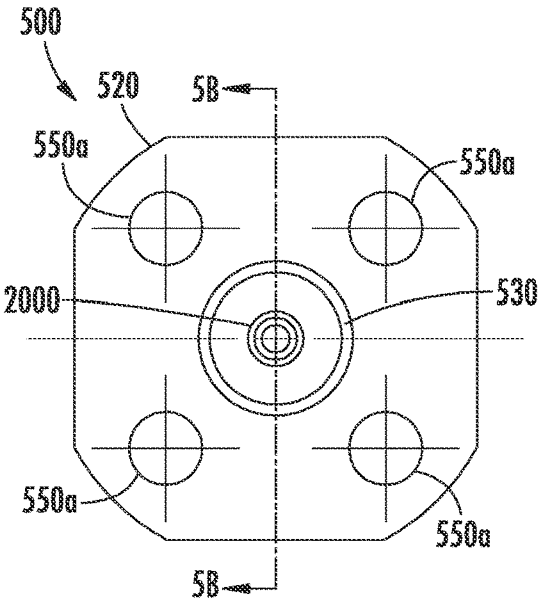
FIG. 5A is a front view of another connector assembly in accordance with embodiments disclosed herein.
Figure 5B:
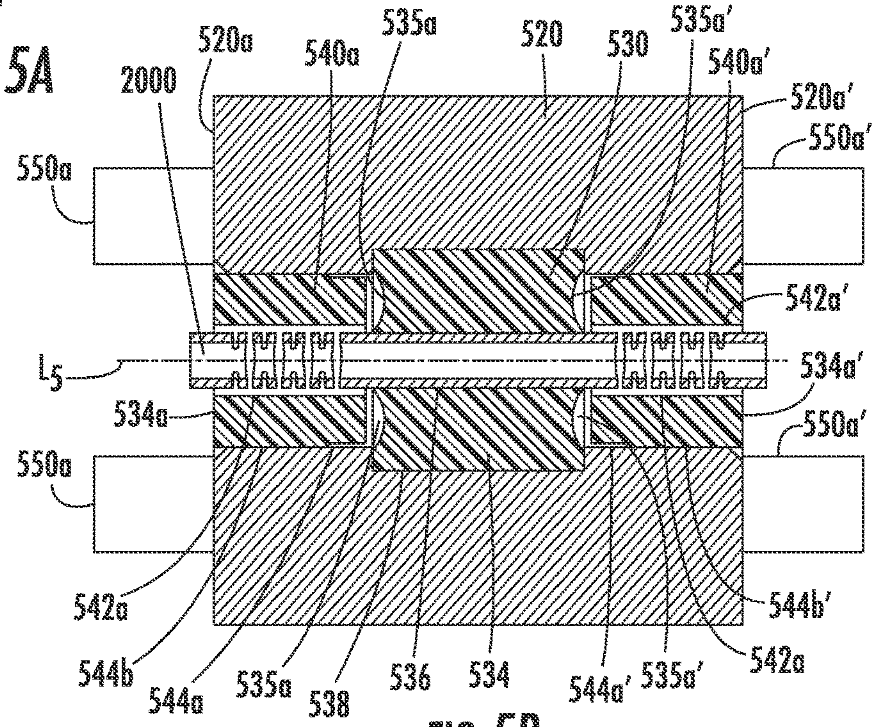
FIG. 5B is a cross-sectional view of the connector assembly shown in FIG. 5A, taken along line 5B-5B.
Figure 5C:
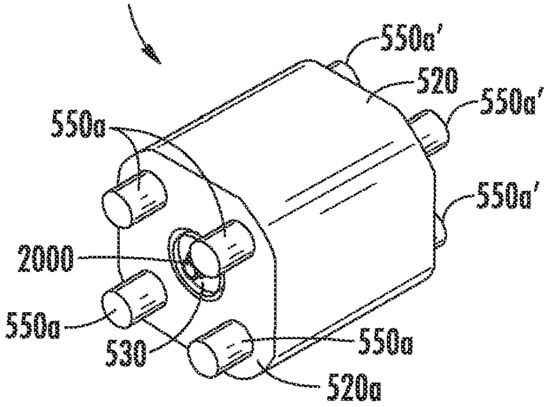
FIG. 5C is an isometric view of the connector assembly shown in FIGS. 5A and 5B.

FIGS. 5A-5C illustrate a connector assembly 500, including the compressible electrical contact 2000, an outer housing 520, a center dielectric 530 and outer dielectrics, 540*a*, 540*a*'. Each of the elements in the assembly share a common longitudinal axis L5, as shown in FIG. 5B. All three dielectrics are disposed between the compressible electrical contact 2000 and the outer housing 520.

The center dielectric 530 has a center dielectric portion 534, with a first body end 534*a* and a second body end 534*a*' opposing the first body end 534*a*. Preferably, both ends 534*a*, 534*a*' have contoured faces 535*a*, 535*a*', as particularly shown in FIG. 5B. The center dielectric body 534 also includes an inner annular dielectric surface 536 and an outer annular dielectric surface 538.

Each outer dielectric 540*a*, 540*a*' has an inner surface 542*a*, 542*a*' and preferably two respective outer surfaces 544*a*, 544*a*', 544*b*, 544*b*'. The outer surface 544*a* has a diameter smaller than the outer diameter of outer surface 544*b*, in a configuration that is similar to that shown in FIG. 4D.

Upon assembly, each dielectric 530, 540*a*, 540*a*' is surrounded by an outer housing 520. The outer housing 520 includes a first housing end face 520*a* and a second housing end face 520*a*' opposing the first housing end face 520*a*. A plurality of mounting legs 550*a*, 550*a*' extend respectively from each housing end face 520*a*, 520*a*'. In this embodiment, four mounting legs 550*a*, 550*a*' are shown extending from each end face 520*a*, 520*a*', however, more or fewer mounting legs can be included on each end face. The mounting legs 550*a*, 550*a*' are also preferably positioned symmetrically with respect to a longitudinal axis L5 that extends through the connector assembly 500.

Figure 5D:
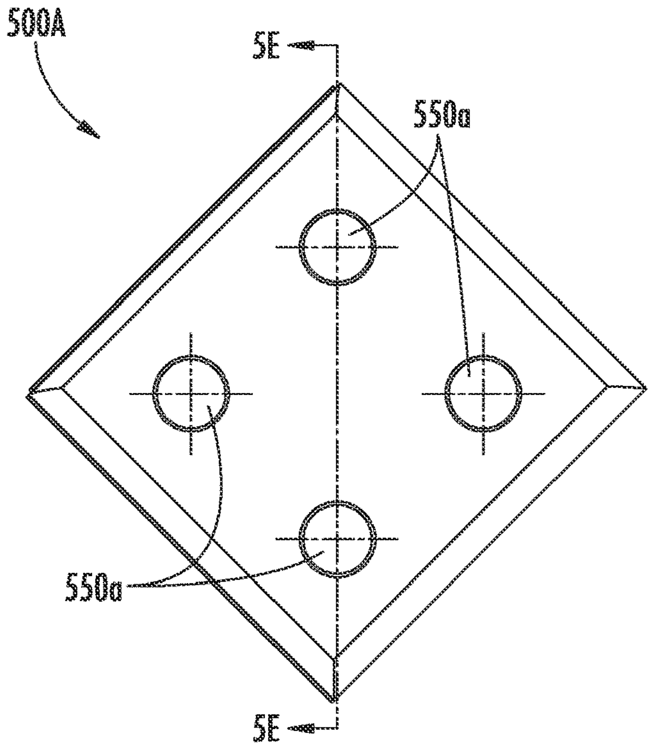
FIG. 5D is a front view of a connector-PCB assembly, including the embodiment shown in FIG. 5A assembled with PCBs.
Figure 5E:
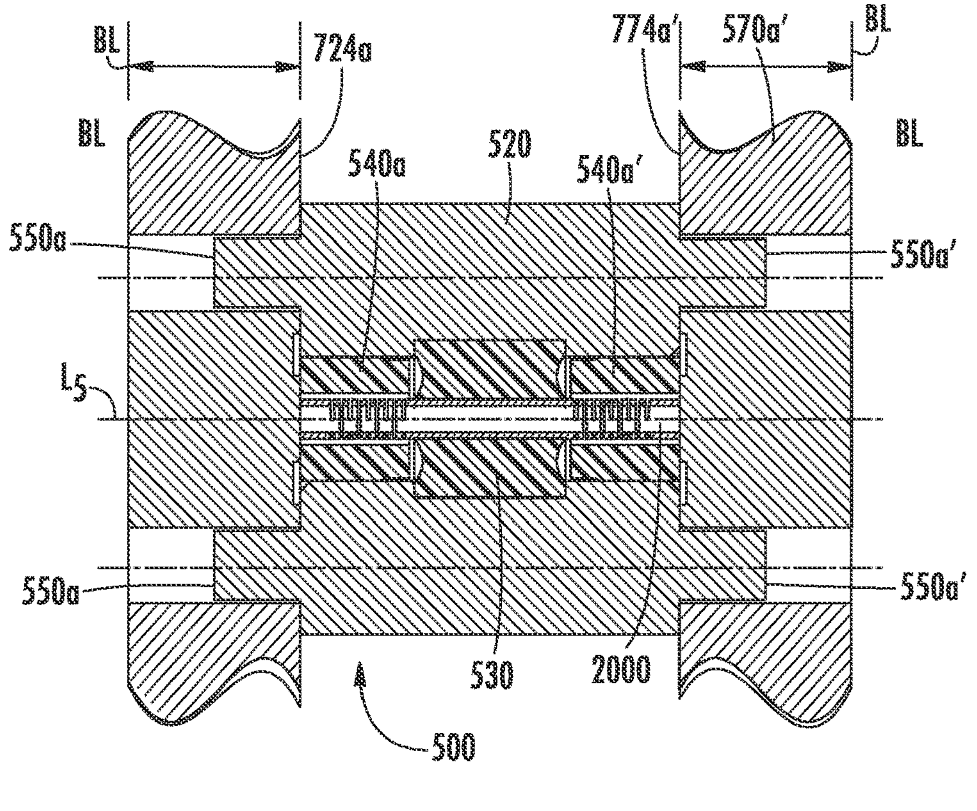
FIG. 5E is a cross-sectional view of the connector assembly shown in FIG. 5D, taken along line 5E-5E.

FIG. 5D is a front view of a connector-PCB assembly 500A, including PCBs 570*a*, 570*a*' coupled to the connector assembly 500, and specifically the outer housing 520, while FIG. 5E is a cross-sectional view of the connector assembly 500A, taken along line 5E-5E. Each PCB 570*a*, 570*a*' includes bores 572*a*, 572*a*' having inner circular profiles that complement the outer circular profiles of the mounting legs 550*a*, 550*a*'. The bores 572*a*, 572*a*' each have a length BL, which is long enough to accommodate the full length of each mounting leg 550*a*, 550*a*'. Preferably, the length BL is sufficient to allow additional clearance within the bores 572*a*, 572*a*' even after final assembly, as particularly shown in FIG. 5E. Each PCB 570*a*, 570*a*' also includes an engagement surface 574*a*, 574*a*', including portions of which are positioned against external surfaces of the outer housing 520 and dielectrics 540*a*, 540*a*'.

FIGS. 6A-6D illustrate a connector assembly 600, including the compressible electrical contact 2000, an outer housing 620, a center dielectric 630 and outer dielectrics, 640*a*, 640*a*'. All three dielectrics 630, 640*a*, 640*a*' are disposed between the compressible electrical contact 2000 and the outer housing 620.

The center dielectric 630 has a center dielectric body 634, with a first body end 634*a* and a second dielectric end 634*a*' opposing the first body end 634*a*. Preferably, both ends 634*a*, 634*a*' have contoured faces 635*a*, 635*a*', as particularly shown in FIG. 6B. The center dielectric body 634 also includes an inner annular dielectric surface 636 and an outer annular dielectric surface 638.

Figure 4D:
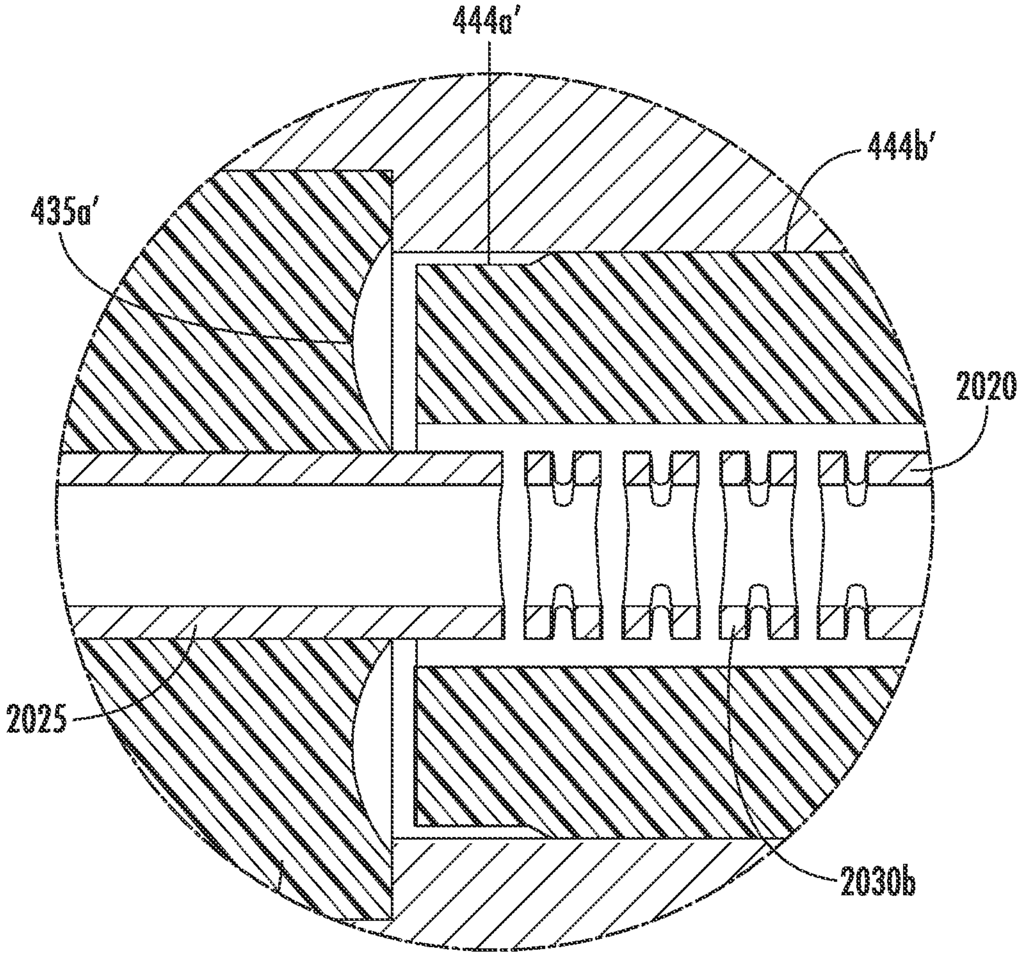
FIG. 4D is a detail partial cross-sectional view of the embodiment shown in FIG. 4B.

Each outer dielectric 640*a*, 640*a*' has an inner surface 642*a*, 642*a*' and preferably two respective outer surfaces 644*a*, 644*a*', 644*b*, 644*b*'. The outer surface 644*a* has a diameter smaller than the outer diameter of outer surface 644*b* (FIG. 4D).

Upon assembly, each dielectric 630, 640*a*, 640*a*' is surrounded by an outer housing 620. The outer housing 620 includes a first housing end 620*a*, including a contoured bore 622 and a second housing end 620*a*' opposing the first housing end 620*a*. The contoured bore 622 is configured such that a portion of the first contact end (2010) is contained therein. A plurality of mounting legs 650 extend from the second housing end 620*a*'. In this embodiment, four mounting legs 650 are shown extending in a symmetrical pattern from an end face 621 of the second housing end 620*a*', however, more or fewer mounting legs can be included. The mounting legs 650 are also preferably positioned symmetrically with respect to a longitudinal axis a' that extends through the connector assembly 600.

Figure 6A:
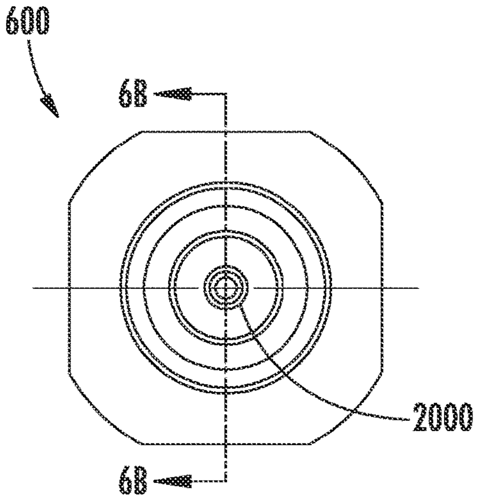
FIG. 6A is a front view of another connector assembly in accordance with embodiments disclosed herein.
Figure 6B:
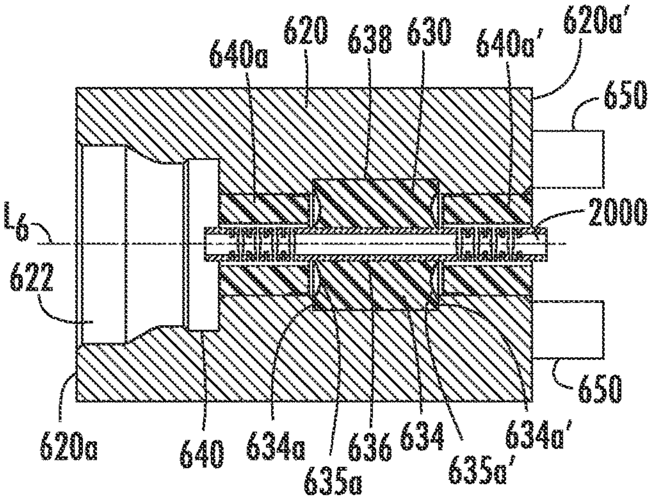
FIG. 6B is a cross-sectional view of the connector assembly, shown in FIG. 6A, taken along line 6B-6B.
Figure 6C:
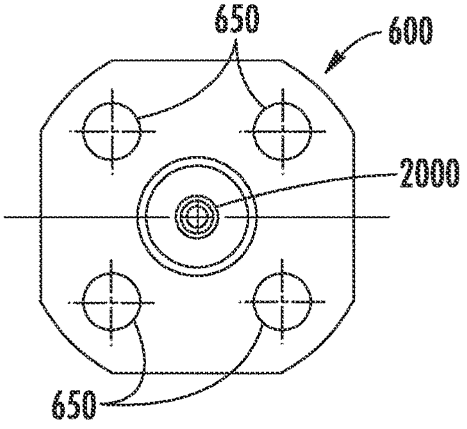
FIG. 6C is a rear view of the connector assembly shown in FIG. 6A.
Figure 6D:
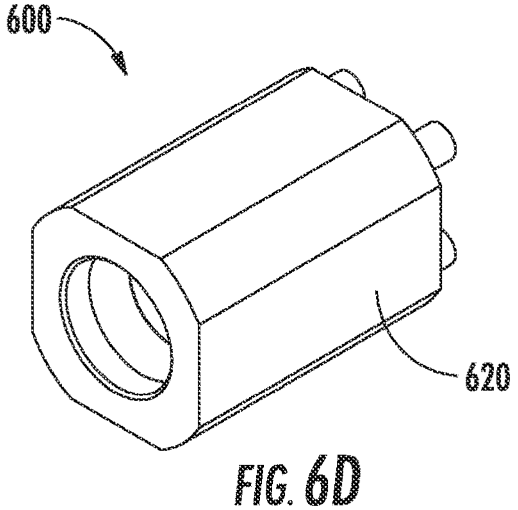
FIG. 6D is an isometric view of the connector assembly shown in FIGS. 6A-6C.
Figure 6E:
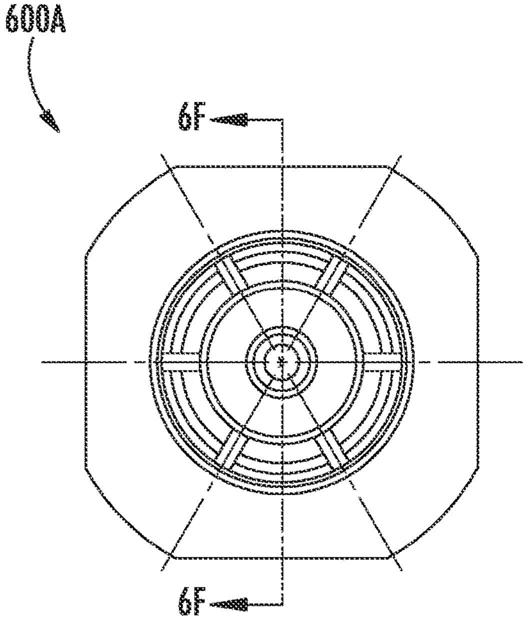
FIG. 6E is a front view of a connector-PCB assembly, including the connector assembly shown in FIG. 2A, the connector assembly shown in FIGS. 6A-6D, and a PCB.
Figure 6F:
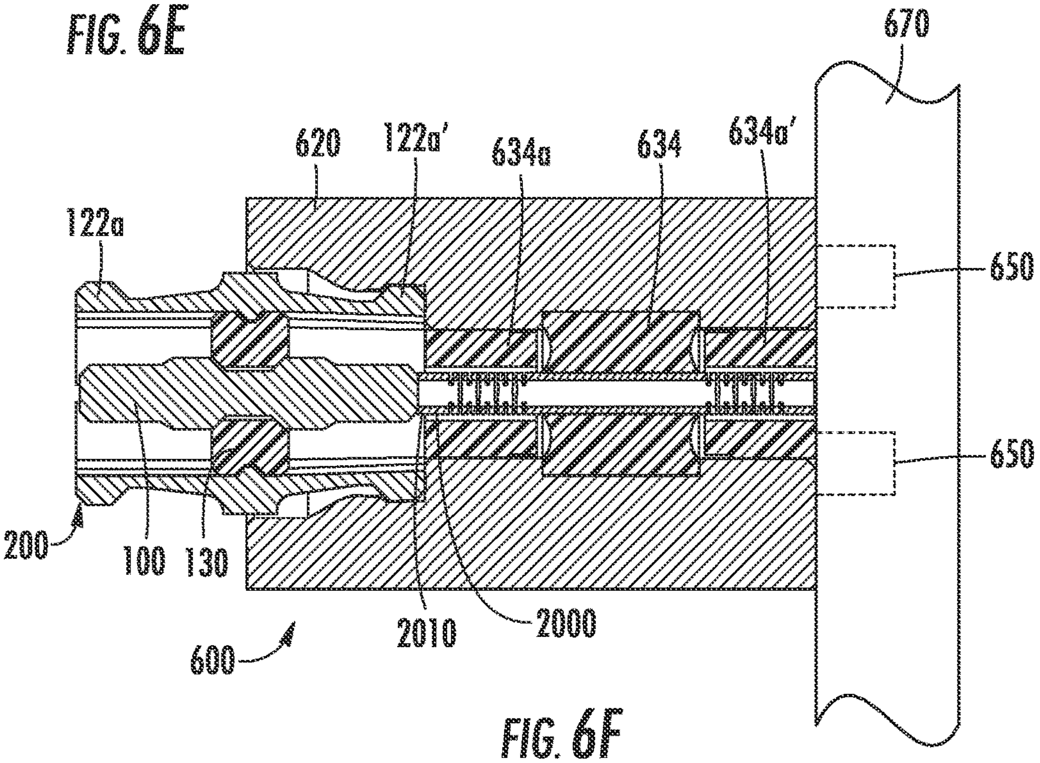
FIG. 6F is a cross-sectional view of the connector assembly shown in FIG. 6E, taken along line 6F-6F.

FIGS. 6E and 6F illustrate a connector-PCB assembly 600A, including assemblies 200, 600. Assembly 200 is partially disposed within the bore 622 such that a portion of the assembly 200 extends freely from the connector-PCB assembly 600A. The mounting legs 650 are positioned in the PCB 670.

FIGS. 7A-7D illustrate a right-angle connector assembly 700, including a compressible electrical contact 2100 in a substantially relaxed state, a primary housing 702, a side housing 704, and a bottom housing 706. The compressible electrical contact 2100 is elongated and includes a first contact end 2110, a second contact end 2120, a plurality of medial portions 2130, and a central tubular portion 2125, having a bend 2127. In this configuration, two medial portions 2130*a*, 2130*b* are included in the compressible electrical contact 2100. Each medial portion has a plurality of cut sections 2132.

The primary housing 702, side housing 704, and bottom housing 706 form a right-angle housing assembly because the bottom housing 706 is positioned about 90 degrees away from the side housing 704 when measured with respect to centerlines $C_{SH}$, $C_{BH}$. The primary housing 702 has a housing body 703 that includes a side bore 708*a* defined in a side 705 of the primary housing 702, a bottom bore 708*b* defined in the bottom 707 of the primary housing 702, and an alignment dielectric bore 708*c* defined in an interior section 709 of the primary housing 702. The alignment bore 708*c* is configured to house an alignment dielectric 730, as will be further described.

Preferably, the alignment dielectric 730, as well as other dielectrics disclosed herein, is manufactured from an organic/inorganic hybrid material, such as, for example, a low-dielectric polyimide/poly(silsesquioxane)-like nanocomposite material (sometimes referred to as "PI-PSSQ"). PI-PSSQ is advantageous because of its dielectric properties similar to glass or ceramics while still being able to be processed at lower enough temperatures which will not deteriorate the plating of the components.

The alignment dielectric 730 is preferably formed by injecting a material comprising polyimide/poly(silsesquioxane)-like nanocomposite material in a volume within the primary housing 702. The assembly with the injected material may then be heated to a temperature between about 150 C to about 380 C in a substantially dry nitrogen-based environment and allowed the connector to cool. The alignment dielectric 730 is further formed such that a contact bore 760 is disposed within the alignment dielectric that follows a contact path CP that extends from a side face 731 of the alignment dielectric 730 to a bottom face 733 of the alignment dielectric 730. Adjacent to the alignment dielectric bore 708*c* is the side bore 708*a* and the bottom bore 708*b*. The side bore 708*a* is configured to house the side housing 704 and the bottom bore 708*b* is configured to house the bottom housing 706.

Figure 7A:
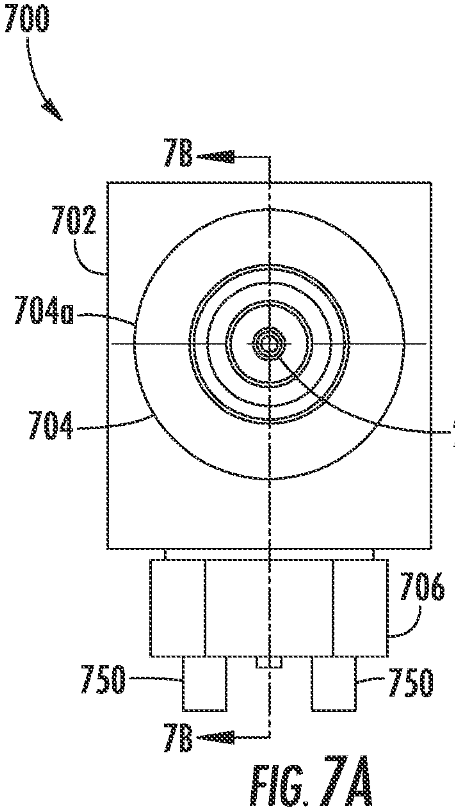
FIG. 7A is a front view of another connector assembly in accordance with embodiments disclosed herein.
Figure 7B:
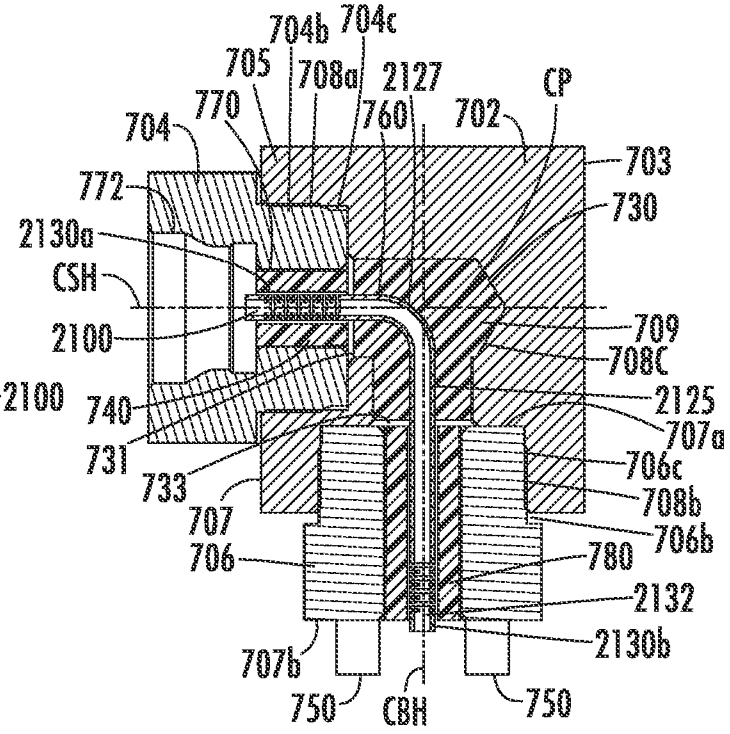
FIG. 7B is a cross-sectional view of the connector assembly shown in FIG. 7A, taken along line 7B-7B.

Referring particularly to FIG. 7B, the side housing 704 is disposed within the side bore 708*a*. The side housing 704 has an innermost bore 770 configured to house a side dielectric 740 and a contoured bore 772 configured to house connector assembly 200 (FIGS. 2A-2C). The side housing 704 preferably has a stepped-configuration, which form a plurality of outer surfaces 704*a*, 704*b*, 704*c*. Here, the second side housing surface 704*b* has an outer surface diameter larger than third side housing surface 704*c*.

The bottom housing 706 is disposed within the bottom bore 708*b*. The bottom housing 706 also preferably has a stepped-outer configuration, and includes a plurality of circular outer surfaces 706*a*, 706*b*, 706*c*. The first bottom housing surface 706*a* has an outer surface diameter larger than second bottom housing surface 706*b*, while the second bottom housing surface 706*b* has an outer surface diameter larger than third bottom housing surface 706*c*. The bottom housing additionally includes a top engagement surface 707*a* configured to mate with a corresponding inner surfaces of the primary housing 702 and a bottom engagement surface 707*b* configured to mate with a PCB 770 (FIG. 7F).

Figure 7C:
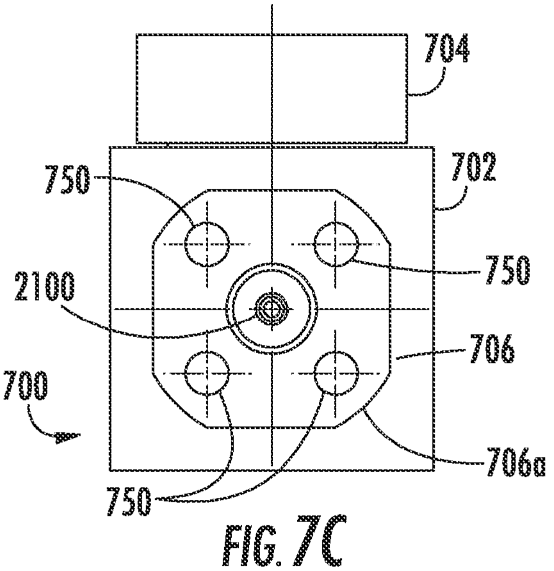
FIG. 7C is a bottom view of the connector assembly, shown in FIG. 7A.
Figure 7D:
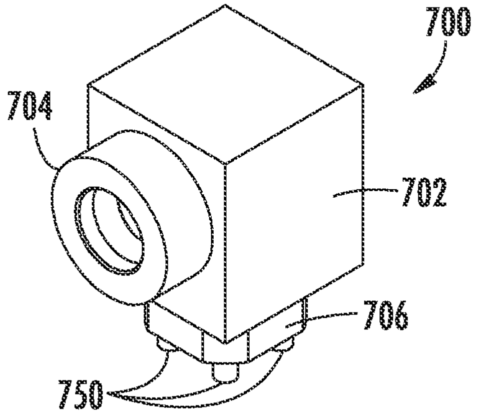
FIG. 7D is an isometric view of the connector assembly, shown in FIGS. 7A-7C.

Extending from the bottom engagement surface 707*b* are a plurality of mounting legs 750. Referring to FIG. 7C, four mounting legs 750 are shown. This number, however, is not to be construed as limiting, as fewer or more mounting legs may extend from the bottom engagement surface 707*b*. Also disposed within the bottom housing 706 is a bottom dielectric 780 positioned within the bottom dielectric bore 782.

Figure 7E:
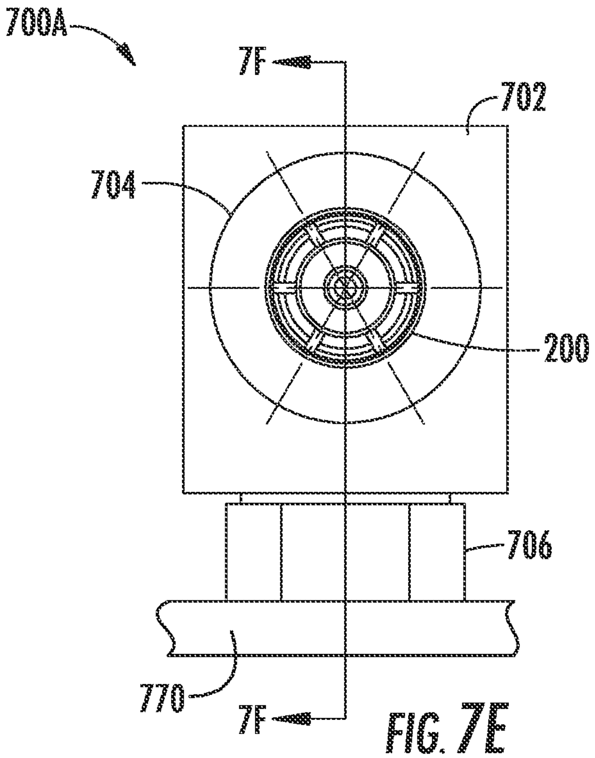
FIG. 7E is a front view of a connector-PCB assembly, including the connector assembly shown in FIG. 2A, the connector assembly shown in FIGS. 7A-7D, assembled with a PCB.
Figure 7F:
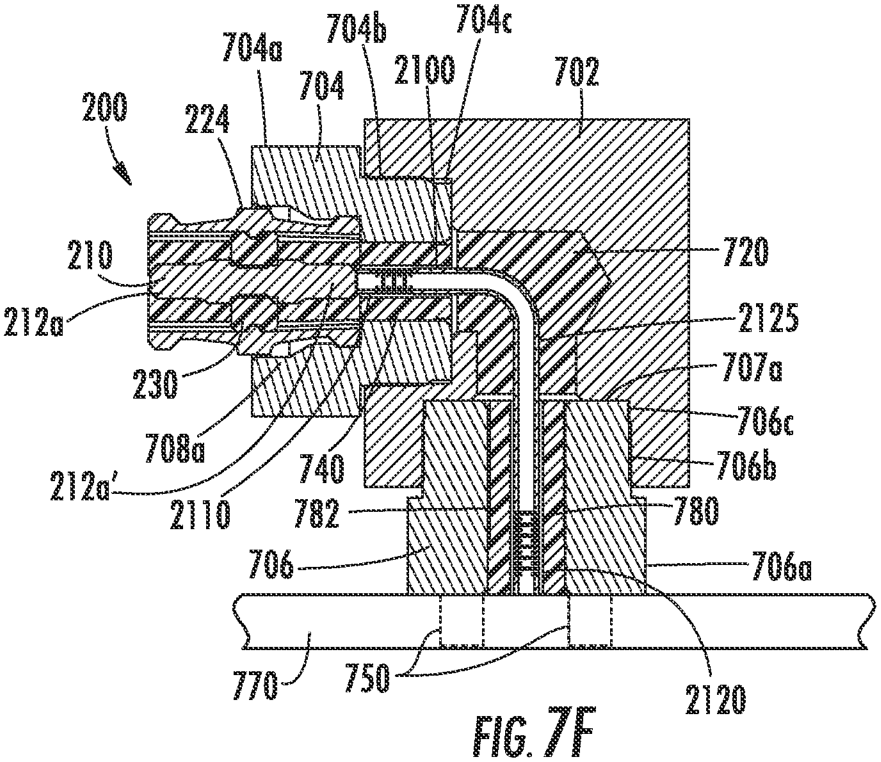
FIG. 7F is a cross-sectional view of the assembly, shown in FIG. 7E, taken along line 7F-7F.

FIGS. 7E and 7F illustrate a connector-PCB assembly 700A, including connector assembly 200 (FIGS. 2A-2C) disposed within side bore 708*a*. The connector assembly 200 is partially disposed within the side bore 708*c* such that medial housing section 224 is partially inserted into the side bore 708*a* and contact point surface 212*c* engages contact 2100, as particularly shown in FIG. 7F. The connector-PCB assembly 700A also includes a PCB coupled to the bottom engagement surface 708*b*. The mounting legs 750 are disposed within corresponding PCB mounting holes (not shown).

Figures 8A, 8B, 8C, 8D, 8E, 8F, 8G:
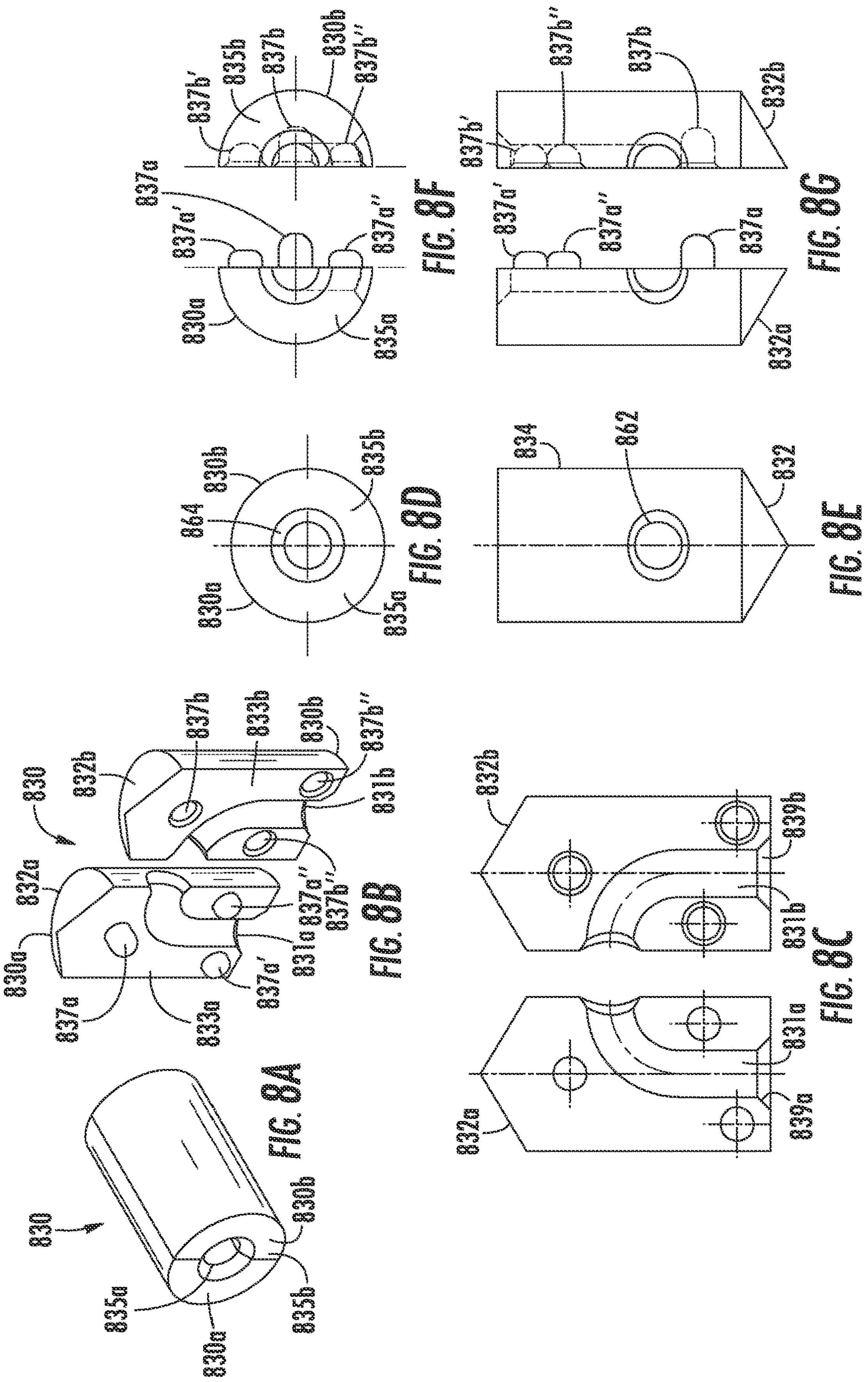
FIG. 8A is a side isometric view of an assembled pair of dielectrics in accordance with embodiments disclosed herein.
FIG. 8B shows isometric views of the pair of dielectrics shown in FIG. 8A.
FIG. 8C is a front view of the pair of dielectrics shown in FIG. 8B.
FIG. 8D is a bottom view of the assembled pair of dielectrics shown in FIG. 8A-8C.
FIG. 8E is a side view of the assembled pair of dielectrics shown in FIG. 8D.
FIG. 8F is a bottom view of the pair of dielectrics shown in FIG. 8C spaced a distance apart.
FIG. 8G is a side view of the pair of dielectrics shown in FIG. 8F spaced a distance apart.

FIGS. 8A-8G show an alignment dielectric 830 used in accordance with some embodiments disclosed herein. FIG. 8A shows a side perspective view of the dielectric 830 when halves 830*a*, 830*b* of the dielectric 830 are assembled. FIG. 8B shows the dielectric 830 positioned uprightly with the two halves 830*a*, 830*b* of the dielectric 830*a*, 830*b* separated. Each halve 830*a*, 830*b* includes a curved halve channel 831*a*, 831*b* defined therein with a chamfered edge 839*a*, 839*b*.

When assembled, the dielectric halves 830*a*, 830*b* are mated to form a substantially conical portion 832 with conical half portions 832*a*, 832*b* and a bottom portion 834 with cylinder half portions 834*a*, 834*b*. The first dielectric half 830*a* includes an interior half surface 833*a*, having a plurality of male alignment elements 837*a*, 837*a*', 837*a*", extending therefrom. The first dielectric half 830*a* also has a bottom surface 835*a*. A channel 860*a* extends from the bottom surface 835*a* to the outer surface of the cylinder half portion 834*a*. The second dielectric half 830*b* includes an interior half surface 833*b*, having a plurality of female alignment sockets 837*b*, 837*b*', 837*b*" disposed therein. The second dielectric half 830*a* also has a bottom surface 835*b*. A channel 860*b* similarly extends from the bottom surface 835*b* to the outer surface of the cylinder half portion 834*b*, forming openings 862, 864. When the halves of the dielectric 830*a*, 830*b* are assembled together, channels 831*a*, 831*b* form an enclosed channel for conductive contacts, as will be further described with respect to FIGS. 9A-9F.

FIGS. 9A-9D illustrate a connector assembly 900, including a compressible electrical contact 2200 in a substantially relaxed state, a primary housing 902, a side housing 904, a bottom housing 906, and the alignment dielectric 830. The compressible electrical contact 2200 is elongated and includes a first contact end 2210, a second contact end 2220, a plurality of medial portions 2230, and a tubular portion 2225, having bends 2227*a*, 2227*b*. A portion of the first contact end 2210 is cylindrical, while a portion of the second contact end 2220 has a plurality of longitudinally oriented u-shaped slots 2213 delineated by a plurality of openings 2215. In this configuration, three medial portions 2230*a*, 2230*b*, 2230*c* are included in the compressible electrical contact 2200. Each medial portion has a plurality of cut sections 2232 based on divaricating pattern PA.

Together, the primary housing 902, side housing 904, and bottom housing 906 form a right-angle housing assembly. The primary housing 902 has a housing body 903. Defined within the housing body 903 are a side bore 908*a*, a bottom bore 908*b*, an alignment bore 908*c*, and a dielectric bore 908*d*. The side bore 908*a* is configured to partially house the side housing 904. The bottom bore 908*b* is similarly configured to partially house the bottom housing 906. The alignment bore 908*c* is configured to house the alignment dielectric 830, as described with respect to FIGS. 8A-8G. Various elements of the alignment dielectric 830, including male alignment elements 837*a*, 837*a*', 837*a*" and female alignment sockets 837*b*, 837*b*', 837*b*", are used to position the compressible electrical contact 2200 within the primary housing 902 and facilitate routing of the compressible electrical contact 2200 into the side housing 904 and the bottom housing 906. The dielectric bore 908*d* partially houses an intermediary dielectric 930, which has a portion that extends into the bottom housing 906.

Figure 9A:
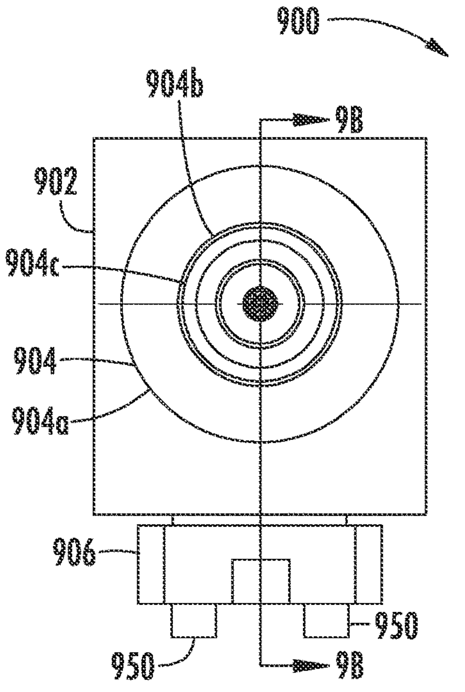
FIG. 9A is a rear view of a connector assembly in accordance with embodiments disclosed herein.
Figure 9B:
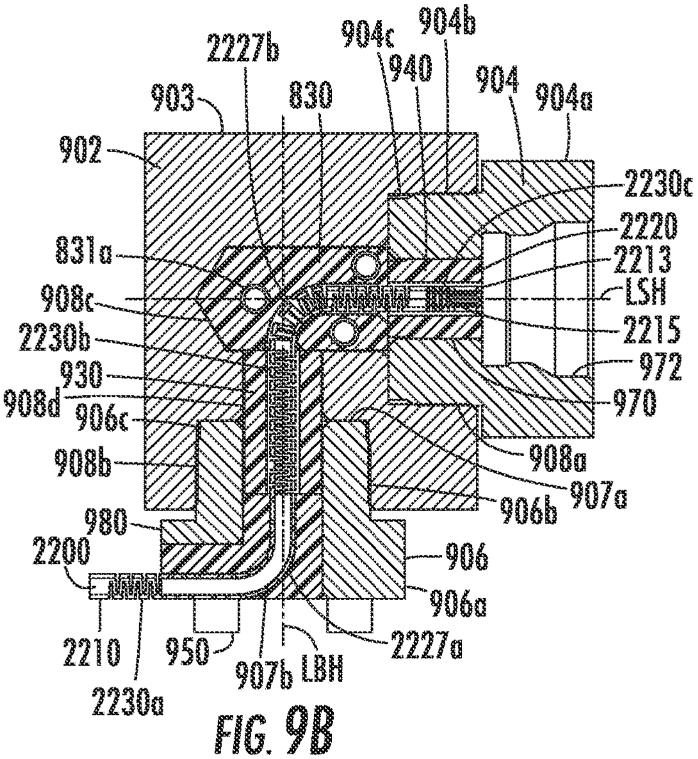
FIG. 9B is a cross-sectional view of the connector assembly shown in FIG. 9A, taken along line 9B-9B.
Figure 9C:
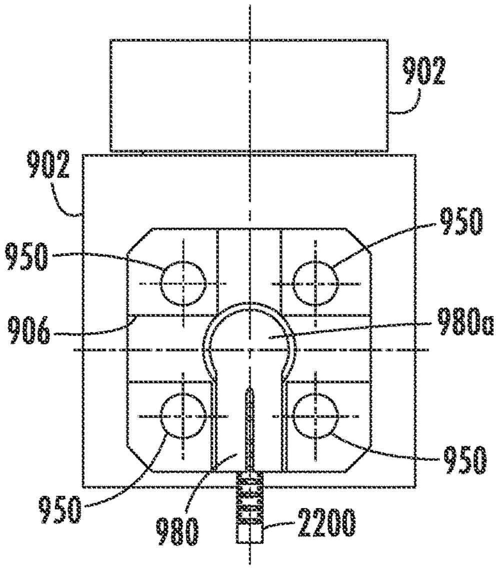
FIG. 9C is a bottom view of the connector assembly, shown in FIG. 9A.
Figure 9D:
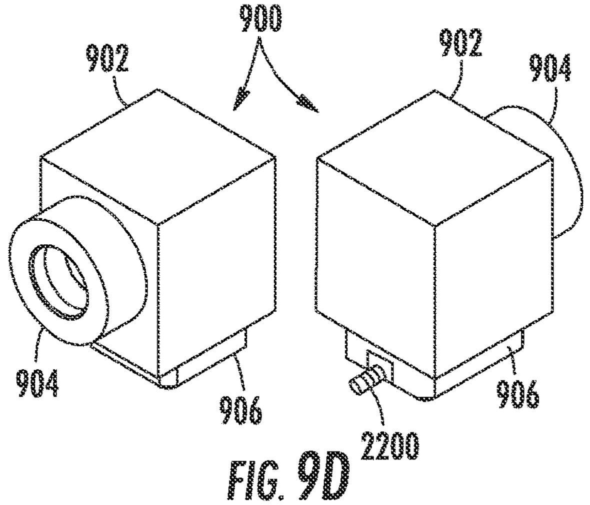
FIG. 9D shows isometric views of the connector assembly, shown in FIGS. 9A-9C.

Referring particularly to FIG. 9B, the side housing 904 is disposed within the side bore 908*a*. The side housing 904 has an innermost bore 970 configured to house a side dielectric 940 and a contoured bore 972 configured to house assembly 100 (FIGS. 1A-1C), as shown in FIG. 9F. The side housing 904 preferably has a stepped outer configuration, which forms a plurality of circular outer surfaces 904*a*, 904*b*, 904*c*. Here, the first side housing surface 904*a* has an outer surface diameter larger than the second side housing surface 904*b*, while the second side housing surface 904*b* has an outer surface diameter larger than third side housing surface 904*c*.

The bottom housing 906 is disposed within the bottom bore 908*b*. The bottom housing 906 also preferably has a stepped outer configuration, and includes a plurality of outer surfaces 906*a*, 906*b*, 906*c*. The first bottom housing surface 904*a* has an outer surface diameter larger than second bottom housing surface 904*b*, while the second bottom housing surface 904*b* has an outer surface diameter larger than third bottom housing surface 904*c*. The bottom housing further includes a top engagement surface 907*a* configured to mate with corresponding inner surfaces of the primary housing 902 and a bottom engagement surface 907*b* configured to mate with a PCB 970 (FIG. 9F). Extending from the bottom engagement surface 908*b* are a plurality of mounting legs 950. Referring to FIG. 9C, four mounting legs 950 are shown. This number, however, is not to be construed as limiting, as fewer or more mounting legs may extend from the bottom engagement surface 908*b*. Also disposed within the bottom housing 906 is a dielectric 980 positioned with a bottom dielectric bore 982. The dielectric 980 is preferably has an L-shaped cross-section, as shown in FIG. 9B. And the bottom dielectric bore 982 has a shape that is complementary to the dielectric shape.

Figure 9E:
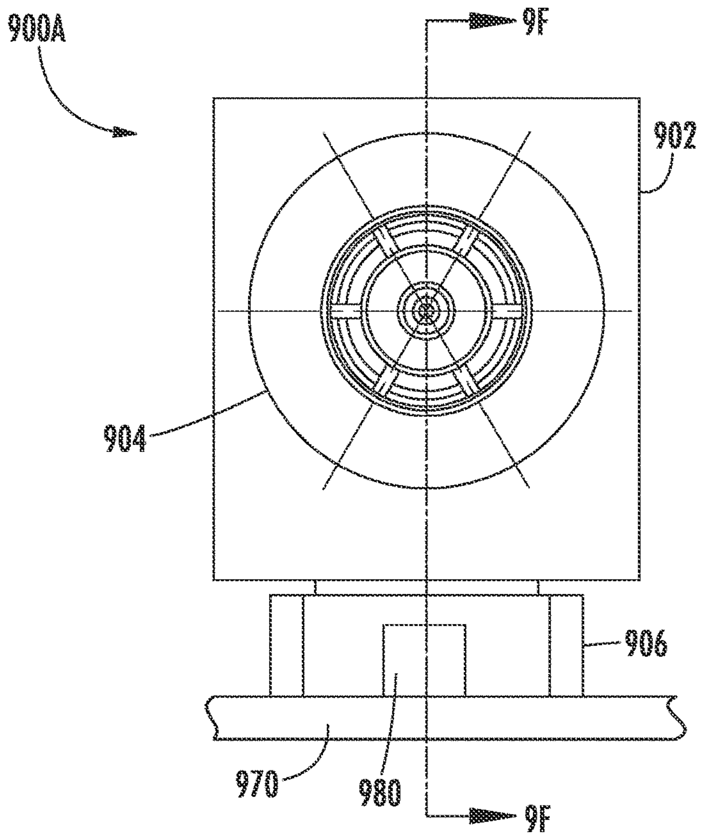
FIG. 9E is a front view of an assembly, including the connector assembly shown in FIG. 2A, the connector assembly shown in FIG. 9A, and a PCB.
Figure 9F:
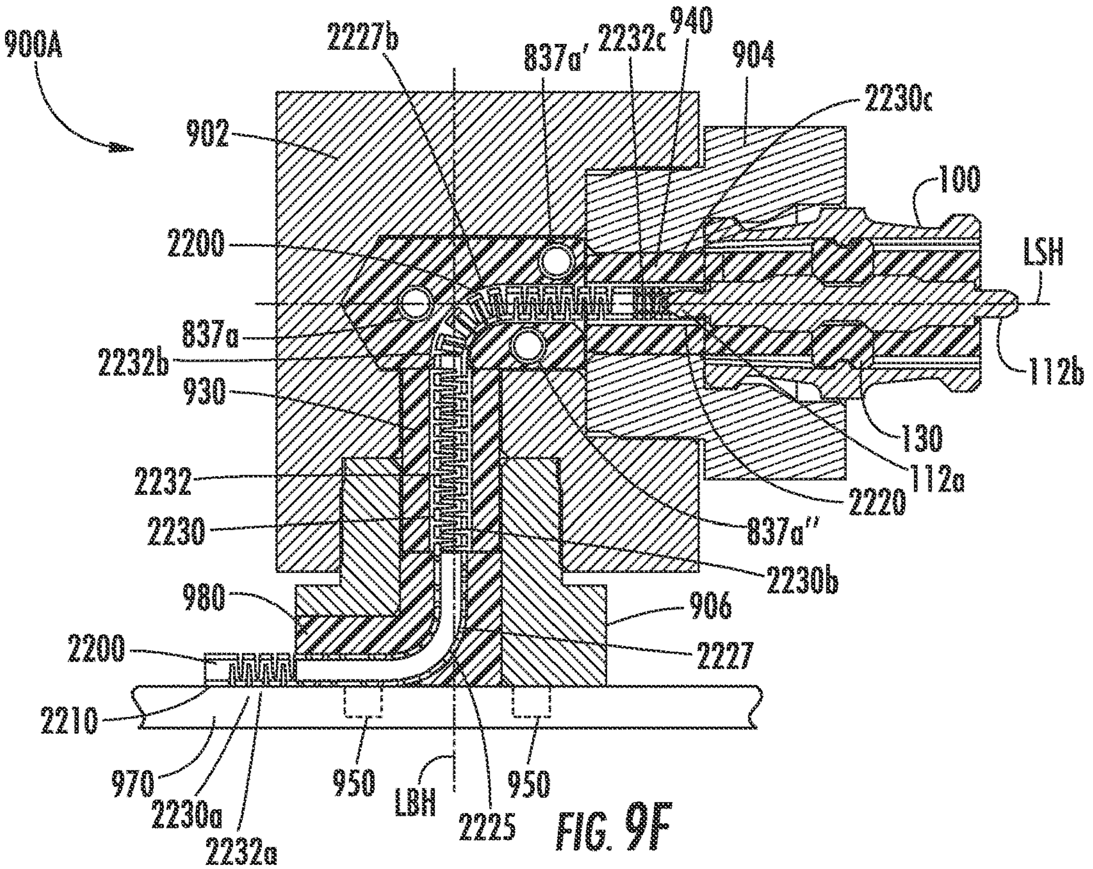
FIG. 9F is a cross-sectional view of the assembly, shown in FIG. 9E, taken along line 9F-9F.

FIGS. 9E and 9F illustrate a connector-PCB assembly 900A, including connector assembly 100 (FIGS. 1A-1C) disposed within side bore 908*a*. The connector assembly 100 is partially disposed within the side bore 908*c* such that the medial housing section 124 is partially inserted into the side bore 908*a* and contact point surface 112*c* engages contact 2200, as particularly shown in FIG. 9F. The connector-PCB assembly 900A also includes a PCB 970 coupled to the bottom engagement surface 908*b*. The mounting legs 950 are disposed within corresponding PCB mounting holes (not shown). In addition, the contact 2200 is preferably soldered to the PCB 970.

Figure 10C:
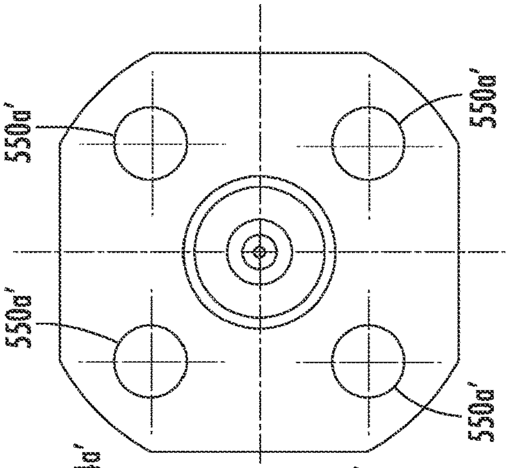
FIG. 10C is a bottom view of the connector assembly, shown in FIG. 10A.
Figure 10B:
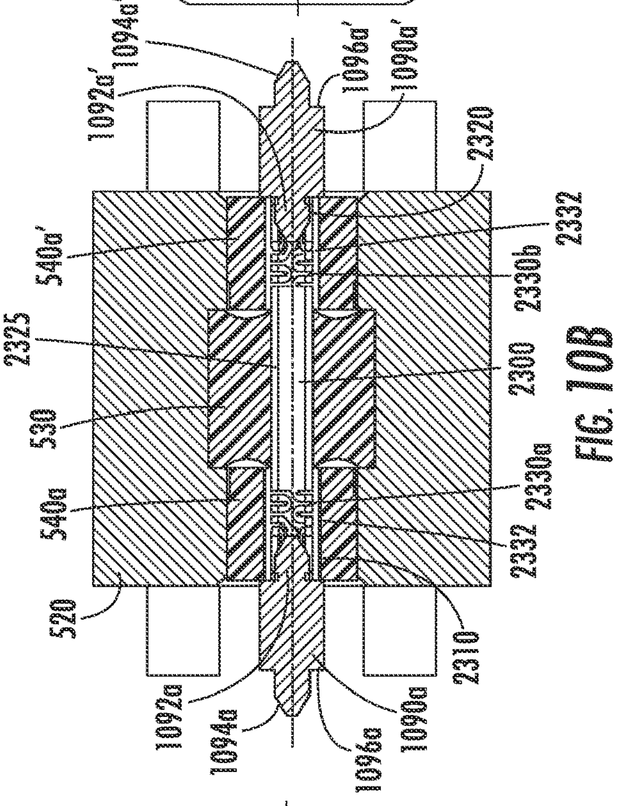
FIG. 10B is a cross-sectional view of the connector assembly shown in FIG. 10A, taken along line 10B-10B.
Figure 10A:
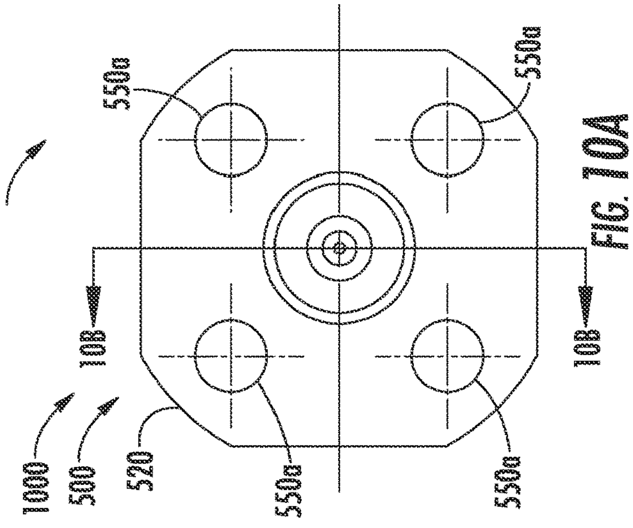
FIG. 10A is a front view of a connector assembly in accordance with embodiments disclosed herein.
Figure 10D:
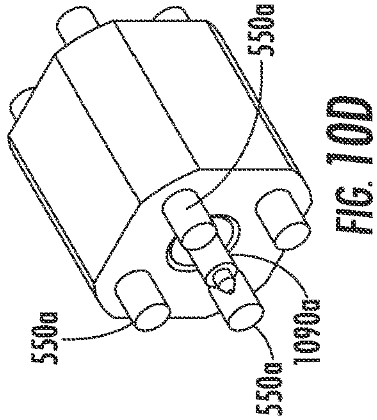
FIG. 10D is an isometric view of the connector assembly, shown in FIGS. 10A-10C.
Figure 10F:
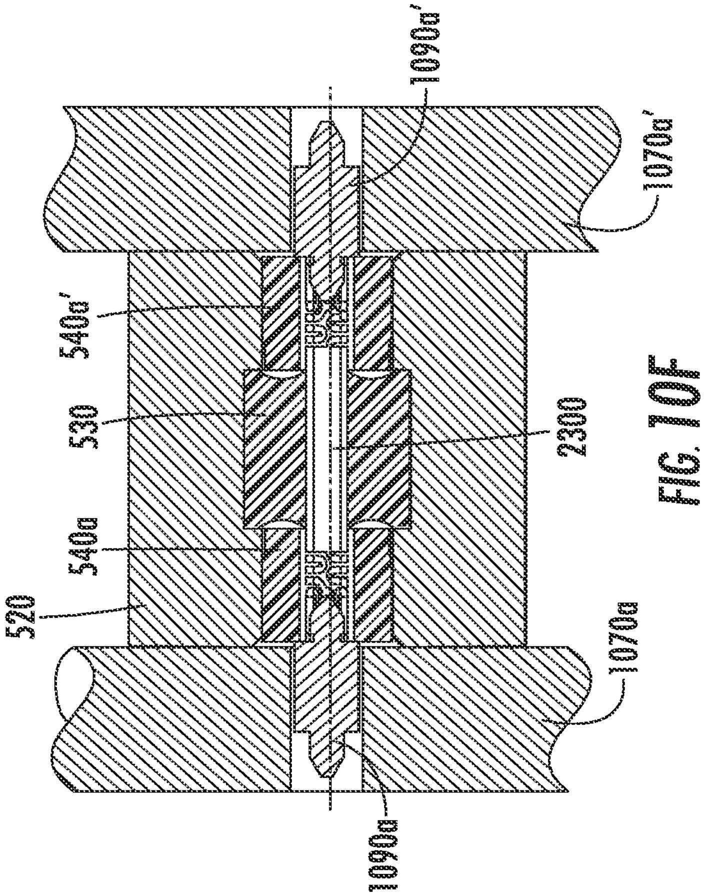
FIG. 10F is a cross-sectional view of the assembly, shown in FIG. 10E, taken along line 10F-10F.
Figure 10E:
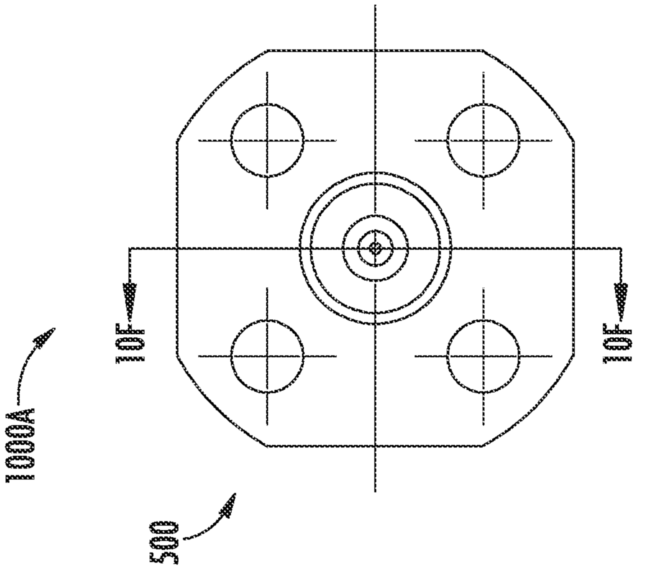
FIG. 10E is a front view of an assembly, including the connector assembly shown in FIGS. 10A-10D and two PCBs.

FIGS. 10A-10D illustrate a connector assembly 1000, including the connector assembly 500, a compressible electrical contact 2300, and pins 1090*a*, 1090*a*'. FIGS. 10E-10F illustrate a connector-PCB assembly 1000A, including PCBs 1070*a*, 1070*a*', and the connector assembly 1000. Referring particularly to FIGS. 10B and 10F, the compressible electrical contact 2300 includes a first contact end 2310, 2320, a second contact end 2320, a plurality of medial portions 2330, and a central tubular portion 2325. Portions of the first and second contact ends 2310 are cylindrical. In this configuration, two medial portions 2330*a*, 2330*b*, adjacent to each contact end 2310, 2320, are included in the compressible electrical contact 2300. Each medial portion has a plurality of cut sections 2332 based on divaricating pattern PA.

Each contact end 2310, 2320 is configured to mate with a mounting leg end portion 1092*a*, 1092*a*'. Preferably each mounting leg end portion 1092*a*, 1092*a*' is disposed within each contact end 2310, 2320 upon assembly. Each mounting leg 1090*a*, 1090*a*' also includes outer mounting leg portions 1094*a*, 1094*a*' and medial mounting leg portions 1096*a*, 1096*a*', integral with and between mounting leg portions 1094*a*, 1094*a*'.

Figures 11A, 11B, 11C, 11D:
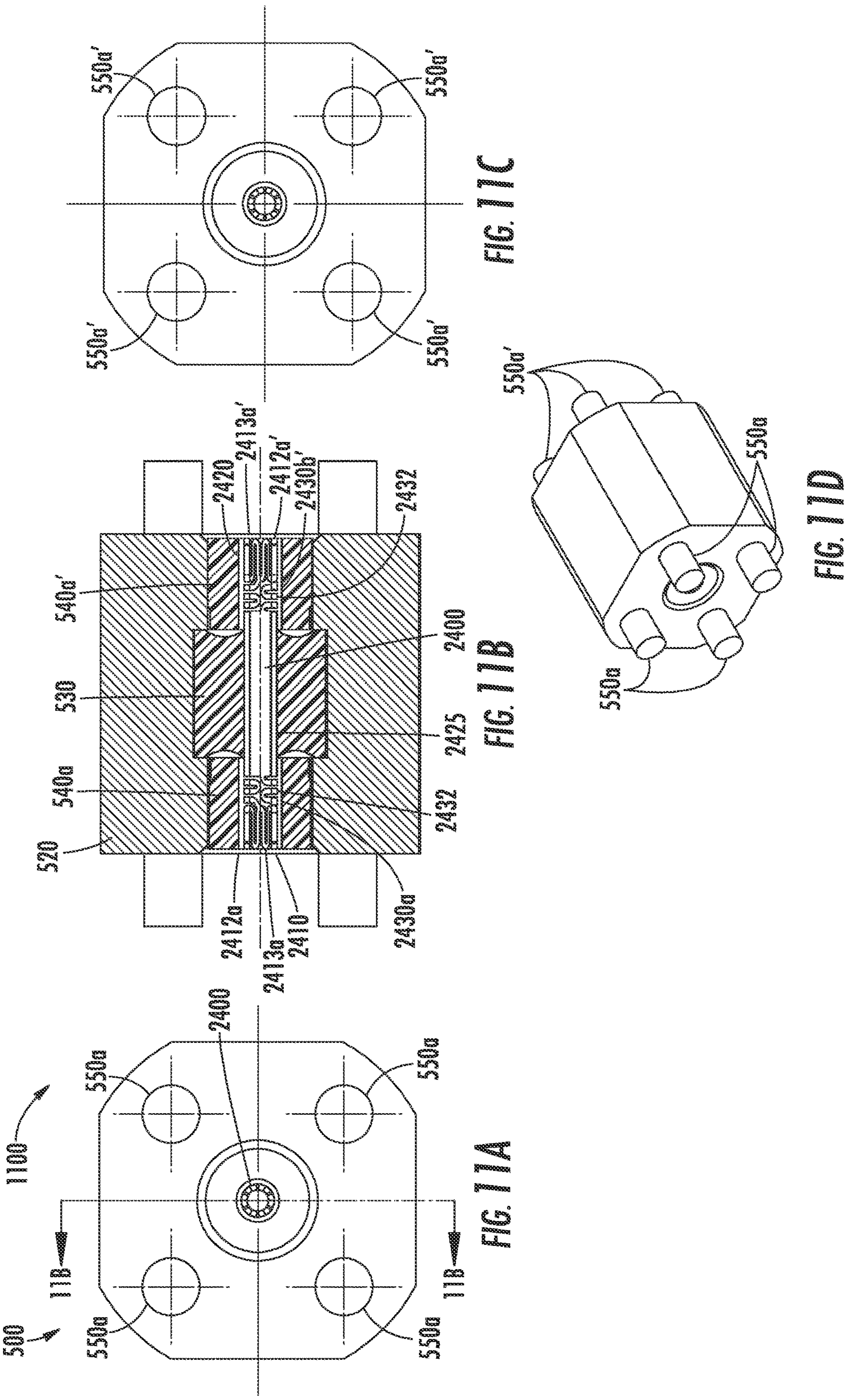
FIG. 11A is a front view of a connector assembly in accordance with embodiments disclosed herein.
FIG. 11B is a cross-sectional view of the connector assembly shown in FIG. 11A, taken along line 11B-11B.
FIG. 11C is a bottom view of the connector assembly, shown in FIG. 11A.
FIG. 11D is an isometric view of the connector assembly, shown in FIG. 11A.
Figure 11G:
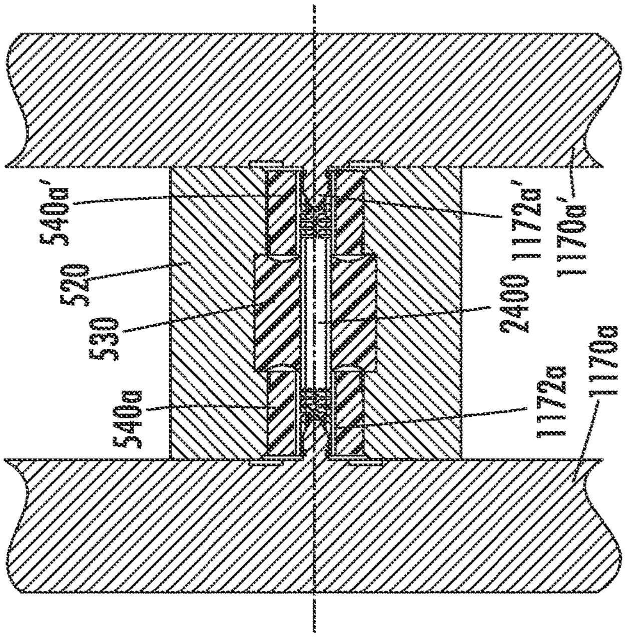
FIG. 11G is a cross-sectional view of the connector-PCB assembly shown in FIGS. 11E-11F.
Figure 11E:
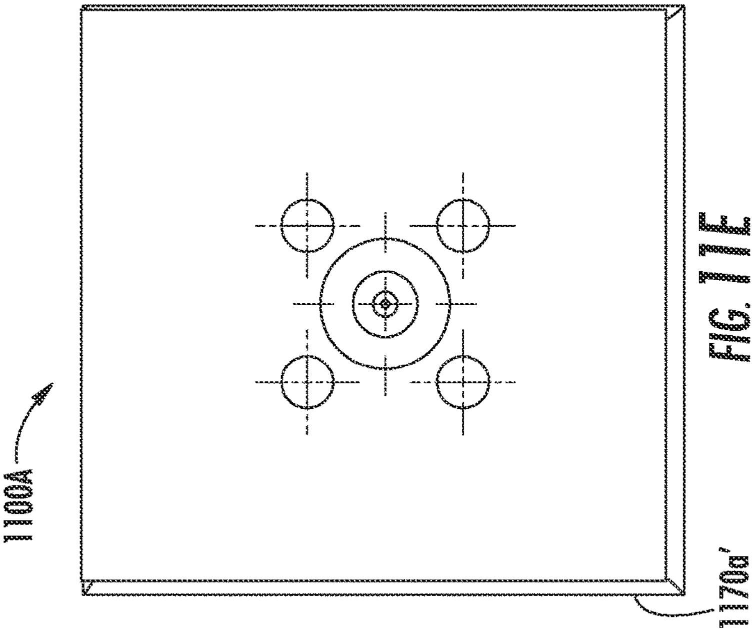
FIG. 11E is a top view of a connector-PCB assembly, including the connector assembly shown in FIGS. 11A-11C.
Figure 11F:
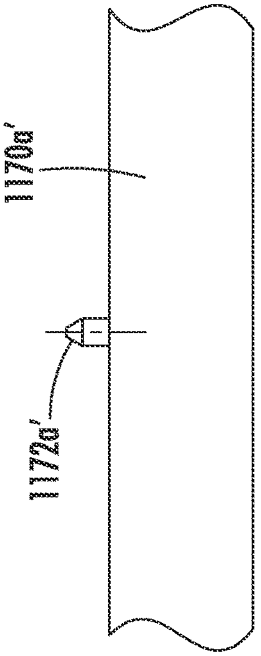
FIG. 11F is a side view of a connector-PCB assembly, including the connector assembly shown in FIGS. 11A-11C.

FIGS. 11A-11C illustrate an assembly 1100, including the connector assembly 500, and a compressible electrical contact 2400. FIGS. 11E and 11G illustrate an assembly 1100A, including PCBs 1170*a*, 1170*a*' and assembly 1100. Referring particularly to FIGS. 11B and 11G, the compressible electrical contact 2400 includes a first contact end 2410, a second contact end 2420, a plurality of medial portions 2430, and a central tubular portion 2325. In this configuration, two medial portions 2330*a*, 2330*b*, adjacent to each contact end 2310, 2320, are included in the compressible electrical contact 2300. Each medial portion has a plurality of cut sections 2332 based on divaricating pattern PA. Each contact end 2410, 2420 includes a plurality of longitudinally oriented u-shaped slots 2412*a*, 2412*a*' delineated by a plurality of openings 2413*a*, 2413*a*'. Each contact end 2410, 2420 is configured to mate with a conductive pin-shaped portion 1172*a*, 1172*a*' (FIG. 11G) which is integral with each PCB.

FIGS. 12A-12D illustrate an assembly 1200, including a center contact 2400, an outer housing 1220, a center dielectric 1230 and outer dielectrics, 1240*a*, 1240*a*'. All three dielectrics are disposed between the center contact 2400 and the outer housing 1220. The center dielectric 1230 has a center dielectric body 1234, with a first body end 1234*a* and a second dielectric end 1234*a*' opposing the first body end 1234*a*. Preferably, both ends 1234*a*, 1234*a*' have contoured faces 1235*a*, 1235*a*', as particularly shown in FIG. 12B. The center dielectric body 1234 also includes an inner annular dielectric surface 1236 and an outer annular dielectric surface 1238.

Each outer dielectric 1240*a*, 1240*a*' has an inner surface 1242*a*, 1242*a*' and at least one outer surface 1244*a*, 1244*a*'. The outer surface 1244*a* has a diameter smaller than the outer diameter of outer surface 1244*b*, in a configuration similar to that shown in FIG. 4D.

Upon assembly, each dielectric 1230, 1240*a*, 1240*a*' is surrounded by the outer housing 1220. The outer housing 1220 includes a first housing end face 1220*a* and a second housing end face 1220*a*' opposing the first housing end face 1220*a*. A plurality of mounting legs 1250*a*, 1250*a*' are disposed in bores 1260*a*, 1260*a*' and extend respectively beyond each housing end face 1220*a*, 1220*a*'. In this embodiment, four mounting legs 1250*a*, 1250*a*' are shown extending from each end face 1220*a*, 1220*a*', however, more or fewer mounting legs can be extended from each end face. The mounting legs 1250*a*, 1250*a*' are also preferably positioned symmetrically with respect to a longitudinal axis that extends through the connector assembly 1200. Each pin 1250*a*, 1250*a*' preferably has a plurality of annular grooves 1252*a*, 1252*a*' disposed therein.

Figures 12A, 12B, 12C, 12D:
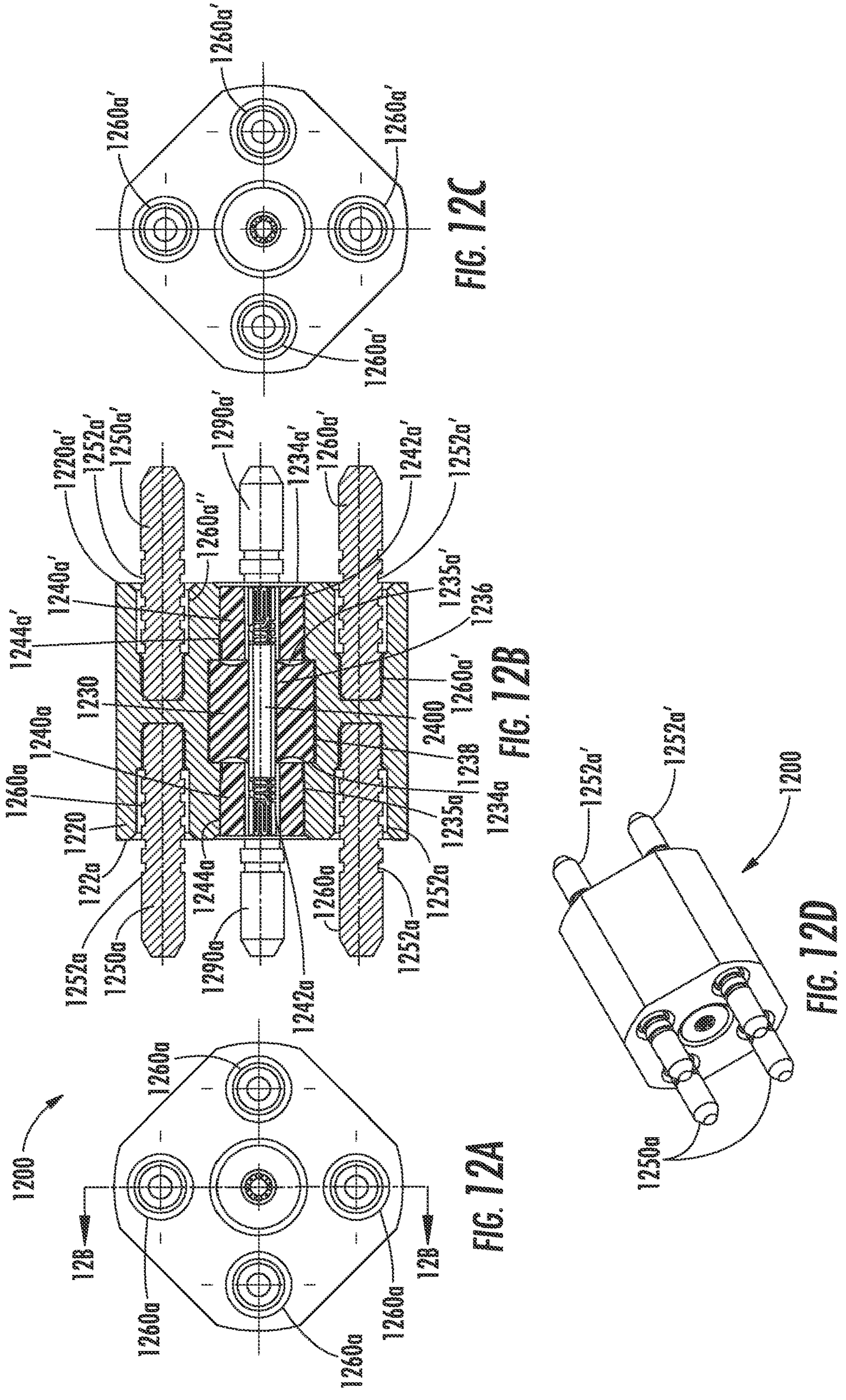
FIG. 12A is a front view of a connector assembly in accordance with embodiments disclosed herein.
FIG. 12B is a cross-sectional view of the connector assembly shown in FIG. 12A, taken along line 12B-12B.
FIG. 12C is a bottom view of the connector assembly, shown in FIG. 12A.
FIG. 12D is an isometric view of the connector assembly, shown in FIG. 12A-C.
Figure 12F:
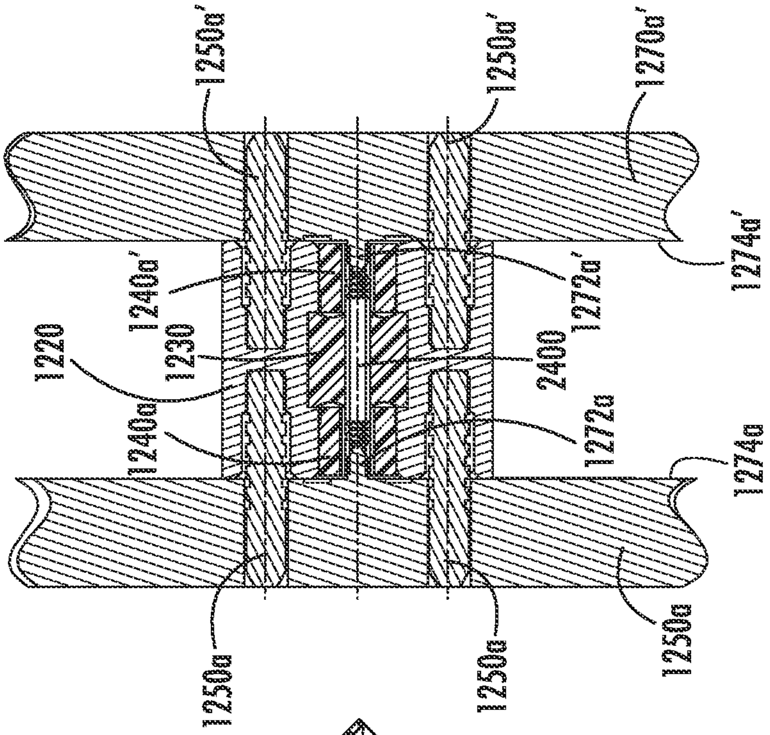
FIG. 12F is a cross-sectional view of the connector-PCB assembly, shown in FIG. 12E, taken along line 12F-12F.
Figure 12E:
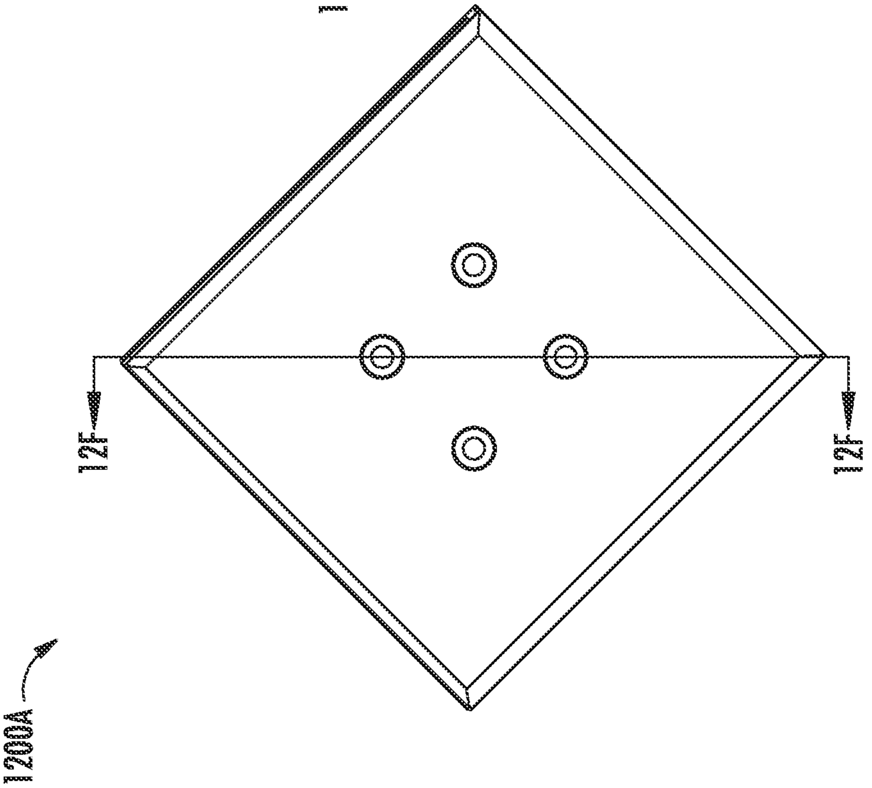
FIG. 12E is a side view of a connector-PCB assembly, including the connector 12A-12C.

FIGS. 12E-12F illustrate a connector-PCB assembly 1200A, including PCBs 1270*a*, 1270*a*', coupled to the connector assembly 1200, and specifically the outer housing 1220. FIG. 12F is a cross-sectional view of the connector assembly 1200A, taken along line 12F-12F. Each PCB 1270*a*, 1270*a*' includes bores 1272*a*, 1272*a*' having inner circular profiles that complement the outer circular profiles of the mounting legs 1250*a*, 1250*a*'. The bores 1272*a*, 1272*a*' each have a bore length, which is long enough to accommodate the full length of each mounting leg 1250*a*, 1250*a*'. Preferably, the bore length is sufficient to allow additional clearance within the bores 1272*a*, 1272*a*' even after final assembly, as particularly shown in FIG. 12E. Each PCB 1270*a*, 1270*a*' also includes an engagement surface 1274*a*, 1274*a*', including portions of which are positioned against external surfaces of the outer housing 1220 and dielectrics 1240*a*, 1240*a*'.

Referring particularly to FIG. 12F, the conductive contact 2300 has two substantially cylindrical contact ends 2310, 2320 configured to mate with a mounting leg end portion 1092*a*, 1092*a*'. Preferably each mounting leg end portion 1292*a*, 1092*a*' is disposed within each contact end 2310, 2320 upon assembly. Each mounting leg 1290*a*, 1290*a*' also includes outer mounting leg portions 1294*a*, 1294*a*' and medial mounting leg portions 1296*a*, 1296*a*'.

FIGS. 13A-13D illustrate an assembly 1300, including the center contact 2400, an outer housing 1320, a center dielectric 1330 and outer dielectrics, 1340*a*, 1340*a*'. All three dielectrics are disposed between the center contact 2400 and the outer housing 1320. The center dielectric 1330 has a center dielectric body 1334, with a first body end 1334*a* and a second dielectric end 1334*a*' opposing the first body end 1334*a*. Preferably, both ends 1334*a*, 1334*a*' have contoured faces 1335*a*, 1335*a*', as particularly shown in FIG. 13B. The center dielectric body 1334 also includes an inner annular dielectric surface 1336 and an outer annular dielectric surface 1338.

Each outer dielectric 1340*a*, 1340*a*' has an inner surface 1342*a*, 1342*a*' and at least one outer surface 1344*a*, 1344*a*'. The outer surface 1344*a* has a diameter smaller than the outer diameter of outer surface 1344*b*, in a configuration that is similar to that shown in FIG. 4D.

Upon assembly, each dielectric 1330, 1340*a*, 1340*a*' is surrounded by an outer housing 1320. The outer housing includes a first housing end face 1320*a* and a second housing end face 1320*a*' opposing the first housing end face 1320*a*. A plurality of mounting legs 1350*a*, 1350*a*' are disposed in bores 1360*a*, 1360*a*' and extend respectively beyond each housing end face 1320*a*, 1320*a*'. In this embodiment, four mounting legs 1350*a*, 1350*a*' are shown extending from each end face 1320*a*, 1320*a*', however, more or fewer mounting legs can be included on each end face. The mounting legs 1350*a*, 1350*a*' are also preferably positioned symmetrically with respect to a longitudinal axis that extends through the connector assembly 1300. Each mounting leg 1350*a*, 1350*a*' preferably has at least one longitudinal groove 1352*a*, 1352*a*'. Preferably each groove 1352*a*, 1352*a*' extends fully along the length of the mounting leg and inwardly into the mounting leg, as particularly shown in FIGS. 13A and 13C.

Figure 13A:
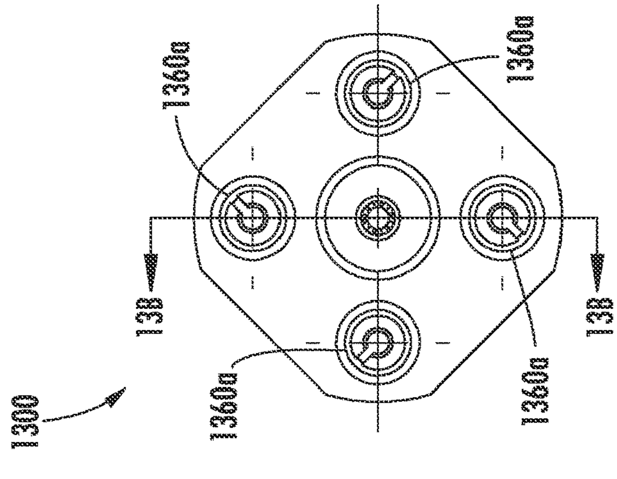
FIG. 13A is a front view of another connector assembly in accordance with embodiments disclosed herein.
Figure 13B:
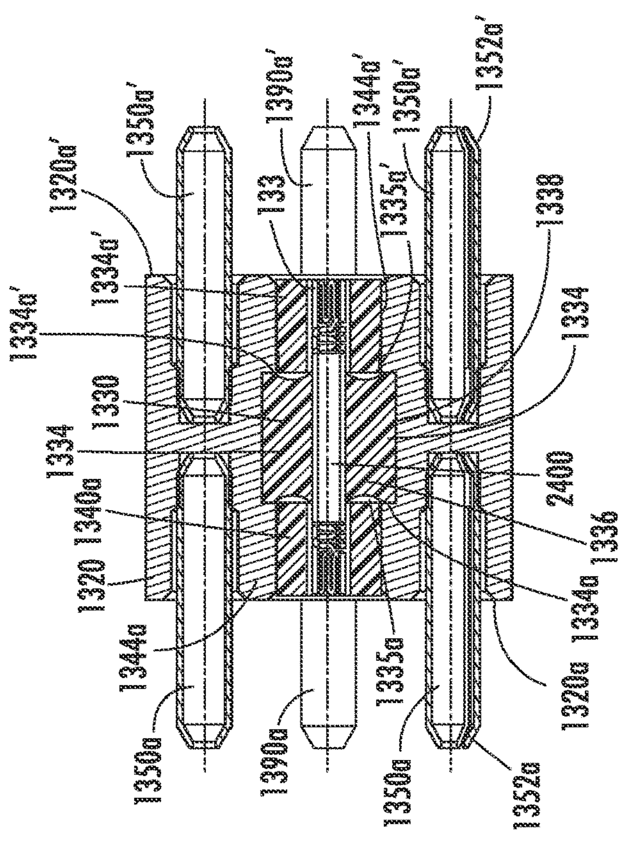
FIG. 13B is a cross-sectional view of the connector assembly shown in FIG. 13A, taken along line 13B-13B.
Figure 13C:
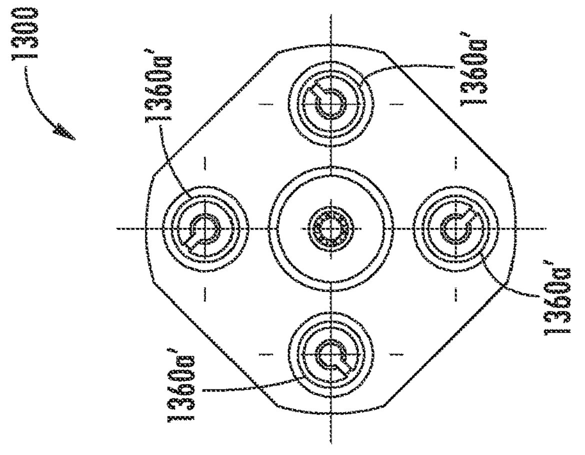
FIG. 13C is a bottom view of the connector assembly, shown in FIG. 13A.
Figure 13D:
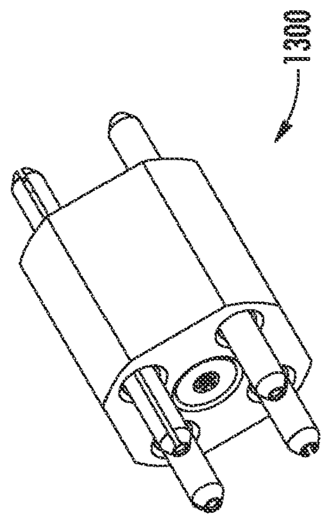
FIG. 13D is an isometric view of the connector assembly shown in FIG. 13A.
Figure 13F:
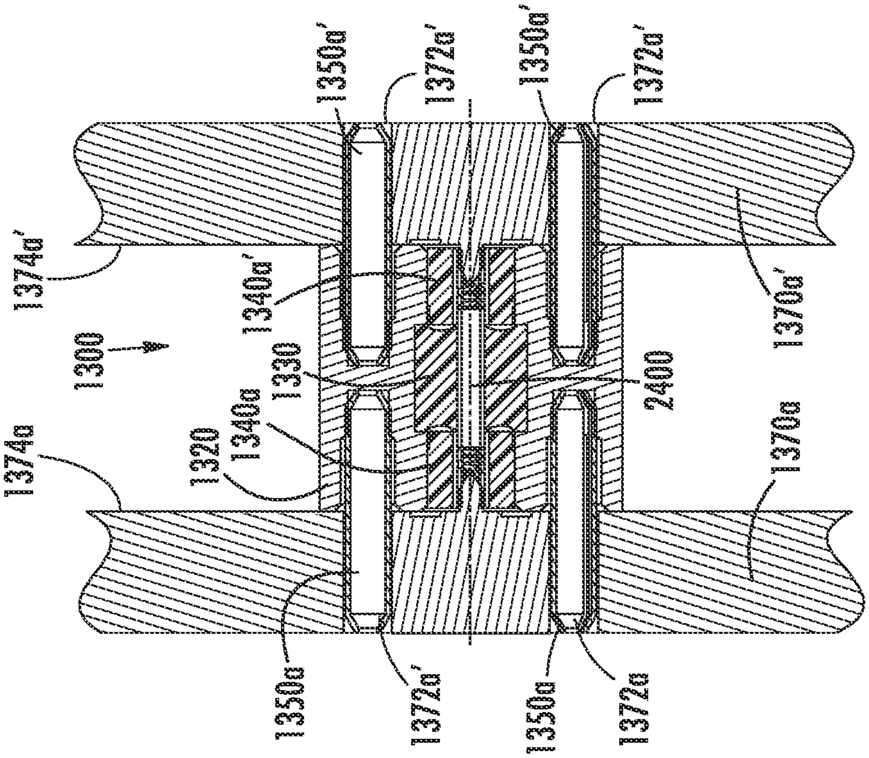
FIG. 13F is a cross-sectional view of the connector-PCB assembly t shown in FIG. 13E, taken along line 13F-13F.
Figure 13E:
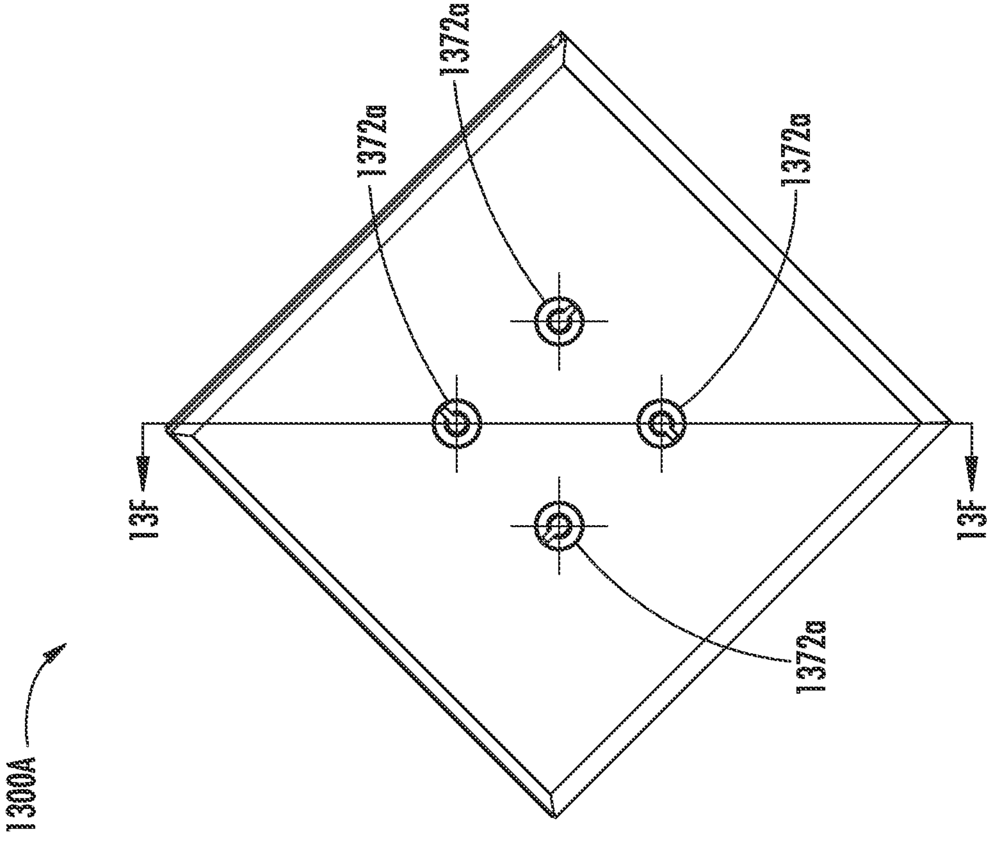
FIG. 13E is a top view of a connector-PCT assembly, including the connector assembly shown in FIGS. 13A-13D.

FIGS. 13E-13F illustrate a connector-PCB assembly 1300A, including PCBs 1370*a*, 1370*a*' coupled to the connector assembly 1300, and specifically the outer housing 1320. FIG. 13F is a cross-sectional view of the connector assembly 1300A, taken along line 13F-13F. Each PCB 1370*a*, 1370*a*' includes bores 1372*a*, 1372*a*' having inner circular profiles that complement the outer profiles of the mounting legs 1350*a*, 1350*a*'. The bores 1372*a*, 1372*a*' each have a bore length, which is long enough to accommodate the full length of each pin 1350*a*, 1350*a*'. Preferably, the bore length is sufficient to allow additional clearance within the bores 1372*a*, 1372*a*' even after final assembly, as particularly shown in FIG. 13E. Each PCB 1370*a*, 1370*a*' also includes an engagement surface 1374*a*, 1374*a*', including portions of which are positioned against external surfaces of the outer housing 1320 and dielectrics 1340*a*, 1340*a*'.

FIGS. 14A-14D illustrate an assembly 1400, including the center contact 2400, an outer housing 1420, a center dielectric 1430 and outer dielectrics 1440*a*, 1440*a*'. All three dielectrics are disposed between the center contact 2400 and the outer housing 1420. The center dielectric 1430 has a center dielectric body 1434, with a first body end 1434*a* and a second dielectric end 1434*a*' opposing the first body end 1434*a*. Preferably, both ends 1434*a*, 1434*a*' have contoured faces 1435*a*, 1435*a*', as particularly shown in FIG. 14B. The center dielectric body 1434 also includes an inner annular dielectric surface 1436 and an outer annular dielectric surface 1438.

Each outer dielectric 1440*a*, 1440*a*' has an inner surface 1442*a*, 1442*a*' and at least one outer surface 1444*a*, 1444*a*'. The outer surface 1444*a* has a diameter smaller than the outer diameter of outer surface 1444*b*, in a configuration that is similar to that shown in FIG. 4D.

Upon assembly, each dielectric 1430, 1440*a*, 1440*a*' is surrounded by an outer housing 1420. The outer housing includes a first housing end face 1420*a* and a second housing end face 1420*a*' opposing the first housing end face 1420*a*. A plurality of complaint mounting legs 1450*a*, 1450*a*' are partially disposed in bores 1460*a*, 1460*a*' such that the legs 1450*a*, 1450*a*' extend respectively beyond each housing end face 1420*a*, 1420*a*'. In this embodiment, four complaint mounting legs 1450*a*, 1450*a*' are shown extending from each end face 1420*a*, 1420*a*', however, more or fewer mounting legs can be included on each end face. The mounting legs 1450*a*, 1450*a*' are also preferably positioned symmetrically with respect to longitudinal axes that extend through the connector assembly 1400. Each pin 1450*a*, 1450*a*' preferably has a tapered element 1451*a*, 1451*a*', having channels 1452*a*, 1452*a*' that extend partially through each taper element 1451*a*, 1451*a*', allowing for expansion and contraction of the mounting legs 1450*a*, 1450*a*' upon insertion and extraction in a PCB.

Figure 14C:
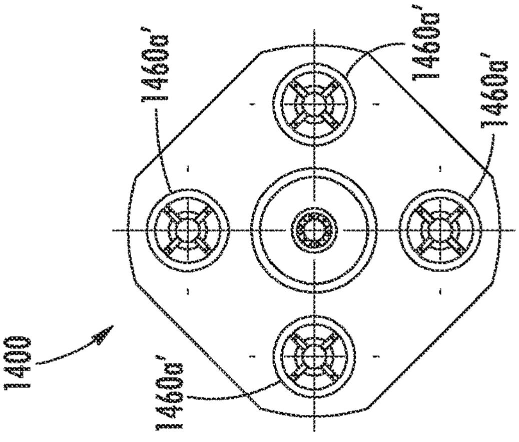
FIG. 14C is a bottom view of the connector assembly, shown in FIG. 14A.
Figure 14B:
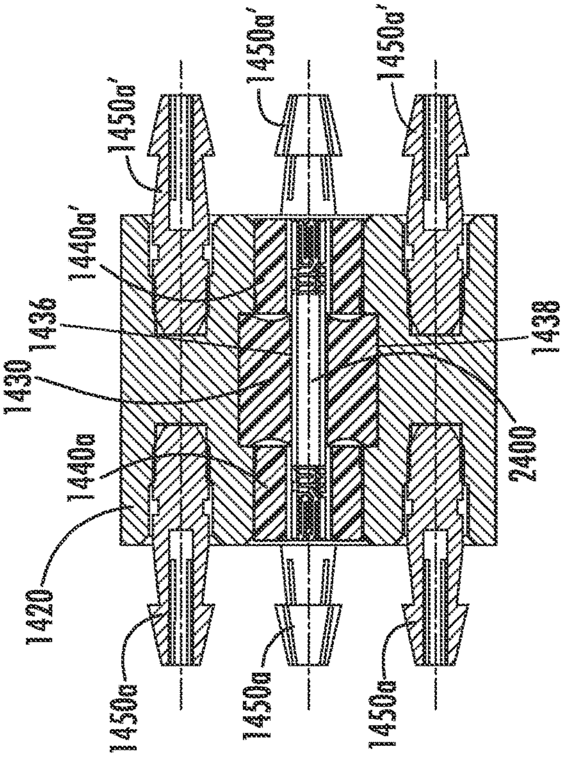
FIG. 14B is a cross-sectional view of the connector assembly shown in FIG. 14A, taken along line 14B-14B.
Figure 14D:
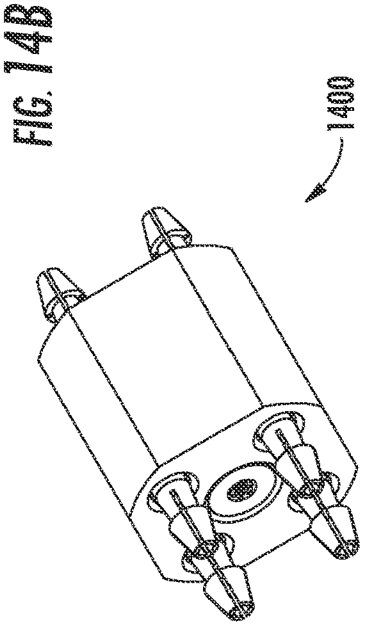
FIG. 14D is an isometric view of the connector assembly shown in FIG. 14A.
Figure 14A:
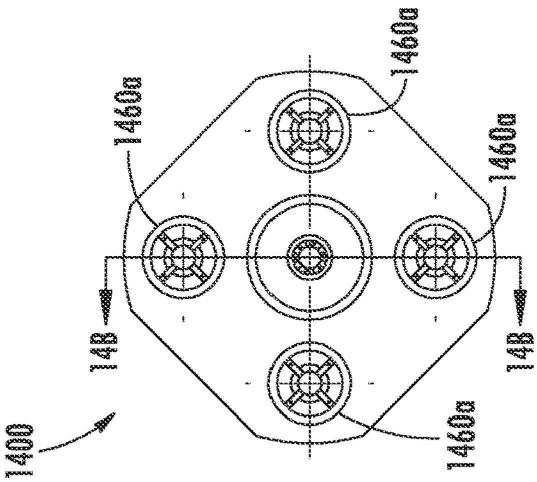
FIG. 14A is a front view of a connector assembly in accordance with embodiments disclosed herein.
Figure 14F:
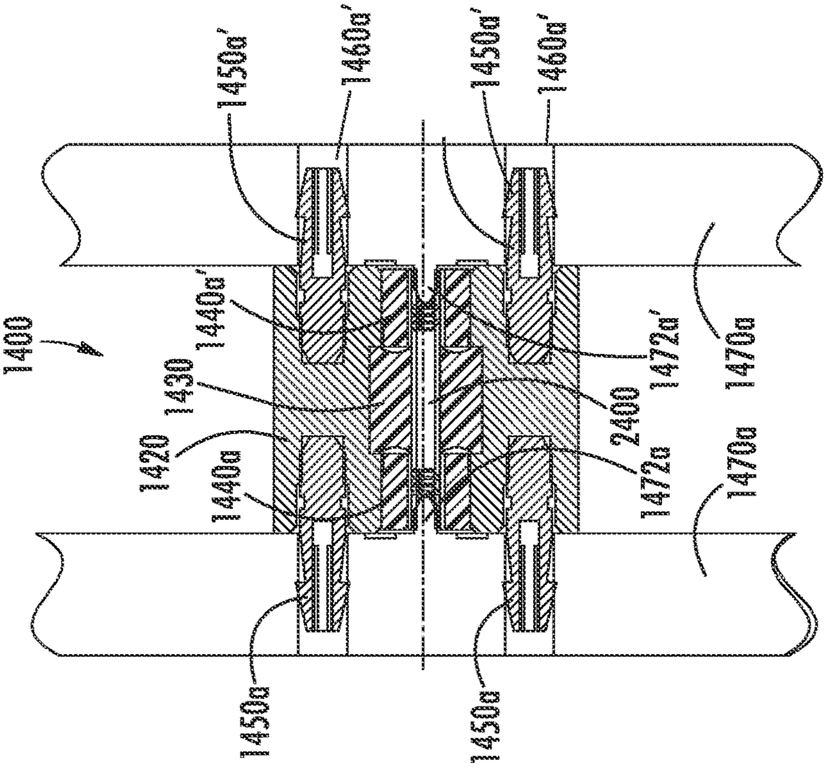
FIG. 14F is a cross-sectional view of the connector-PCB assembly t shown in FIG. 14E, taken along line 14F-14F.
Figure 14E:
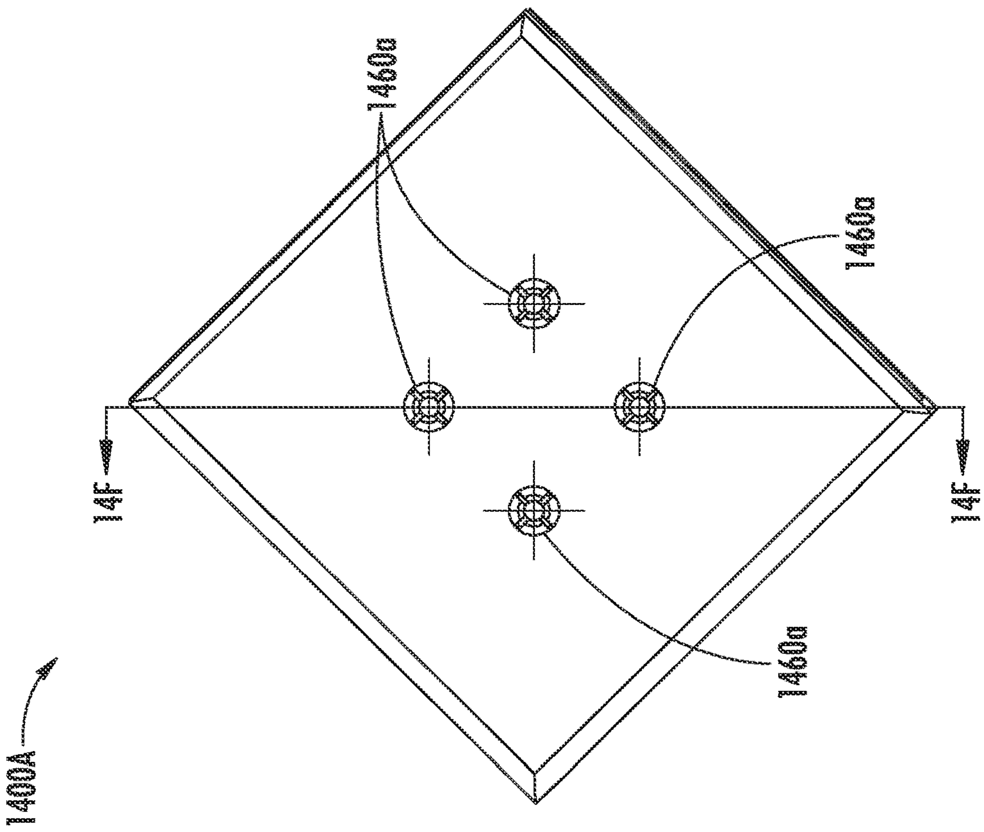
FIG. 14E is a top view of a connector-PCT assembly, including the connector assembly shown in FIGS. 14A-14D.

FIGS. 14E-14F illustrate a connector-PCB assembly 1400A, including PCBs 1470*a*, 1470*a*' coupled to the connector assembly 1400, and specifically the outer housing 1420. FIG. 14F is a cross-sectional view of the connector assembly 1400A, taken along line 14F-14F. Each PCB 1470*a*, 1470*a*' includes bores 1472*a*, 1472*a*' having inner circular profiles for positioning of the mounting legs 1450*a*, 1450*a*' therein. The bores 1450*a*, 1450*a*' each have a bore length, which is long enough to accommodate the full length of each mounting leg 1450*a*, 1450*a*'. Preferably, the bore length is also sufficient to allow additional clearance within the bores 1472*a*, 1472*a*' even after final assembly, as particularly shown in FIG. 14F. Each PCB 1470*a*, 1470*a*' also includes an engagement surface 1474*a*, 1474*a*', including portions of which are positioned against external surfaces of the outer housing 1420 and dielectrics 1440*a*, 1440*a*'.

FIGS. 15A-15D illustrate an assembly 1500, including the center contact 2400, an outer housing 1520, a center dielectric 1530 and outer dielectrics, 1540*a*, 1540*a*'. All three dielectrics are disposed between the center contact 2400 and the outer housing 1520. The center dielectric 1530 has a center dielectric body 1534, with a first body end 1534*a* and a second dielectric end 1534*a*' opposing the first body end 1534*a*. Preferably, both ends 1534*a*, 1534*a*' have contoured faces 1535*a*, 1535*a*', as particularly shown in FIG. 15B. The center dielectric body 1534 also includes an inner annular dielectric surface 1536 and an outer annular dielectric surface 1538.

Each outer dielectric 1540*a*, 1540*a*' has an inner surface 1542*a*, 1542*a*' and at least one outer surface 1544*a*, 1544*a*'. The outer surface 1544*a* has a diameter smaller than the outer diameter of outer surface 1544*b*, in a configuration similar to that shown in FIG. 4D.

Upon assembly, each dielectric 1530, 1540*a*, 1540*a*' is surrounded by an outer housing 1520. The outer housing includes a first housing end face 1520*a* and a second housing end face 1520*a*' opposing the first housing end face 1520*a*. A plurality of mounting legs 1550*a*, 1550*a*' are disposed in bores 1560*a*, 1560*a*' and extend respectively beyond each housing end face 1520*a*, 1520*a*'. In this embodiment, four mounting legs 1550*a*, 1550*a*' are shown extending from each end face 1520*a*, 1520*a*', however, more or fewer mounting legs can be included on each end face. The mounting legs 1550*a*, 1550*a*' are also preferably positioned symmetrically with respect to longitudinal axes that extends through the connector assembly 1500. Each pin 1550*a*, 1550*a*' preferably has a plurality of axial grooves 1552*a*, 1552*a*' disposed therein.

Figure 15C:
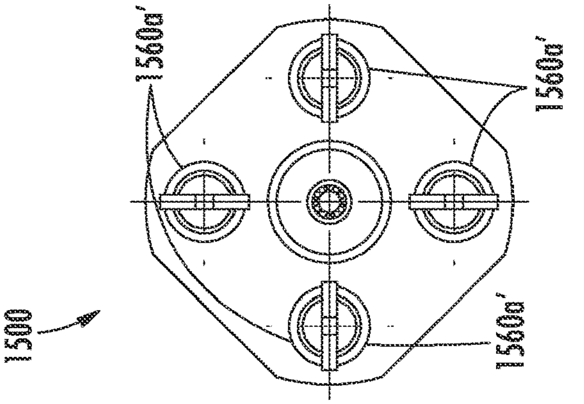
FIG. 15C is a bottom view of the connector assembly, shown in FIG. 15A.
Figure 15B:
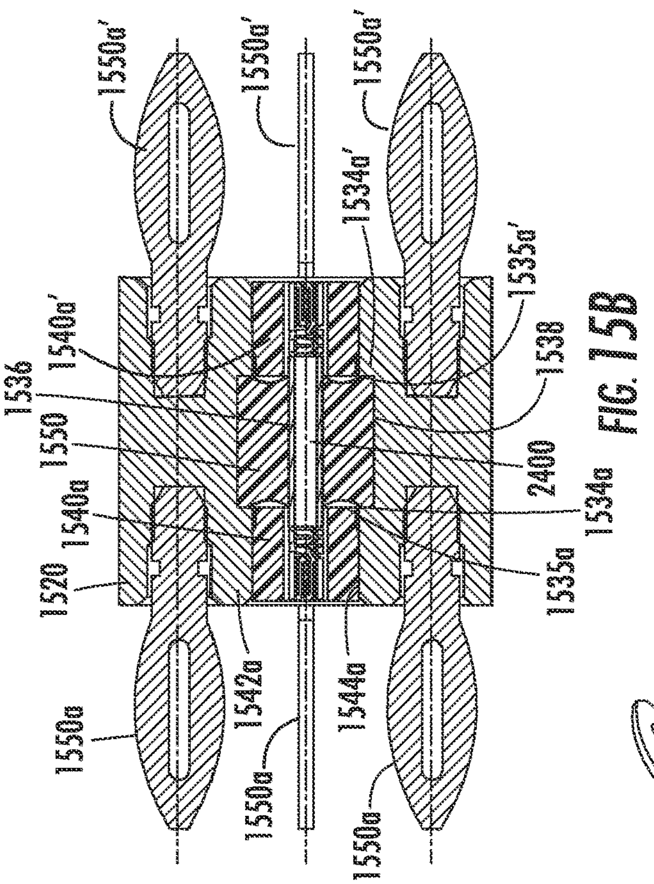
FIG. 15B is a cross-sectional view of the connector assembly shown in FIG. 15A, taken along line 15B-15B.
Figure 15A:
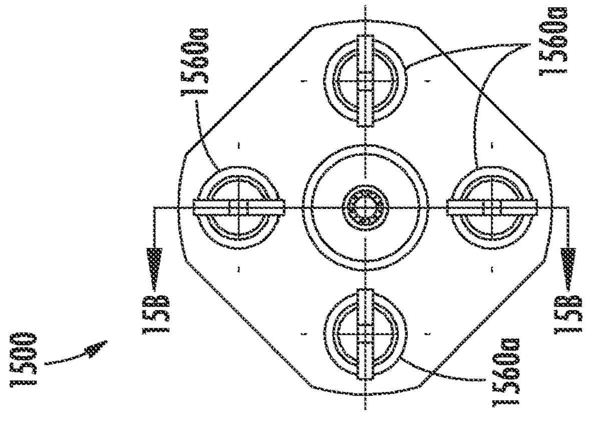
FIG. 15A is a front view of a connector assembly in accordance with embodiments disclosed herein.
Figure 15D:
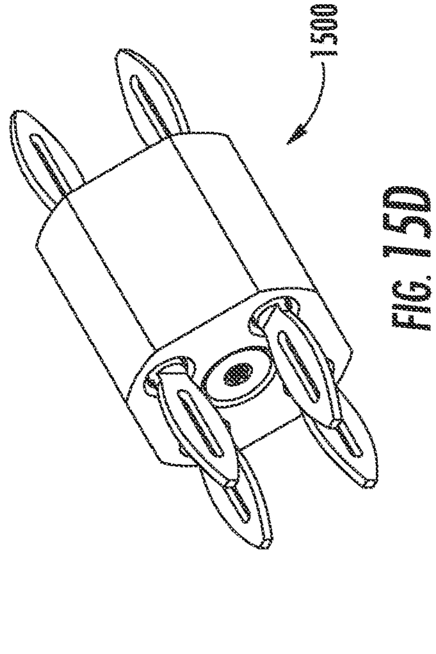
FIG. 15D is an isometric view of the connector assembly, shown in FIGS. 15A-15C.
Figure 15F:
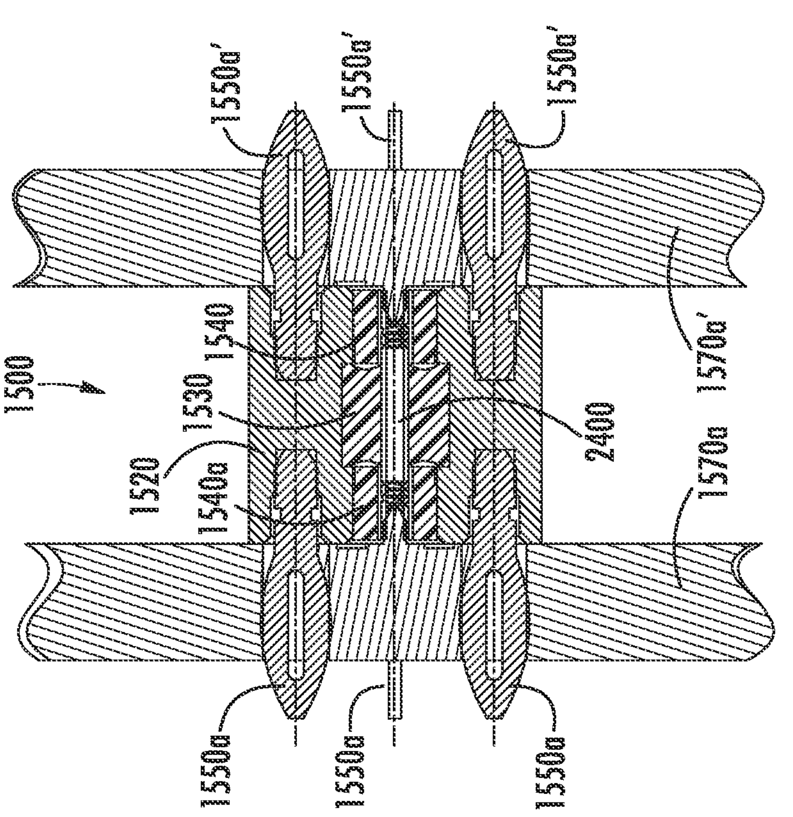
FIG. 15F is a cross-sectional view of the connector-PCB assembly, shown in FIG. 15E.
Figure 15E:
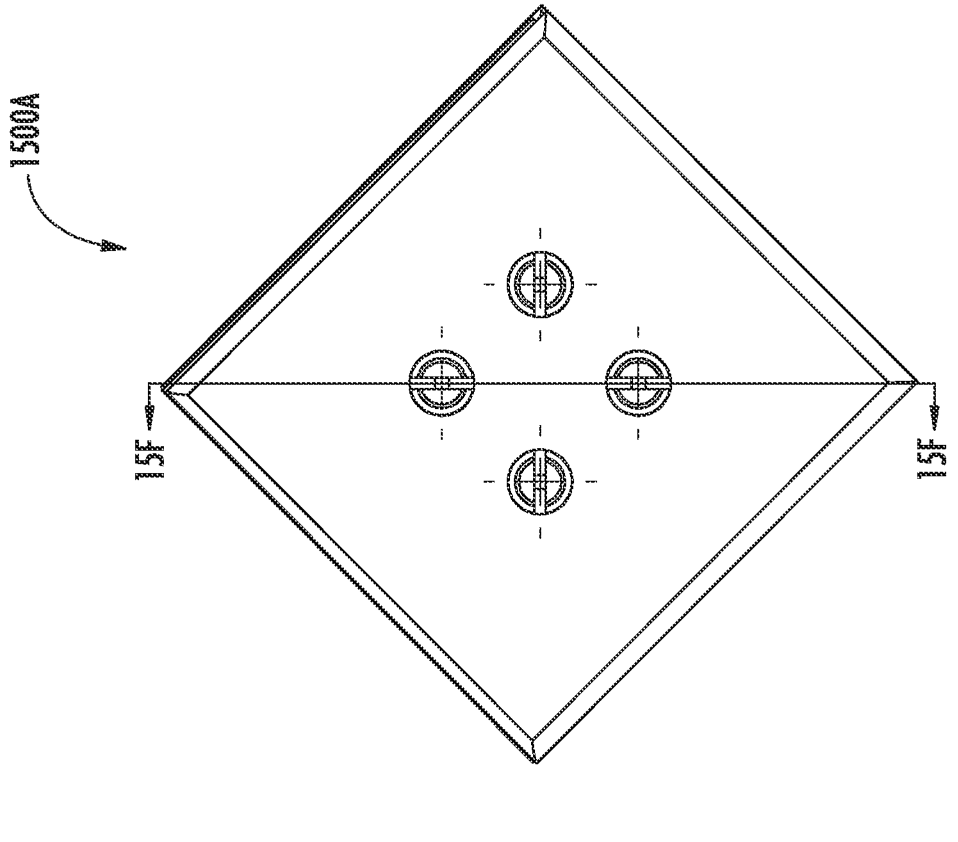
FIG. 15E is a front view of a connector-PCB assembly, including the connector assembly shown in FIGS. 15A-15C and PCBs.

FIGS. 15E-15F illustrate a connector-PCT assembly 1500A, including PCBs 1570*a*, 1570*a*' coupled to the connector assembly 1500, and specifically the outer housing 1520, while FIG. 15F is a cross-sectional view of the connector assembly 1500A, taken along line 15F-15F. Each PCB 1570*a*, 1570*a*' includes bores 1572*a*, 1572*a*' having inner circular profiles configured to accommodate the outer circular profiles of the mounting legs 1550*a*, 1550*a*'. The bores 1572*a*, 1572*a*' each have a bore length, which is long enough to accommodate the full length of each pin 1550*a*, 1550*a*'. Preferably, the bore length is sufficient to allow additional clearance within the bores 1572*a*, 1572*a*' even after final assembly, as particularly shown in FIG. 15E. Each PCB 1570*a*, 1570*a*' also includes an engagement surface 1574*a*, 1574*a*', including portions of which are positioned against external surfaces of the outer housing 1520 and dielectrics 1540*a*, 1540*a*'.

Figure 16B:
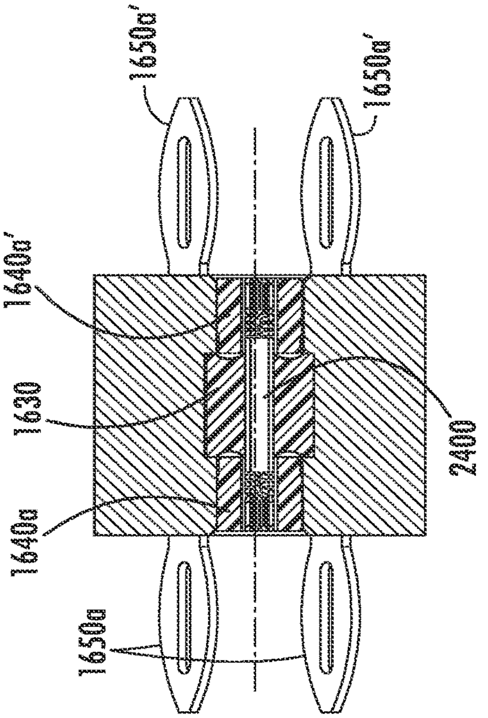
FIG. 16B is a cross-sectional view of the connector assembly shown in FIG. 16A, taken along line 16B-16B.
Figure 16A:
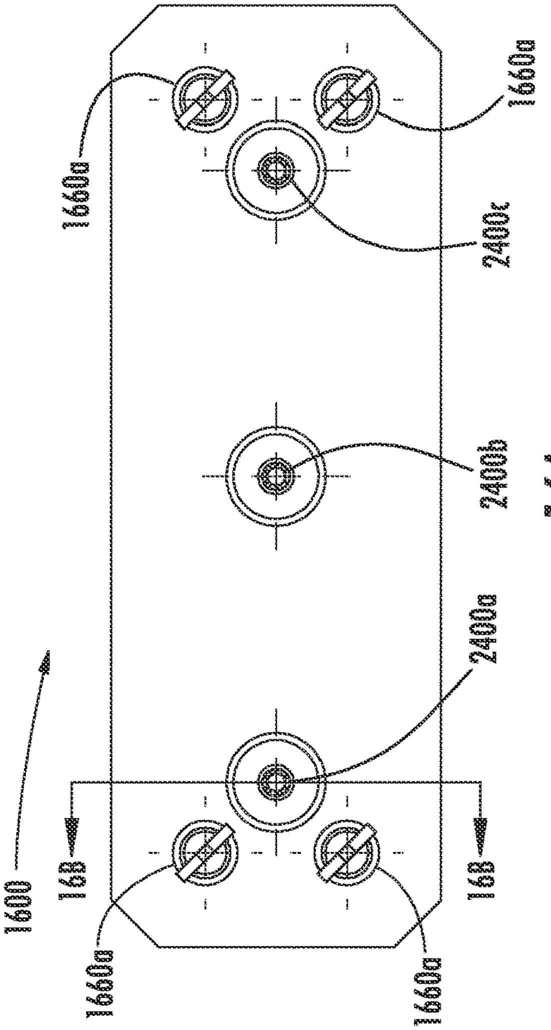
FIG. 16A is a front view of a connector assembly in accordance with embodiments disclosed herein.
Figure 16C:
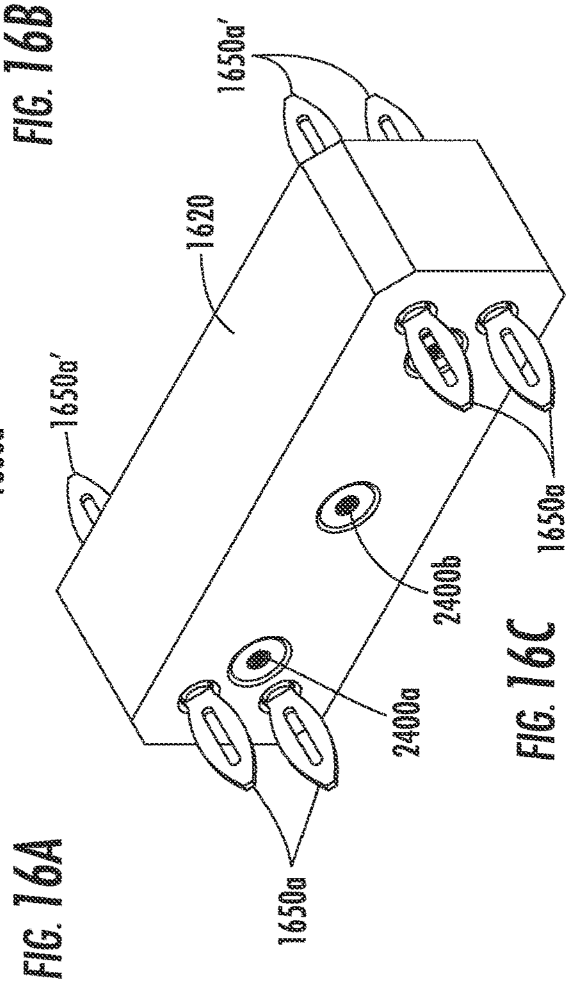
FIG. 16C is an isometric view of the connector assembly shown in FIG. 16A.

FIGS. 16A-16C illustrate an assembly 1600, including a plurality of collapsible electrical contacts 2400*a*, 2400*b*, 2400*c*, an outer housing 1620, a plurality of center dielectrics 1630*a*, 1630*b*, 1630*c* and outer dielectrics, 1640*a*, 1640*a*', 1640*b*, 1640*b*', 1640*c*, 1640*c*'. Each center dielectric 1630*a*, 1630*b*, 1630*c* has a center dielectric body 1634*a*, 1634*b*, 1634*c*, with a first body end 1634*a*, 1634*b*, 1634*c* and a second dielectric end 1634*a*', 1634*b*', 1634*c*' opposing its respective first body end. Preferably the ends of each center dielectric has contoured faces 1635*a*, 1635*a*', 1635*b*, 1635*b*', 1635*c*, 1635*c*'. Each center dielectric body 1634*a*, 1634*b*, 1634*c* also includes respective inner annular dielectric surfaces 1636*a*, 1636*b*, 1636*c* an outer annular dielectric surface 1638*a*, 1638*b*, 1638*c*.

Each outer dielectric 1640*a*, 1640*a*', 1640*b*, 1640*b*, 1640*c*, 1640*c*' has an inner surface 1642*a*, 1642*a*', 1642*b* (not shown), 1642*b*' (not shown), 1642*c* (not shown), 1642*c*' (not shown) and at least one outer surface 1644*a*, 1644*a*', 1644*b* (not shown), 1644*b*' (not shown), 1644*c* (not shown), 1644*c*' (not shown). Each outer surface 1644*a*, has a diameter smaller than the outer diameter of outer surface 1644*b*, in a configuration that is similar to that shown in FIG. 4D.

Upon assembly, each dielectric 1630, 1640*a*, 1640*a*' is surrounded by an outer housing 1620. The outer housing includes a first housing end face 1620*a* and a second housing end face 1620*a*' opposing the first housing end face 1620*a*. A plurality of mounting legs 1650*a*, 1650*a*' are disposed in bores 1660*a*, 1660*a*' and extend respectively beyond each housing end face 1620*a*, 1620*a*'. In this embodiment, four mounting legs 1650*a*, 1650*a*' are shown extending from each end face 1620*a*, 1620*a*', however, more or fewer mounting legs can be included on each end face. The mounting legs 1650*a*, 1650*a*' are also preferably positioned symmetrically with respect to a longitudinal axis that extends through the connector assembly 1600. Each pin 1650*a*, 1650*a*' preferably has a plurality of annular grooves 1650*a*, 1650*a*' disposed therein.

Figure 16E:
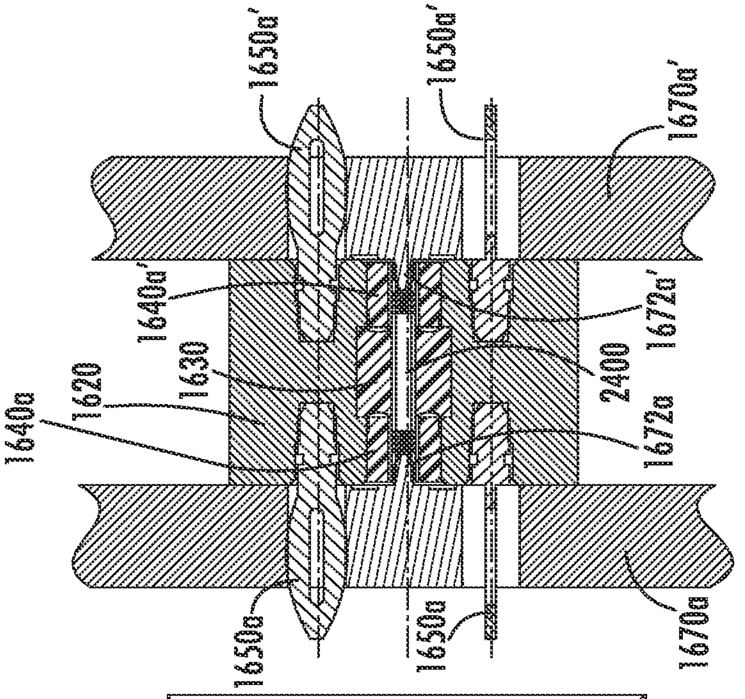
FIG. 16E is a cross-sectional view of the connector-PCB assembly shown in FIG. 16D, taken along line 16E-16E.
Figure 16D:
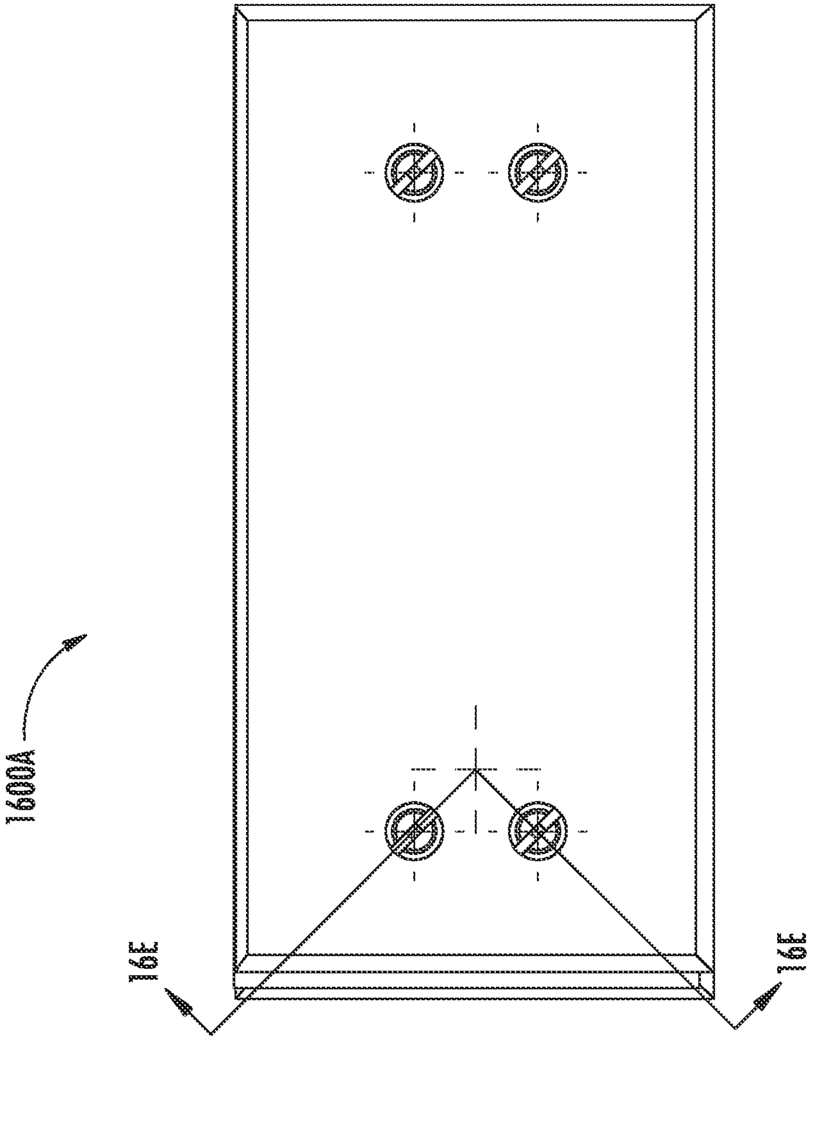
FIG. 16D is a top view of a connector-PCB assembly, including the connector assembly shown in FIGS. 16A-16C.

FIGS. 16E-16F illustrate a connector-PCB assembly 1600A, including PCBs 1670*a*, 1670*a*' coupled to the connector assembly 1600, and specifically the outer housing 1620, while FIG. 16F is a cross-sectional view of the connector assembly 1600A, taken along line 16F-16F. Each PCB 1670*a*, 1670*a*' includes bores 1672*a*, 1672*a*' having inner circular profiles that complement the outer circular profiles of the mounting legs 1650*a*, 1650*a*'. The bores 1672*a*, 1672*a*' each have a bore length, which is long enough to accommodate the full length of each mounting leg 1650*a*, 1650*a*'. Preferably, the bore length is sufficient to allow additional clearance within the bores 1672*a*, 1672*a*' even after final assembly, as particularly shown in FIG. 16E. Each PCB 1670*a*, 1670*a*' also includes an engagement surface 1674*a*, 1674*a*', including portions of which are positioned against external surfaces of the outer housing 1620 and dielectrics 1640*a*, 1640*a*'.

Figures 17A, 17B, 17C:
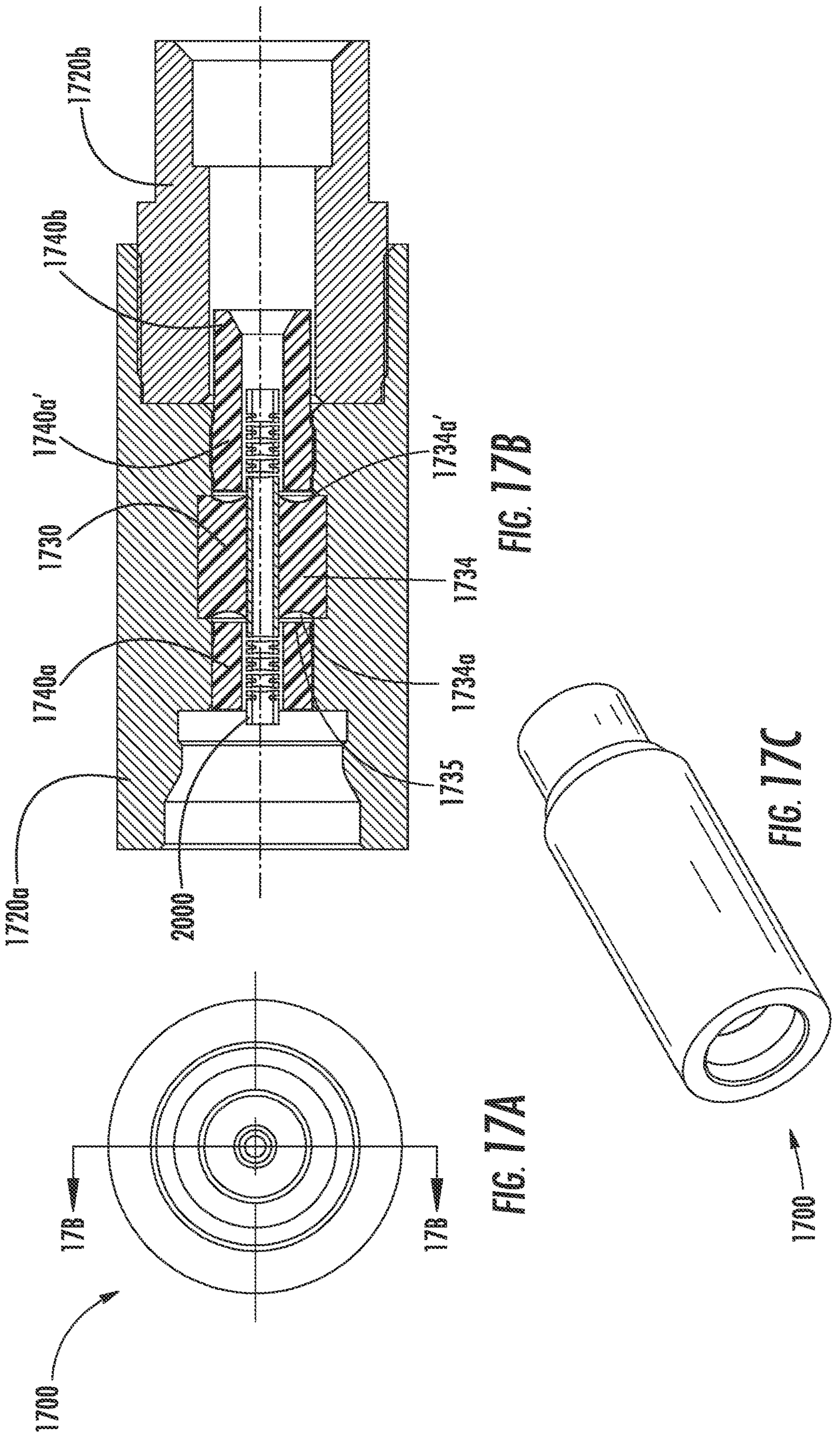
FIG. 17A is a front view of a connector assembly in accordance with embodiments disclosed herein.
FIG. 17B is a cross-sectional view of the connector assembly shown in FIG. 17A, taken along line 17B-17B.
FIG. 17C is an isometric view of the connector assembly, shown in FIGS. 17A and 17B.

FIGS. 17A-17C illustrate a connector assembly 1700, including the compressible electrical contact 2000, a first outer housing 1720*a*, a second outer housing 1720*b*, a center dielectric 1730 and outer dielectrics, 1740*a*, 1740*b*. All three dielectrics are disposed between the center contact 2000 and the outer housings 1720*a*, 1720*b*. The center dielectric 1730 has a center dielectric body 1734, with a first body end 1734*a* and a second dielectric end 1734*a*' opposing the first body end 1734*a*. Preferably, both ends 1734*a*, 1734*a*' have contoured faces 1735*a*, 1735*a*', as particularly shown in FIG. 17B. The center dielectric body 1734 also includes an inner annular dielectric surface 1736 and an outer annular dielectric surface 1738.

Figure 17E:
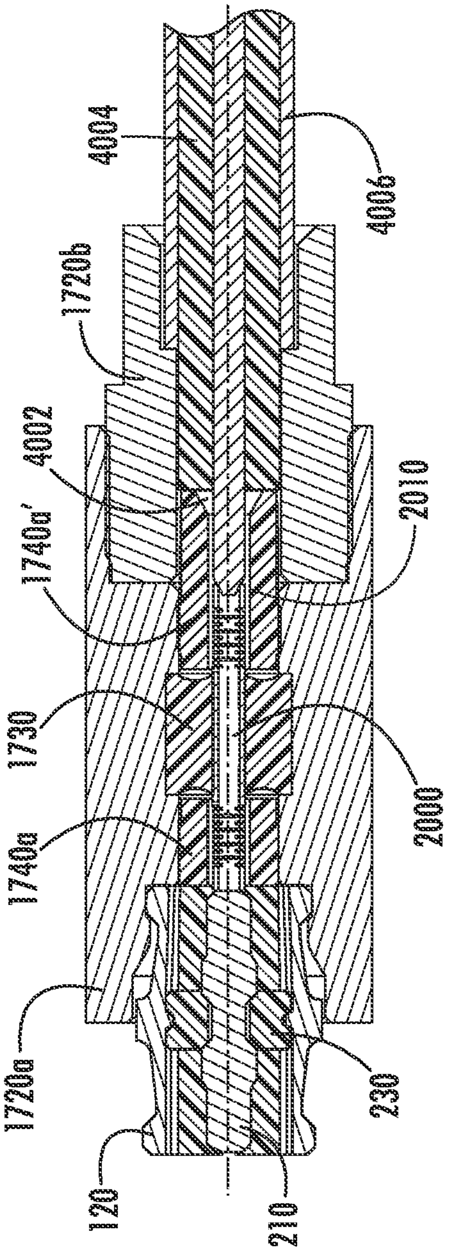
FIG. 17E is a cross-sectional view of the connector-cable assembly shown in FIG. 17D, taken along line 17E-17E.
Figure 17D:
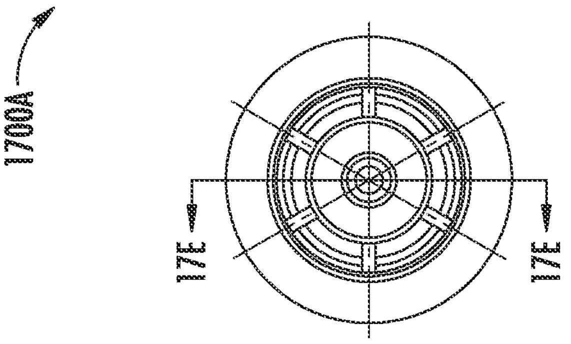
FIG. 17D is a front view of a connector-cable assembly in accordance with embodiments disclosed herein.

FIGS. 17D-17E illustrate a connector-cable assembly 1700A, including the connector assembly 1700, shown in FIGS. 17A-C, and the connector assembly 200, shown in FIGS. 2A-2C. The cable 4000 includes a cable center conductor 4002, having a portion positioned within the front contact end 2010, a cable dielectric 4004 surrounding the cable center conductor 4002, and a cable outer sheath 4006 surrounding the cable dielectric 4004.

Each outer dielectric 1740*a*, 1740*a*' has an inner surface 1742*a*, 1742*a*' and at least one outer surface 1744*a*, 1744*a*'. The outer surface 1744*a* has a diameter smaller than the outer diameter of outer surface 1744*b*, in a configuration that is similar to that shown in FIG. 4D.

Figure 18:
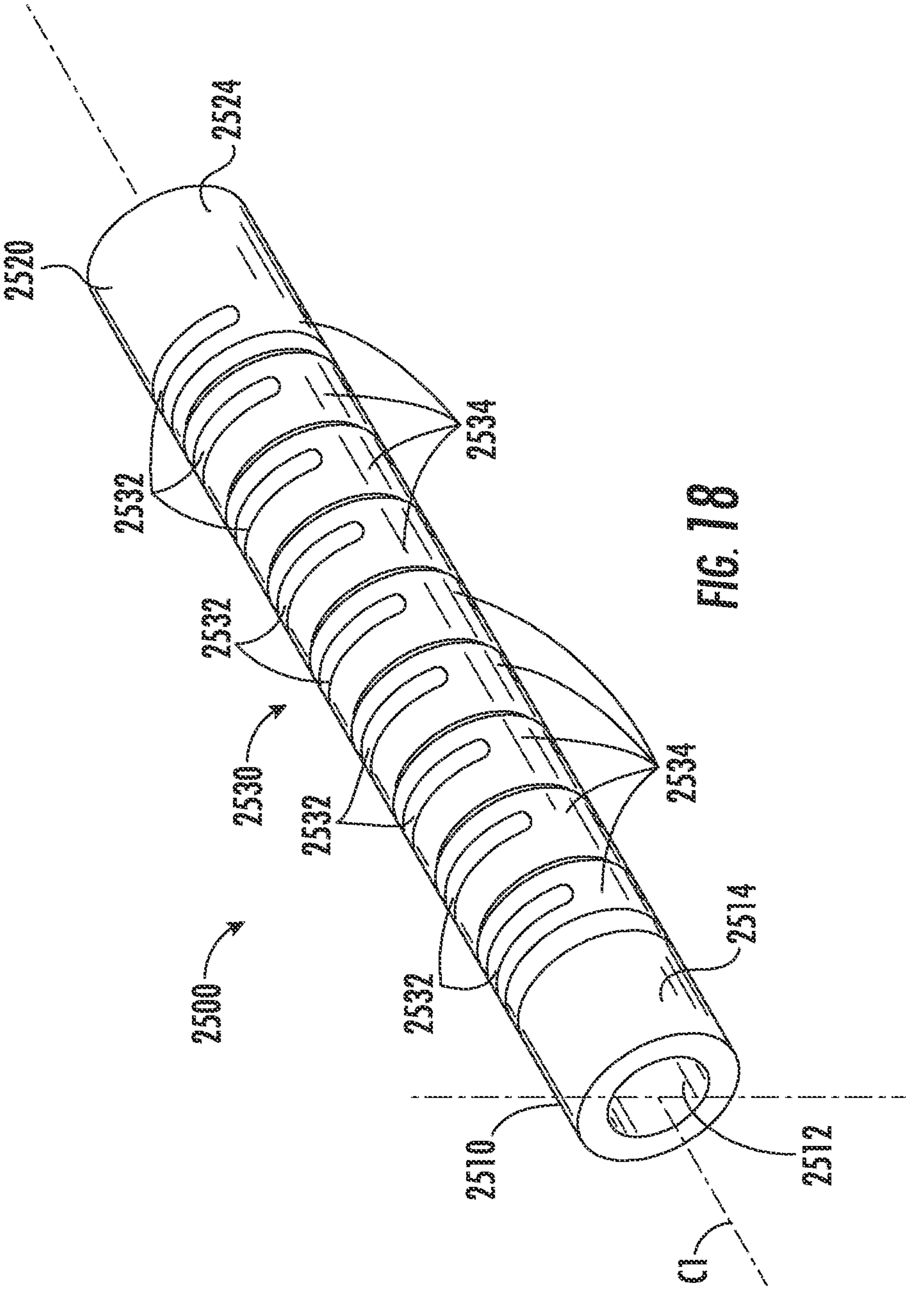
FIG. 18 is an isometric view of a compressible electrical contact in a substantially relaxed state in accordance with embodiments disclosed herein.

FIGS. 18-25 show various views of a compressible electrical contact 2500 in accordance with embodiments disclosed herein. FIG. 18 is an isometric view of the compressible electrical contact 2500 in a substantially relaxed state. The compressible electrical contact 2500 includes a first contact end 2510, a second contact end 2520 opposite the first contact end 2510, and a medial portion 2530 disposed between the first contact end 2510 and the second contact end 2520. The first contact end 2510 includes an inner surface 2512 and an outer surface 2514. Similarly, the second contact end 2520 includes an inner surface 2522 (FIG. 19) and an outer surface 2524.

In the substantially relaxed state, the compressible electrical contact 2500 has a relaxed length defined as $L_{R1}$, measured from a first outer edge 2526*a* to an opposing outer edge 2528*a*. Each contact end 2510, 2520 is also defined, in part, by top lengths $TL_{CE1}$, $TL_{CE2}$ and bottom lengths, $BL_{CE1}$, $BL_{CE2}$, as particularly shown in FIG. 22. Top length $TL_{CE1}$ is measured from the first outer edge 2526*a* to a first top inner edge 2526*a*' of the contact 2500, while top length $TL_{CE2}$ is measured from the second outer edge 2528*a* to a second top inner edge 2528*a*' of the contact 2500. Bottom length $BL_{CE1}$ is measured from the first outer edge 2526*a* to a first bottom inner edge 2526*b*, while bottom length $BL_{CE2}$ is measured from the second outer edge 2528*a* to a second bottom inner edge 2528*b*. In preferred configurations, at least a portion of each contact end 2510, 2520 is cylindrical.

Figure 19:
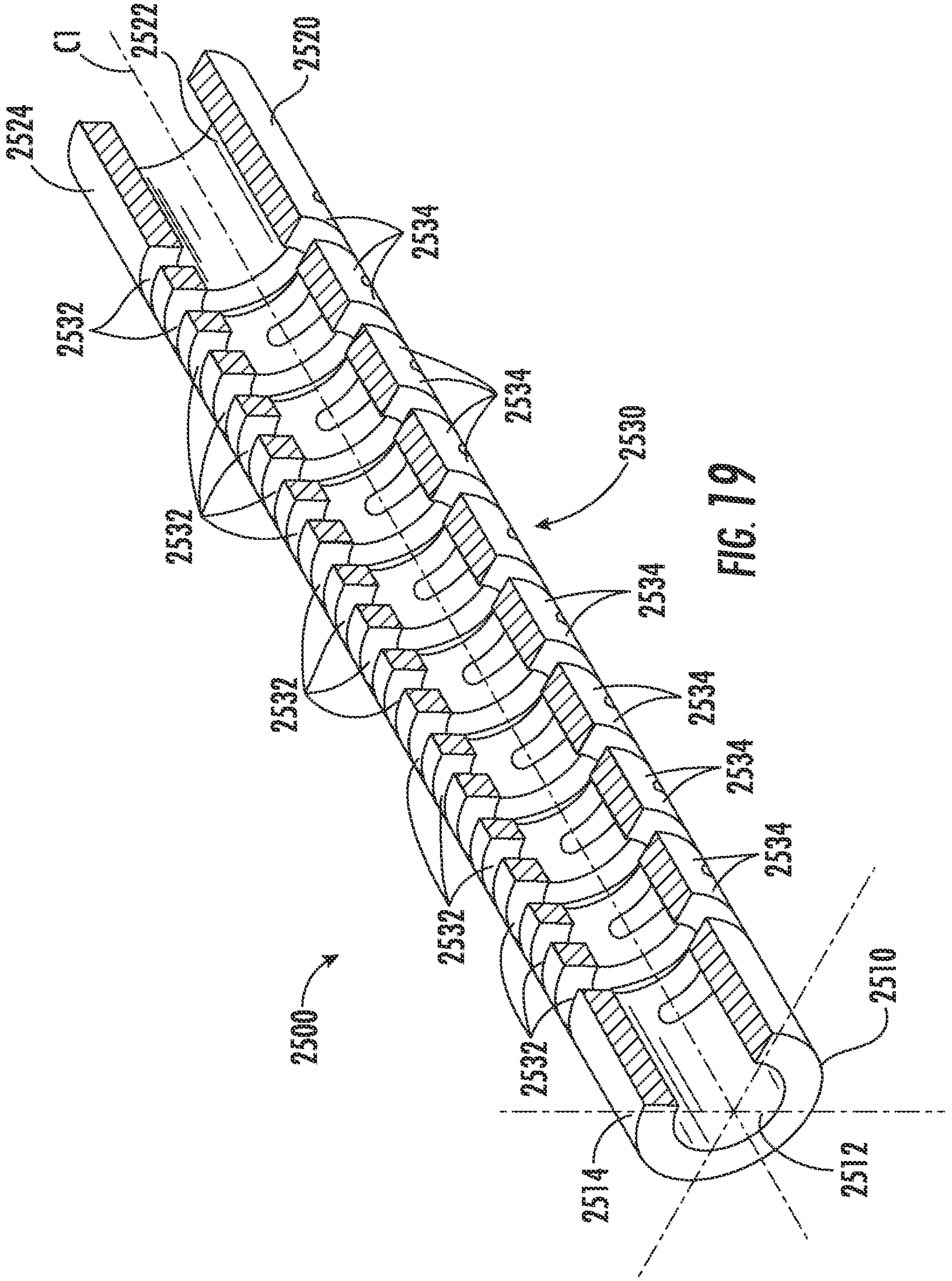
FIG. 19 is an isometric view of the compressible electrical contact shown in FIG. 18 with an upper quadrant of the contact removed.
Figure 20:
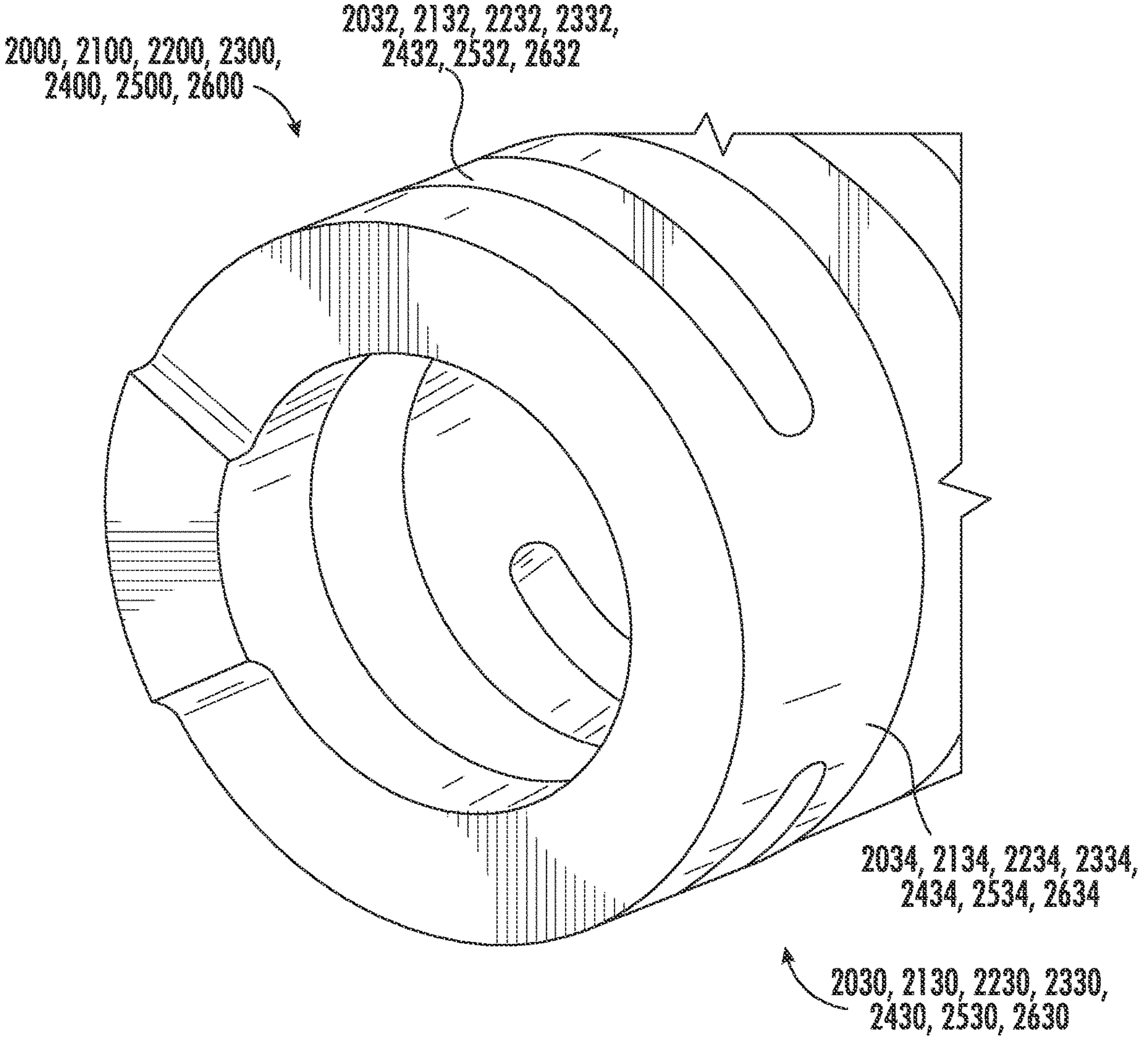
FIG. 20 is an enlarged cutaway portion of the medial section of the compressible electrical contacts disclosed herein.

Referring particularly to FIGS. 18-22, the medial portion 2530 includes a plurality of cut sections 2532 with medial elements 2534 adjacent to or therebetween. For further illustration, FIG. 19 shows an isometric view of the compressible electrical contact 2500 in a substantially relaxed state with its upper right quadrant removed and FIG. 20 shows an enlarged section of the medial portion 2530 cutaway from the first contact end 2510. In alternative configurations, the compressible electrical contact can include a body or medial portion without the first and second contact ends.

FIGS. 18-25 also show various views of the compressible electrical contact 2500 in a substantially relaxed state, manufactured according to a divaricating pattern PA (FIG. 9) that defines how the plurality of cut sections 2532 are cut into a tube 3000A. Referring particularly to FIG. 4, from the first contact end 2510, an initial cut $\mathbf{2532}_{e1}$ (referring to the first cut on the first contact end 2510) may be defined by a first end cut angle $\alpha_{e1}$, which is measured with respect to opposing inner surfaces 2536*a*, 2536*b*. From the second contact end 2520, a final cut $\mathbf{2532}_{e2}$ (referring to the last cut on the second contact end 2520) may be defined by a second end cut angle $\alpha_{e2}$, which is measured with respect to opposing inner surfaces 2538*a*, 2538*b*. Inner cut sections $\mathbf{2532}_{in}$, positioned between the first contact end 2510 and the second contact end 2520, may be defined by an inner cut angle $\alpha_{in}$ (referring to a plurality of inner cut angles between the first contact end 2510 and the second contact end 2520). Each inner cut angle α in is measured with respect to outwardly extending opposing inner surfaces $\mathbf{2539}_{ain}$, $\mathbf{2539}_{bin}$, between inner cut-sections $\mathbf{2532}_{in}$. In addition, preferably included in each cut section is a radiused edge $R_{e1}$, $R_{in}$ $R_{e2}$ disposed between the respective opposing inner surfaces $\mathbf{139}_{ain}$, $\mathbf{139}_{bin}$. Each of the cut sections can be further defined with respect to innermost cut distances $V_{EI1}$, $V_{IN1}$, $V_{EI2}$ and outermost cut distances $V_{EO1}$, $V_{ON1}$, $V_{EO2}$, where each innermost cut distance is smaller than each outermost cut distance.

Although a certain number of sections and medial elements are shown in FIGS. 18-25, the number of cut sections and medial elements shown should not be construed as limiting. Fewer or additional cut sections and medial elements may be included within the overall structure of the compressible electrical contacts disclosed herein. Moreover, the angles of the cut sections and the widths of the medial elements may vary.

Figure 25:
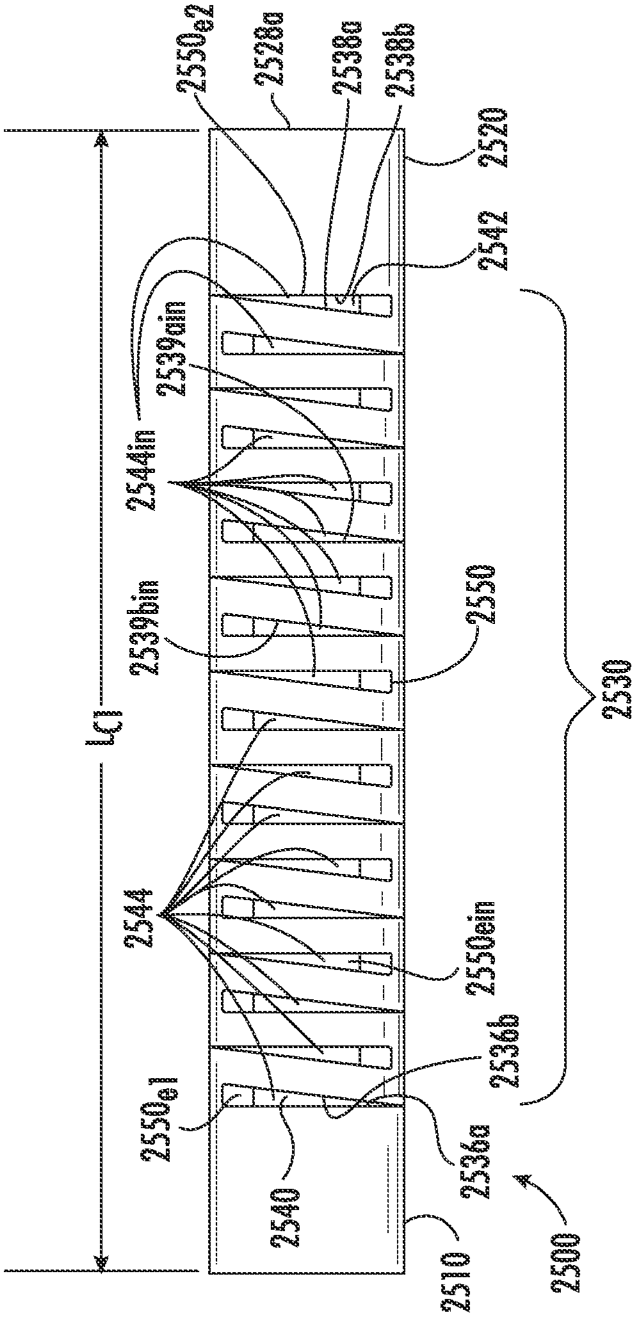
FIG. 25 is a top view of the compressible electrical contact shown in FIG. 18 in a substantially compressed state.
Figure 26:
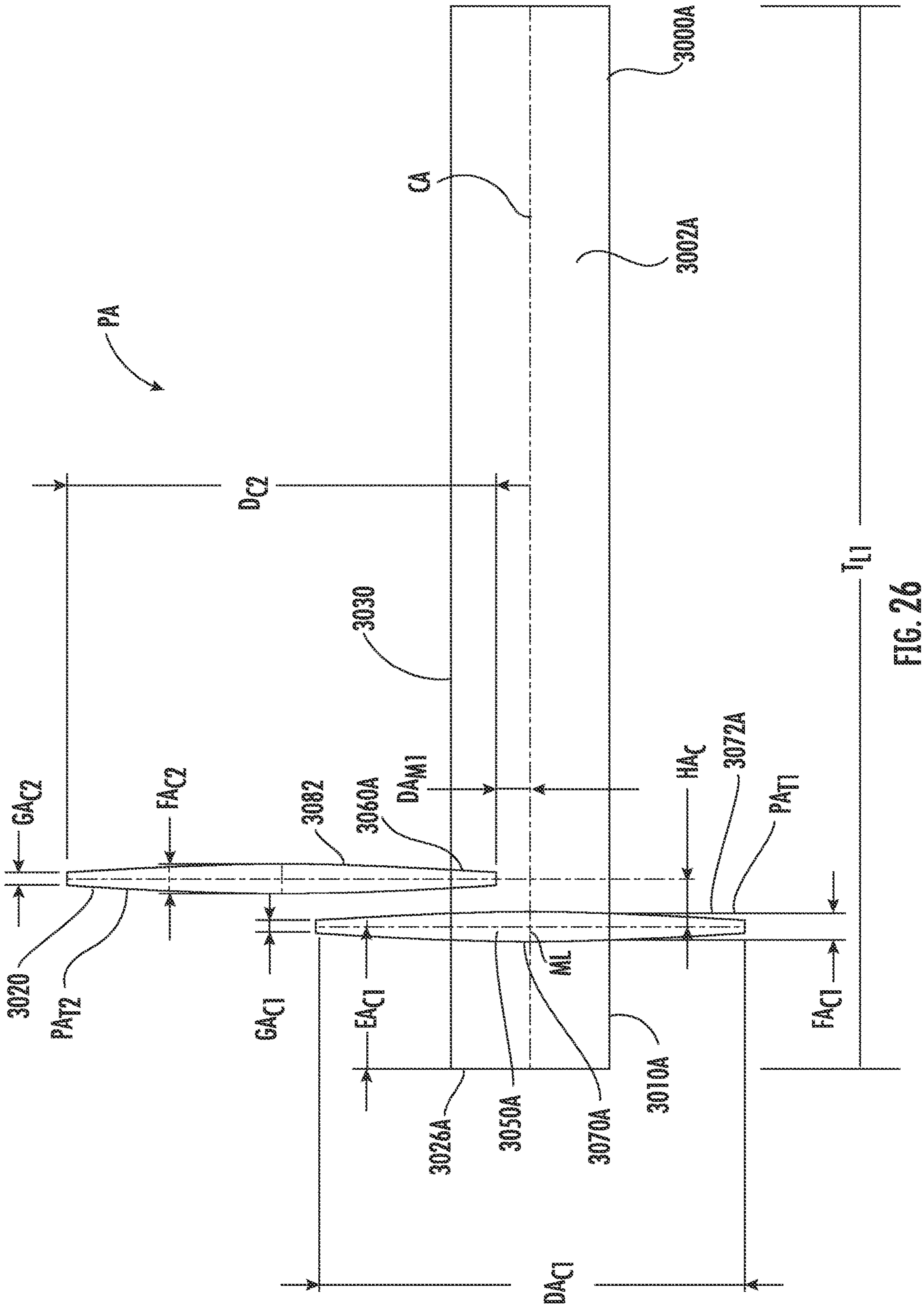
FIG. 26 is a top view of another compressible electrical contact in accordance with embodiments disclosed herein, shown in a substantially relaxed state.
Figure 27:
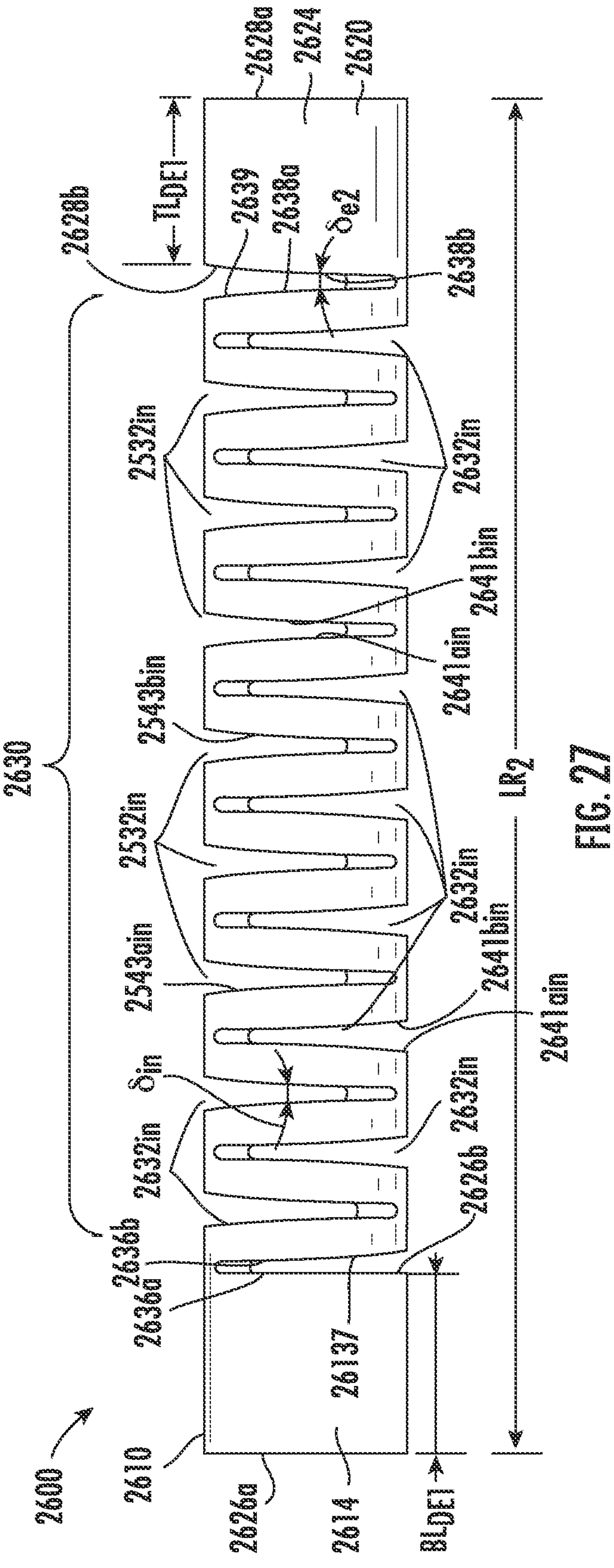
FIG. 27 is a side view of the compressible electrical contact shown in FIG. 26.

FIG. 25 shows the compressible electrical contact 2500, in a substantially compressed state, at a compressed length $L_{C1}$, where $L_{C1}$ is measured from the first outer edge 2526*a* to the second outer edge 2528*a* of the contact 2500 when the contact 2500 is substantially compressed. In this state, the inner surfaces 2536*a*, 2536*b* (FIG. 21) nest or collapse inwardly and contact each other such that a first end space 2540 is formed adjacent the first contact end 2510. Also, inner surfaces 2538*a*, 2538*b* (FIG. 21) nest or collapse inwardly and are in contact such that a second end space 2542 is formed adjacent to the second contact end 2520. And inner surfaces $\mathbf{2539}_{ain}$, $\mathbf{2539}_{bin}$ (FIG. 4) nest or collapse inwardly such that the compressible electrical contact 2500 also includes interior spaces $\mathbf{2544}_{in}$ formed between interior surfaces $\mathbf{2539}_{ain}$, $\mathbf{2539}_{bin}$. Accordingly, in the substantially compressed state, a portion of each inner surface touches such that the end spaces and interior spaces form a plurality of tapered slots $\mathbf{2550}_{e1}$ (first contact end slot), $\mathbf{2550}_{in}$ (inner contact slots), $\mathbf{2550}_{e2}$ (second contact end slot) that extends through the compressible electrical contact 2500. The plurality of slots 2550 can be further defined to have a tapered-teardrop shape upon compression.

Figure 21:
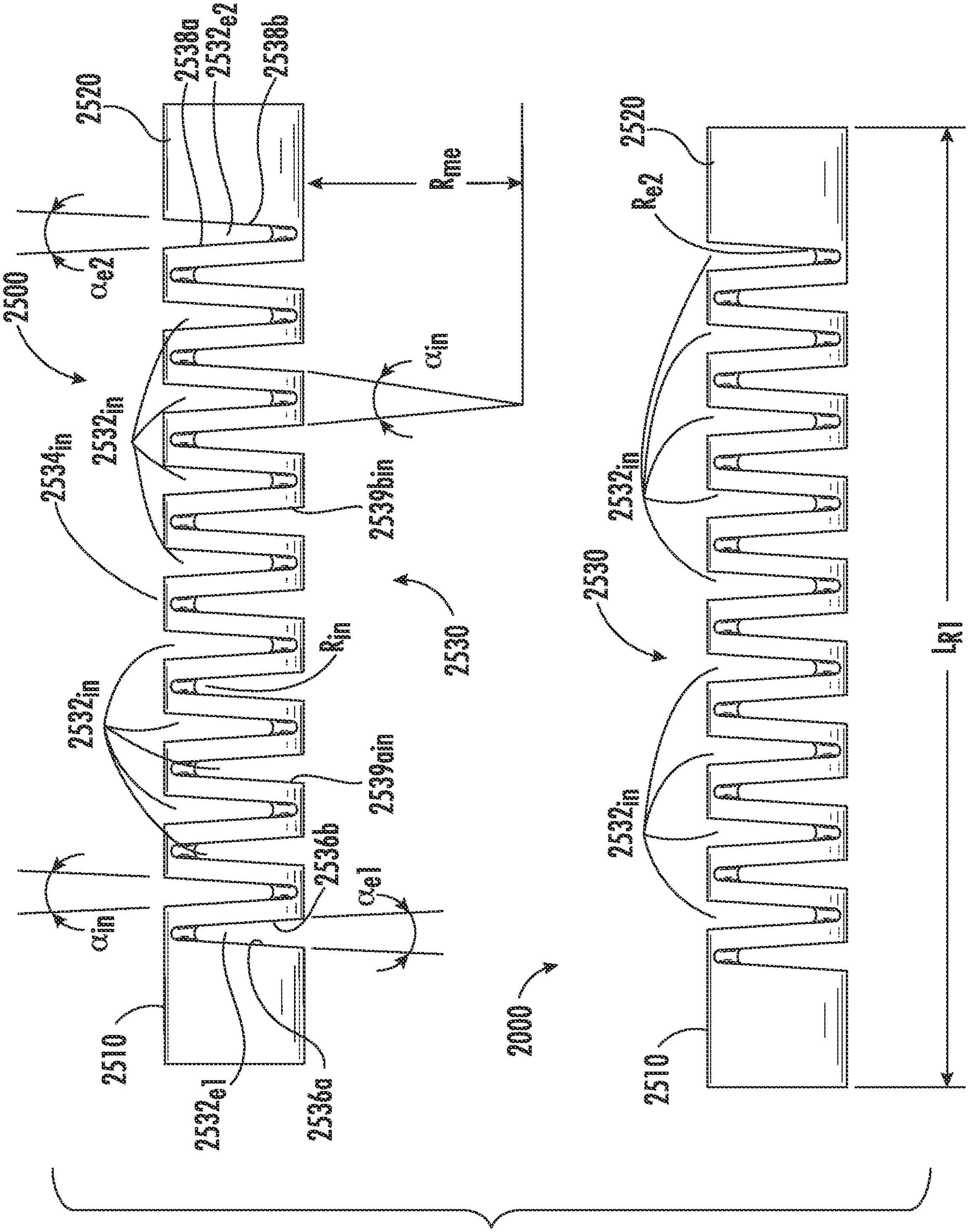
FIG. 21 shows two top views of the compressible electrical contact shown in FIG. 18 with the compressible electrical contact being in a substantially relaxed state.
Figure 22:
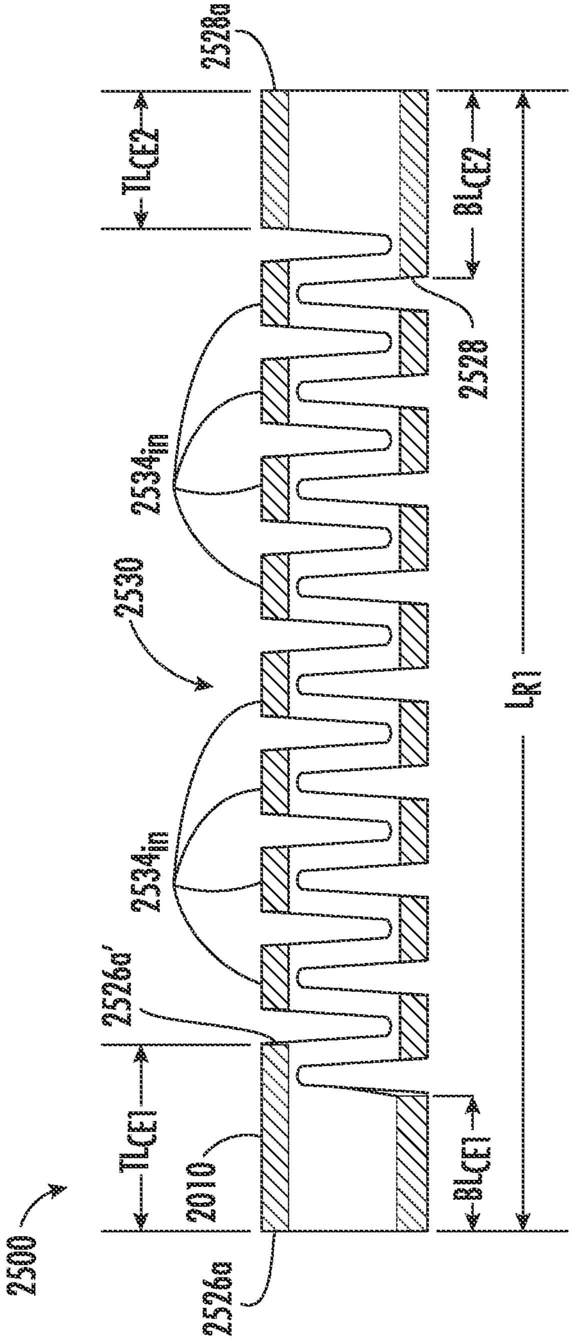
FIG. 22 is a cross-sectioned top view of the compressible electrical contact shown in FIG. 1 taken along a centrally located latitudinal plane with respect to inner and outer diameters of the compressible electrical contact.
Figure 23:
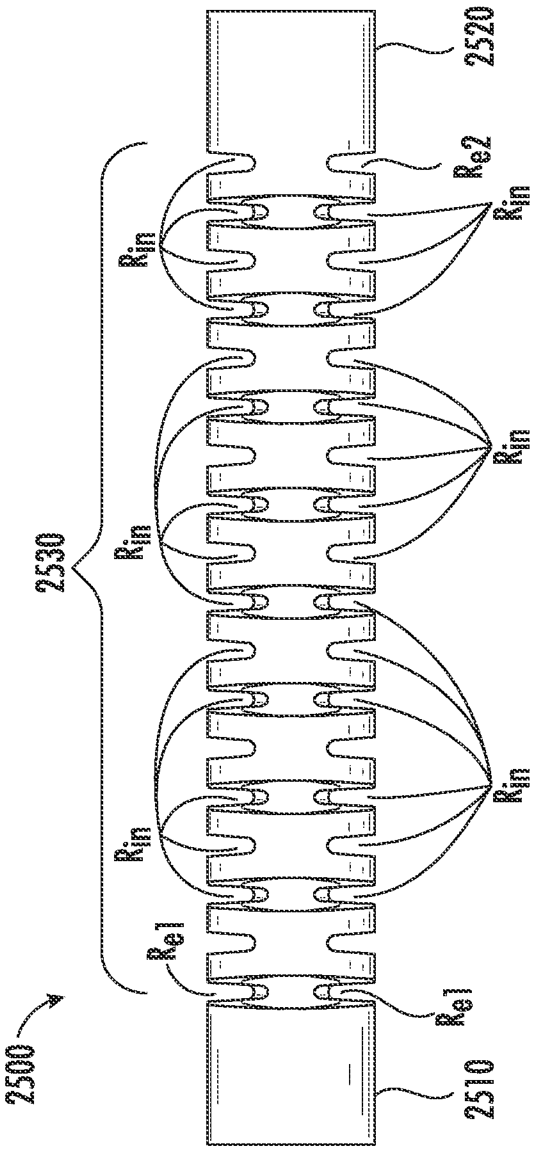
FIG. 23 is a side view of the compressible electrical contact shown in FIG. 18 in a substantially relaxed state.
Figure 24:
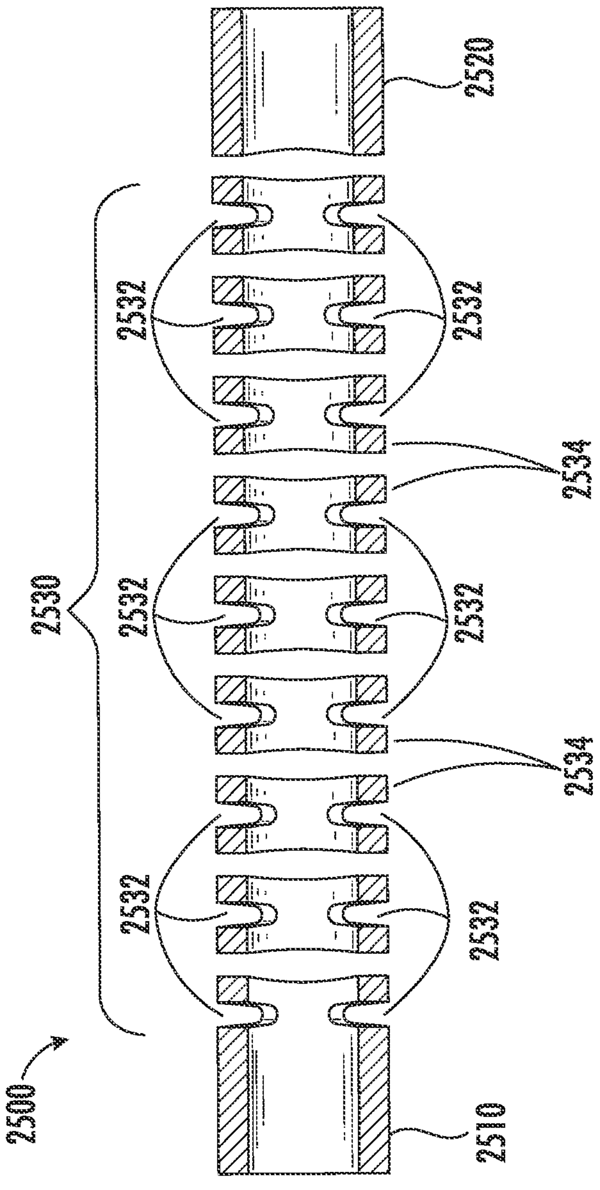
FIG. 24 is a cross-sectioned side view of the compressible electrical contact shown in FIG. 18, taken along a centrally located longitudinal plane with respect to inner and outer diameters of the compressible electrical contact shown.

In the substantially relaxed state, shown in FIG. 21, the compressible electrical contact 2500 also remains in a substantially tubular shape without the need for inner and/or outer diameter support structures. The ability of the compressible electrical contact 2500 to maintain a relatively tubular shape is in marked contrast to the jumbled and serpentine undulations commonly seen in coil-type springs when compressed without inner and/or outer diameter support structures. As a result, the medial elements 2534 (FIG. 25) act to counter-balance each other throughout a compression stroke, spreading the load of the forces exerted onto the contact across substantially all portions of the contact 2500.

FIG. 26 illustrates the exemplary divaricating pattern PA for a tube 3000A, upon which cut sections 2032, 2132, 2332, 2432, 2532, 2632 are based. The tube 3000A includes an outer surface 3002*a* and an inner surface (not shown). The divaricating pattern PA is defined with respect to a central axis CA along the length of the tube 3000A. A theoretical divaricated cut 3050A for a tube end 3010A may be defined with respect to a first divaricating pattern PT1, using predefined measurements $DA_{C1}$, $EA_{C1}$, $FA_{C1}$, and $GA_{C1}$. The first divaricating pattern PT1 includes an upper tapered section 3070A and a lower tapered section 3072A. The lowered tapered section 3072A preferably mirrors and is positioned directly below the upper tapered section 3070A.

$DA_{C1}$ measures the overall height of the theoretical divaricated cut 3050A. $EA_{C1}$ measures the $FA_{C1}$, and $GA_{C1}$. $EA_{C1}$ measures the distance of the center of the divaricating pattern PA from a first outer edge 3026A of the tube 3000A. $FA_{C1}$ is the widest width of the divaricating pattern $PA_{T1}$ and $GA_{C1}$ is narrowest width of the divaricating pattern PT1.

A theoretical cut 3060A for a tube medial portion 3030A may be defined with respect to a second divaricating pattern $PA_{T2}$, using predefined measurements $DA_{C2}$, $FA_{C2}$, and $GA_{C2}$. $DA_{C2}$ measures the overall height of the theoretical cut 3060A. $FA_{C2}$ is the widest width of the divaricating pattern $PA_{T2}$ and $GA_{c2}$ is narrowest width of the divaricating pattern $PA_{T2}$. The divaricating patterns $PA_{T1}$, $PA_{T2}$ are further defined with respect to dimensions HAc, DAm, where HAc is the distance between the patterns $PA_{T1}$, $PA_{T2}$ measured from their respective centerlines and $DA_{M1}$ is the distance from the bottom of divaricating pattern $PA_{T2}$ to a middle line ML where the tapered sections $\mathbf{3070}_{A1}$, $\mathbf{3072}_{A1}$ join, with the line being central axis CA.

The theoretical cuts are further defined with respect to each other at a measurement HAc defined with respect to the centerlines of theoretical end cut 350A and theoretical medial cut 360A. Preferably, the divaricating patterns are such that they allow the final form of the cut compressible electrical contact to exhibit spring-like properties. Moreover, in the embodiments disclosed herein, zig-zag-like tapered patterns are preferred such that the final properties of the contact are spring-like. The divaricating pattern PA is also configured such that the amount of bowing that could occur in the medial portion, after cutting of the tube and during compression is minimal. Alternative variations and divaricating patterns may, however, be used.

Figure 28:
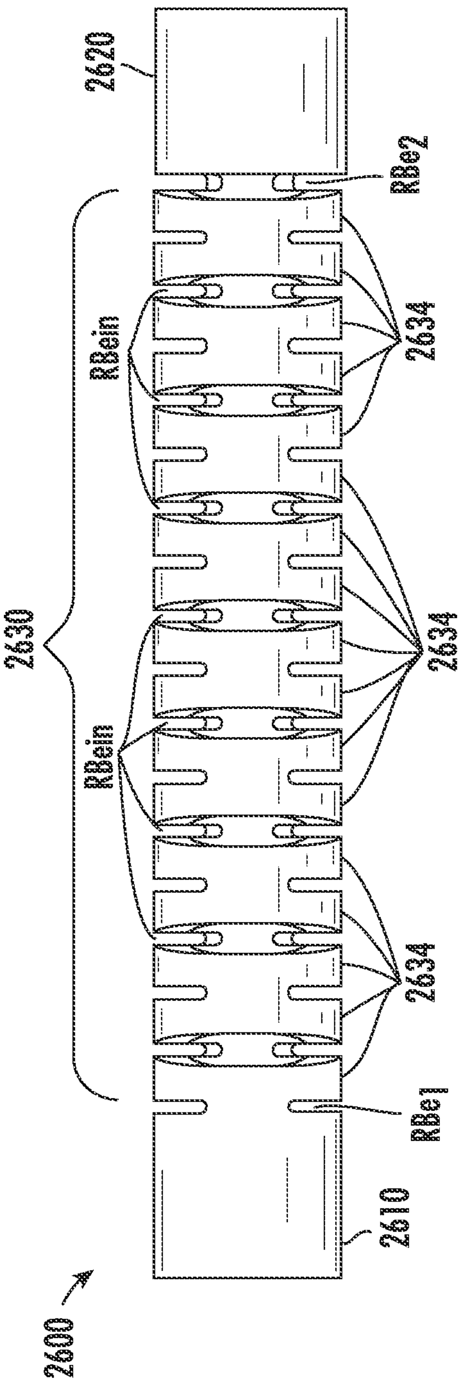
FIG. 28 is a top view of the compressible electrical contact shown in FIG. 26 in a substantially relaxed state.
Figure 29:
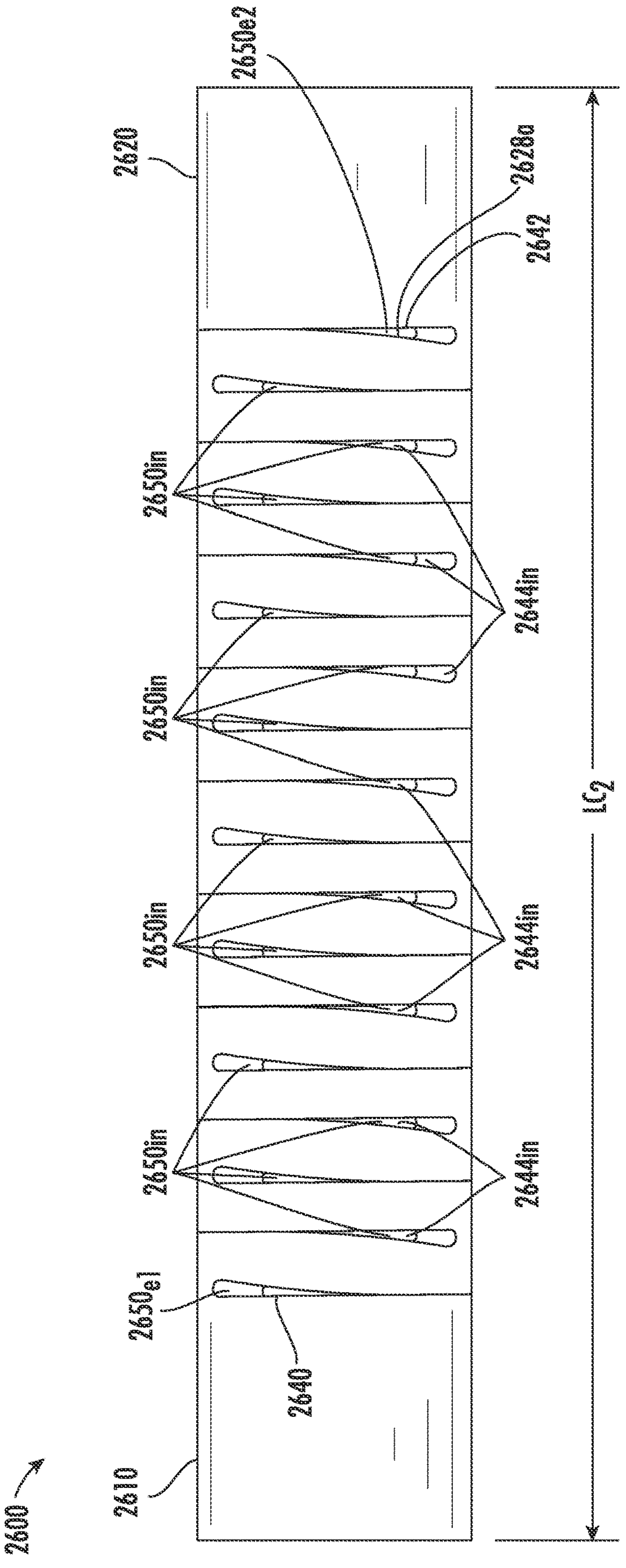
FIG. 29 is a top view of the compressible electrical contact, shown in FIGS. 26-28, in a substantially compressed state.
Figure 30:
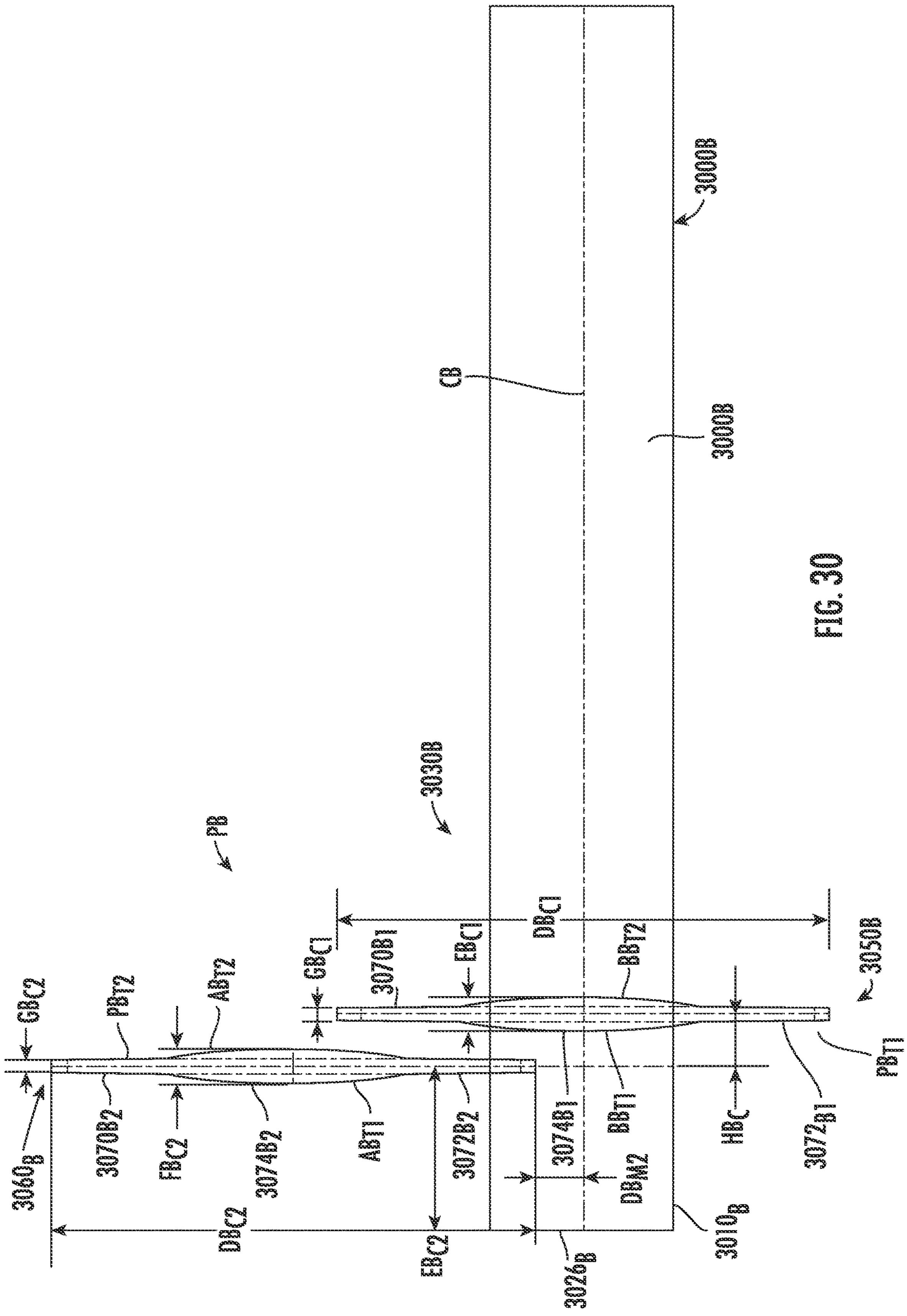
FIG. 30 is a side view of a tube, schematically illustrating a divaricating pattern for a compressible electrical contact in accordance with embodiments disclosed herein.

FIGS. 28-30 show various views of a compressible electrical contact 2600 in accordance with embodiments disclosed herein. FIG. 28 shows a top view of the contact 2600 and FIG. 29 shows a side view of the contact 2600 in a substantially relaxed state. The compressible electrical contact 2600 includes a first contact end 2610, a second contact end 2620 opposite the first contact end 2610, and a medial portion 2630 disposed between the first contact end 2610 and the second contact end 2620. The first contact end 2610 includes an inner surface (not shown) and an outer surface 2614. Similarly, the second contact end 2620 includes an inner surface (not shown) and an outer surface 2624. In preferred configurations, at least a portion of each contact end 2610, 2620 is cylindrical.

In the substantially relaxed state, the compressible electrical contact 2600 has a relaxed length defined as $L_{R2}$, measured from a first outer edge 2626*a* to an opposing outer edge 2628*a*. Contact end 210 is defined, in part, by a bottom length, $BL_{DE1}$ measured from the outer edge 2626*a* to a bottom inner edge 2626*b*. Contact end 2620 is defined, in part, by a top length, $TL_{DE1}$ measured from the outer edge 2628*a* to a first top inner edge 2628*b*.

The medial portion 2630 includes a plurality of divaricated-cut sections 2632 with medial elements 2634 adjacent to or therebetween. As with the first embodiment, the compressible electrical contact 2600 can include just a medial portion without the first and second contact ends.

Referring particularly to FIG. 28, from the first contact end 2610, an initial cut $\mathbf{2632}_{e1}$ (referring to the first cut on the first contact end 2610) may be defined by cut angles $\delta_{e1I}$, $\delta_{e1I}$, which are measured with respect to opposing inner surfaces 2636*a*, 2636*b*, 2636*c*, 2636*d*. From the second contact end 2620, a final cut $\mathbf{2632}_{e2}$ (referring to the last cut on the second contact end 2620) may be defined by cut angles $\delta_{e2I}$, $\delta_{e2O}$ which are measured with respect to opposing inner surfaces 2638*a*, 2638*b*, 2638*c*, 2638*d*. Extending from inner surface 2638*a* is a final curved surface 2639. Inner cut sections $\mathbf{2632}_{in}$ (referring to a plurality of inner cut sections between the first contact end 2610 and the second contact end 2620) may be defined by a plurality of cut angles $\delta_{NI}$, $\delta_{NO}$ (referring to a plurality of innermost and outermost cut angles between the first contact end 2610 and the second contact end 2620). Cut angles $\delta_{NI}$, $\delta_{NO}$ are measured with respect to outwardly extending pairs of opposing inner surfaces $\mathbf{2641}_{ain}$, $\mathbf{2641}_{bin}$, $\mathbf{2641}_{cin}$, $\mathbf{2641}_{din}$ located between inner cut-sections $\mathbf{2632}_{in}$. Each of the cut sections can be further defined with respect to innermost cut distances $V_{EI2}$, $V_{IN2}$, $V_{EI2}$ and outermost cut distances $V_{OI2}$, $V_{ON2}$, $V_{EO2}$, where each innermost cut distance is smaller than each outermost cut distance. In addition, preferably included in each cut section is a radiused edge $RB_{e1}$, $RB_{in}$, $RB_{e2}$ disposed between the respective opposing inner surfaces.

FIG. 29 shows the compressible electrical contact 2600 in a substantially compressed state at a compressed length $L_{C2}$, measured from the first outer edge 2626*a* to the second outer edge 2628*a* of the contact 2600 when the contact is substantially compressed. In this state, the inner surfaces 2636*a*, 2636*b* nest or collapse inwardly and contact each other such that a first end space 2640 is formed adjacent the first contact end 2610. Also, inner surfaces 2638*a*, 2638*b* collapse inwardly and are in contact such that a second end space 2642 is formed adjacent to the second contact end 2620. And inner surfaces $\mathbf{2639}_{ain}$, $\mathbf{2639}_{bin}$ collapse inwardly such that the compressible electrical contact 2600 also includes interior spaces $\mathbf{2644}_{in}$ formed between interior surfaces $\mathbf{2646}_{in}$, $\mathbf{2648}_{in}$. In the substantially compressed state, a portion of each inner surface touches such that the end spaces and interior spaces form a plurality of tapered slots 2650. The plurality of tapered slots 2650 can be further described to include a first contact end slot $\mathbf{2650}_{e1}$, at least one inner contact slots $\mathbf{2650}_{in}$, and a second contact end slot $\mathbf{2650}_{e2}$ that extends through the compressible electrical contact 2600. The plurality of slots 2650 can be further defined to have a tapered-teardrop shape upon compression. Due to the curved surfaces, however, the slots 2650 are much smaller and narrower compared to the slots included in other embodiments of the compressible electrical contacts based on pattern PA.

In the substantially compressed state, shown in FIG. 29, the compressible electrical contact 2600 remains in substantially tubular without the need for inner and/or outer diameter support structures. As with the first embodiment, the medial elements 2634 (FIG. 28) act to counter-balance each other throughout a compression stroke, spreading the load of the forces exerted onto the contact across all portions of the contact 2600.

FIG. 30 shows another type of divaricating pattern PB, including a plurality of divaricating-cut patterns, that may be used to cut the plurality of divaricated-cut sections 2632 into a tube 3000B. The tube 3000B includes an outer surface 3002B and an inner surface (not shown), an overall tube length $T_{L2}$, a first tube edge 3026B, and a second tube edge 3028B. The divaricating pattern PB is defined with respect to a central axis CB that extends along the length of the tube 3000B.

A theoretical divaricated cut 3050B for a medial portion 3030B may be defined with respect to a first divaricating cut pattern $PB_{T1}$, using predefined measurements $DB_{C1}$, $EB_{C1}$, and $GB_{C1}$. $DB_{C1}$ measures the overall height of the theoretical divaricated cut 3050B. $EB_{C1}$ measures the maximum width of the divaricated cut 3050B and $GB_{C1}$ is narrowest width of the of the divaricated cut 3050B. The first divaricating cut pattern $PB_{T1}$ also includes an upper tapered section $\mathbf{3070}_{B1}$, a lower tapered section $\mathbf{3072}_{B1}$, and an arc section $\mathbf{3074}_{B1}$ positioned between the upper tapered section $\mathbf{3070}_{B1}$ and the lowered tapered section $\mathbf{3072}_{B1}$. The arc section $\mathbf{3074}_{B1}$ includes two arc segments $BB_{T1}$, $BB_{T2}$.

A theoretical divaricating cut 3060B for a tube end portion 3010B may be defined with respect to a second divaricating pattern $PB_{T2}$, using predefined measurements $DB_{C2}$, $EB_{C2}$, $FB_{C2}$, and $GB_{C2}$. $DB_{C2}$ measures the overall height of the theoretical divaricated cut 3060B. $EB_{C2}$ measures the distance from the centerline of the cut 3060B to the edge of the tube 3026B. $FB_{C2}$ is the widest width of the divaricating pattern $PB_{T2}$ and $GB_{C2}$ is narrowest width of the divaricating pattern $PB_{T2}$.

Divaricating patterns $PB_{T1}$, $PB_{T2}$ are further defined with respect to dimensions HBc and $DB_{M2}$. Measurement HBc is the distance between the patterns $PB_{T1}$, $PB_{T2}$ measured from their respective centerlines and $DBm_2$ is the distance from the bottom of divaricating pattern $PB_{T2}$ to the median of the arc section $\mathbf{3074}_{B1}$, which is parallel with central axis CB.

Preferably, the divaricating patterns PA, PB may cut at internals in the tube are such that they allow the final form of the divaricated-cut contact to exhibit spring-like properties. Moreover, in the embodiments disclosed herein, zig-zag like patterns are preferable such that the final properties of the contact are spring-like. The divaricating patterns PA, PB are also configured such that the amount of bowing that could occur in the medial portion, after cutting of the tube and during compression is minimal. Alternative variations and divaricating patterns may, however, be used.

The compressible electrical contacts disclosed herein are preferably manufactured from tubes using one or more precision cutting methods, e.g. laser cutting. The tube is also preferably manufactured from one or more electrically conductive materials. Suitable materials for the compressible electrical contact include, but are not limited to, brass, copper, beryllium copper and stainless steel. Preferably, these materials have spring-like properties, high strength, high elastic limit, and low moduli.

Overall dimensions for the compressible electrical contacts disclosed herein can range from micro- to large scale. Targeted sizes, however, are on a smaller basis given current industry trends. An exemplary tube size has an inner diameter of about 0.006 inches, an outer diameter of about 0.010 inches, and an overall length of about 0.070 inches. When the compressible electrical contact is manufactured, using a tube having these dimensions and incorporating divaricating pattern, PA, the resulting cut angles can be about 5 degrees, the innermost cut distances can be about 0.001 inches and the outermost cut distance can be about 0.002 inches. And, when the compressible electrical contact is manufactured, incorporating divaricating pattern PB, the resulting outermost cut angles can range from about 13 degrees to about 15 degrees, the resulting innermost cut angles can range from about 1.5 degrees to about 3.0 degrees with the innermost cut distances being about 0.0006 inches and the outermost cut distance being about 0.002 inches.

Dimensions of the compressible electrical contacts disclosed herein, however, depend on various factors, including but not limited to the contact's spring rate and the length of travel between a substantially relaxed state and a compressed state. Nonetheless, after compression, the compressible electrical contacts disclosed herein will have an effective inner diameter of about 0.006 inches, an effective outer diameter of about 0.010 inches, and an overall length of about 0.070 inches, when manufactured from a tube having an inner diameter of about 0.006 inches, an outer diameter of about 0.010 inches, and an overall length of about 0.070 inches.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

The invention claimed is:

1. A connector assembly, comprising:

a compressible electrical contact, comprising a first contact end, a second contact end opposing the first contact end, and a plurality of cut sections positioned between the first contact end and the second contact end, each of the plurality of cut sections being defined by at least one cut angle measured between a pair of outwardly extending opposing inner surfaces, an innermost cut distance, and an outermost cut distance, wherein the innermost cut distance is smaller than the outermost cut distance when the compressible electrical contact is in a substantially relaxed state, and wherein when the compressible electrical contact is in a substantially compressed state, each pair of opposing inner surfaces collapses inwardly to form a slot;

a dielectric, having a central dielectric section surrounding the compressible electrical contact; and an outer housing surrounding the dielectric.

2. The connector assembly of claim 1, wherein the compressible electrical contact is manufactured from a tube.

3. The connector assembly of claim 1, wherein the at least one of the plurality of cut sections is based on at least one divaricating pattern.

4. The connector assembly of claim 3, wherein each divaricating pattern comprises an upper tapered section and a lower tapered section.

5. The connector assembly of claim 1, wherein each of the plurality of cut sections is included in a medial portion disposed between the first contact end and the second contact end.

6. The connector assembly of claim 1, wherein the central dielectric section extends and tapers downwardly to mate with the compressible electrical contact.

7. The connector assembly of claim 1, wherein the central dielectric section is disposed between a first dielectric bore on a first body end and a second dielectric bore on a second body end.

8. The connector assembly of claim 1, wherein the compressible electrical contact comprises a material selected from the group consisting of brass, copper, beryllium copper, and stainless steel.

9. The connector assembly of claim 1, wherein the compressible electrical contact has an effective outer diameter of about 0.010 inches.

10. The connector assembly of claim 1, wherein the compressible electrical contact has an effective inner diameter of about 0.006 inches.

11. The connector assembly of claim 1, wherein the at least one cut angle is about 5 degrees when the compressible electrical contact is in the substantially relaxed state.

12. The connector assembly of claim 1, wherein the outermost cut distance is about 0.002 inches when the compressible electrical contact is in the substantially relaxed state.

13. The connector assembly of claim 1, wherein the innermost cut distance is about 0.001 inches when the compressible electrical contact is in the substantially relaxed state.

14. A connector assembly, comprising:

a compressible electrical contact, comprising a first contact end, a second contact end opposing the first contact end, and a plurality of cut sections positioned between the first contact end and the second contact end, each of the plurality of cut sections being defined by at least one cut angle measured between a pair of outwardly extending opposing inner surfaces, an innermost cut distance, and an outermost cut distance wherein the innermost cut distance is smaller than the outermost cut distance in a substantially relaxed state, and wherein in a substantially compressed state, each pair of opposing inner surfaces collapses inwardly to form a slot a plurality of dielectrics, including outer dielectrics and a center dielectric disposed between the outer dielectrics, wherein the outer dielectrics surround medial portions of the compressible electrical contact; and an outer housing surrounding the plurality of dielectrics.

15. The connector assembly of claim 14, wherein the center dielectric mates with the compressible electrical contact.

16. The connector assembly of claim 14, wherein the compressible electrical contact comprises a material selected from the group consisting of brass, copper, beryllium copper, and stainless steel.

17. The connector assembly of claim 14, wherein the at least one cut angle is about 5 degrees when the compressible electrical contact is in the substantially relaxed state.

18. The connector assembly of claim 14, wherein the outermost cut distance is about 0.002 inches when the compressible electrical contact is in the substantially relaxed state.

19. The connector assembly of claim 14, wherein the innermost cut distance is about 0.001 inches when the compressible electrical contact is in the substantially relaxed state.

20. The connector assembly of claim 14, wherein the compressible electrical contact has an effective outer diameter of about 0.010 inches.

* * * * *